(12) United States Patent
Badac et al.

(10) Patent No.: US 11,438,976 B2
(45) Date of Patent: Sep. 6, 2022

(54) APPARATUSES, SYSTEMS, AND METHODS FOR HEATING WITH ELECTROMAGNETIC WAVES

(71) Applicant: CTL Energy, Inc., Hyde Park, PA (US)

(72) Inventors: Jeffrey Badac, Hyde Park, PA (US); Ryan Booth, Hyde Park, PA (US); Kaitlin Harris, Hyde Park, PA (US); Cliff Raleigh, Hyde Park, PA (US); Steven Schlaegle, Hyde Park, PA (US); Richard Troiano, Hyde Park, PA (US)

(73) Assignee: Qwave Solutions, Inc., Hyde Park, PA (US)

( * ) Notice: Subject to any disclaimer, the term of this patent is extended or adjusted under 35 U.S.C. 154(b) by 0 days.

(21) Appl. No.: 17/167,275

(22) Filed: Feb. 4, 2021

(65) Prior Publication Data

US 2021/0243857 A1 Aug. 5, 2021

Related U.S. Application Data

(60) Provisional application No. 62/969,935, filed on Feb. 4, 2020.

(51) Int. Cl.
| | |
|---|---|
| *H05B 6/80* | (2006.01) |
| *H05B 6/64* | (2006.01) |
| *B01D 46/10* | (2006.01) |
| *H05B 6/70* | (2006.01) |

(52) U.S. Cl.
CPC ............. *H05B 6/802* (2013.01); *B01D 46/10* (2013.01); *H05B 6/6491* (2013.01); *H05B 6/701* (2013.01); *H05B 6/707* (2013.01)

(58) Field of Classification Search
CPC ...... B01D 46/10; H05B 6/6491; H05B 6/701; H05B 6/707; H05B 6/802; H05B 2214/03; H05B 6/784; H05B 6/806

USPC ....... 219/687, 765, 634, 777, 553, 745, 725; 428/220; 156/274.6, 274.2; 426/107, 426/234, 241, 243; 99/DIG. 14

See application file for complete search history.

(56) References Cited

U.S. PATENT DOCUMENTS

| | | | |
|---|---|---|---|
| 5,958,273 | A | 9/1999 | Koch et al. |
| 6,011,245 | A | 1/2000 | Bell et al. |
| 7,015,437 | B2 | 3/2006 | Johnston et al. |

(Continued)

FOREIGN PATENT DOCUMENTS

| | | |
|---|---|---|
| EP | 3524072 A1 | 6/2015 |
| GB | 792827 A | 4/1958 |

(Continued)

OTHER PUBLICATIONS

ISR and Written Opinion, PCT/US2021/016524, dated Jul. 5, 2021 (17 pp.).
Singh, S., et al., "Microwave assisted coal conversion", Elsevier, Fuel—Jan. 2015 (DOI:10.1016/j.fuel.2014.09.108) (8 pp.).
Mohapatra, J., et al. Phys. Chem. Chem. Phys., 2018, 20, 12879-12887.

*Primary Examiner* — Quang T Van
(74) *Attorney, Agent, or Firm* — Eversheds Sutherland (US) LLP

(57) ABSTRACT

Apparatuses, systems, and methods for heating a fluid or other material. The apparatuses may include a container (e.g., tube) in which a susceptor material is disposed. The susceptor material may convert microwave energy to heat, which may increase the temperature of a fluid or material in or adjacent the tube.

41 Claims, 18 Drawing Sheets

(56) References Cited

U.S. PATENT DOCUMENTS

| | | |
|---|---|---|
| 7,022,953 B2 | 4/2006 | Nguyen et al. |
| 7,161,126 B2 * | 1/2007 | Ripley ................ H05B 6/6494 219/774 |
| 7,767,943 B2 | 8/2010 | Ripley |
| 8,616,273 B2 | 12/2013 | Trautman et al. |
| 8,729,440 B2 | 5/2014 | Parsche |
| 9,027,638 B2 | 5/2015 | Madison et al. |
| 9,273,251 B2 | 3/2016 | White et al. |
| 9,328,243 B2 | 5/2016 | Parsche |
| 9,642,193 B2 | 5/2017 | Kondo et al. |
| 10,281,482 B2 | 5/2019 | Fagrell et al. |
| 2008/0264934 A1 | 10/2008 | Moreira et al. |
| 2009/0134152 A1 | 5/2009 | Sedlmayr |
| 2014/0353306 A1 | 12/2014 | Cleary |

FOREIGN PATENT DOCUMENTS

| | | | |
|---|---|---|---|
| GB | 2427112 A | 12/2006 | |
| GB | 2536485 A | 9/2016 | |
| JP | 2000121153 A | 4/2000 | |
| WO | WO-2006013437 A1 * | 2/2006 | ........... C01G 37/006 |
| WO | 2006131755 A1 | 12/2006 | |
| WO | 2008074799 A1 | 6/2008 | |
| WO | 2011097714 A1 | 8/2011 | |
| WO | 2012146915 A2 | 11/2012 | |
| WO | 2015142330 A1 | 9/2015 | |
| WO | 2012164350 A2 | 12/2016 | |

* cited by examiner

APPARATUSES, SYSTEMS, AND METHODS FOR HEATING WITH ELECTROMAGNETIC WAVES

CROSS-REFERENCE TO RELATED APPLICATIONS

This application claims priority to U.S. Provisional Patent Application No. 62/969,935, filed Feb. 4, 2020, which is incorporated herein by reference.

FIELD OF THE INVENTION

This application relates to apparatuses, systems, and methods for heating with electromagnetic waves, including microwaves.

BACKGROUND

Microwave energy can be used to process or heat a variety of materials in a number of industries, including the food and beverage industry and various chemical industries. For example, microwaves have been tested and applied in plasma processes (e.g., powder processing, chemical vapor infiltration, surface modification, etc.), chemical processing and synthesis, and waste remediation. Although significant effort has been made to expand the industrial use of microwave energy, little progress has been made.

The disadvantages commonly associated with the deployment of microwave energy include (i) the difficulties faced when designing an apparatus or process, (ii) the need for expensive equipment, (iii) an overall limited number of uses, (iv) the change in dielectric properties that can occur as temperature increases, or (v) a combination thereof.

There remains a need for apparatuses, systems, and methods for heating with microwaves that overcome one or more of these disadvantages, including apparatuses and methods for producing a heated fluid that may be employed, for example, in further processes as a source of heat.

BRIEF SUMMARY

Provided herein are apparatuses, systems, and methods that address one or more of the foregoing disadvantages, including methods for heating that do not rely completely upon the dielectric properties of a fluid. As a result, embodiments of the methods provided herein are not material specific, and are applicable to a broad range of fluids, as described herein, including organic fluids, inorganic fluids, aqueous fluids, etc., each of which may be polar or non-polar. The apparatuses and methods provided herein may include or rely on, respectively, a fixed bed system in which a flow of fluid contacts a susceptor material irradiated with electromagnetic waves, such as microwaves. The electromagnetic waves may be converted to heat by the susceptor material, thereby heating the fluid in a process that may be continuous. A fluid may be passed through the fixed bed system once or two or more times until a desired temperature of the fluid is reached. The apparatuses and systems herein also may permit a pressure to be applied to at least a part of the apparatuses or systems, such as a pressure greater than the critical pressure of a fluid, which may keep all or at least a portion of the fluid in the liquid phase and/or the super-critical phase.

In one aspect, apparatuses are provided herein. In some embodiments, the apparatuses include a tube; and an applicator, wherein (i) a first end of the tube is fixably mounted or spring mounted to the applicator, and (ii) at least a portion of the tube is arranged in the applicator. In some embodiments, the apparatuses include a tube; a susceptor material disposed in the tube; and an applicator, wherein (i) a first end of the tube is fixably mounted or spring mounted to the applicator, and (ii) at least a portion of the tube and at least a portion the susceptor material in the tube is arranged in the applicator. In some embodiments, a second end of the tube is fixably mounted or spring mounted to the applicator. The tube may include an inlet, an outlet, or an inlet and an outlet. The apparatuses also may include one or more microwave generators, wherein the one or more microwave generators are positioned to introduce a plurality of microwaves into an applicator to irradiate at least a portion of the susceptor material with the plurality of microwaves.

In some embodiments, the apparatuses include a container defining an internal volume configured to receive the susceptor particles; at least one retention device disposed in or adjacent to the internal volume and configured to retain the susceptor particles in the internal volume while allowing a fluid to flow out of the internal volume; and an electromagnetic wave emission structure configured to introduce electromagnetic waves into the internal volume for irradiation of the susceptor particles contained in the internal volume. The electromagnetic wave emission structure may include an electromagnetic wave-transparent section of the container through which electromagnetic waves can pass from outside the container into the internal volume. The container may include a tubular section formed of an electromagnetic wave-transparent material that makes up the electromagnetic wave-transparent section of the container. The apparatus may include an applicator for directing electromagnetic waves through the electromagnetic wave-transparent section and into the internal volume. In some embodiments, the electromagnetic wave emission structure is at least partially disposed in the container.

In another aspect, systems are provided herein. In some embodiments, the systems include a fluid source in which the fluid is disposed, wherein the fluid source is in fluid communication with the tube; and a pump configured to provide (i) the fluid to the tube and/or (ii) a pressure within the tube, wherein the pump is in fluid communication with the apparatus and the fluid source.

In yet another aspect, methods of heating a material, such as a fluid, are provided.

In some embodiments, the methods include contacting a fluid with a heated susceptor material, such as susceptor particles, to thereby heat the fluid at a rate of at least 100° C./min, at least 200° C./min, at least 300° C./min, at least 400° C./min, or at least 500° C./min. In some embodiments, the methods include providing an apparatus or system as described herein; disposing a fluid in the inlet of the tube at a flow rate; introducing a plurality of electromagnetic waves into the applicator to irradiate at least a portion of the susceptor material with the plurality of electromagnetic waves to generate heat while the fluid is in the tube to produce a heated fluid; and collecting the heated fluid at the outlet of the tube. In some embodiments, the methods also include (i) disposing at least a portion of the heated fluid in the inlet of the tube; (ii) introducing the plurality of electromagnetic waves into the applicator to irradiate at least a portion of the susceptor material with the plurality of electromagnetic waves to generate heat while the heated fluid is in the tube to produce a further heated fluid; and (iii) collecting the further heated fluid at the outlet of the tube.

In some embodiments, the methods include providing an apparatus or system as described herein; arranging a material adjacent the tube; introducing a plurality of electromagnetic waves into the applicator to irradiate at least a portion of the susceptor material with the plurality of electromagnetic waves to generate heat while the material is adjacent the tube to produce a heated material. The material may include a fluid, a solid, or a combination thereof. In some embodiments, the arranging of the material adjacent the tube includes contacting the tube with the material.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
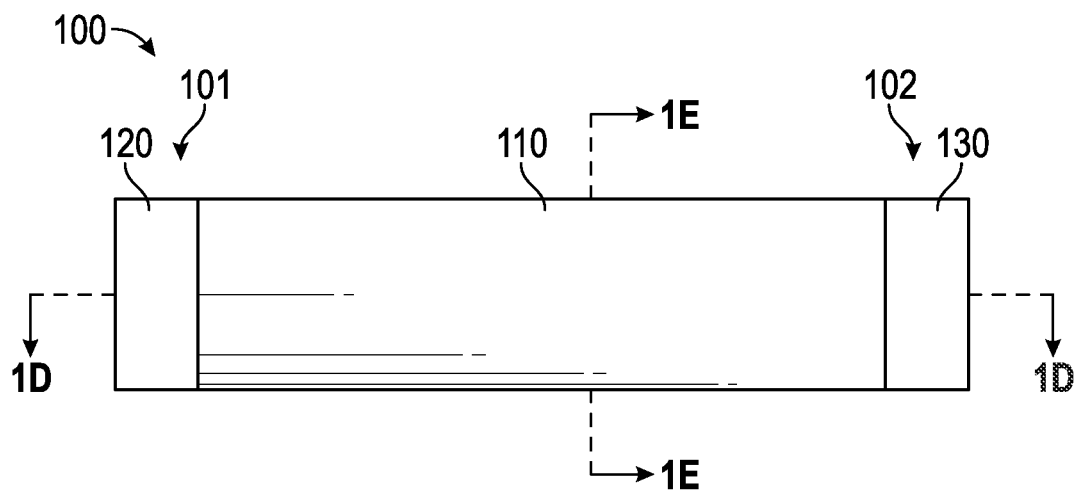
FIG. 1A depicts a side view of an embodiment of a tube.

Provided herein are apparatuses, systems, and methods for heating a fluid with electromagnetic energy, such as microwave energy. The apparatuses include a tube in which a susceptor material is disposed, and the tube may be at least partially arranged in an applicator.

Containers/Tubes

The apparatuses herein may include a container. The container may define an internal volume configured to receive a susceptor material, such as particles of a susceptor material. The container may have an inlet, an outlet, or an inlet and an outlet. The inlet may be a fluid inlet for receiving the fluid in the internal volume, and the outlet may be a fluid outlet for discharging the fluid from the internal volume. An apparatus may include one container (e.g., tube) or more than one (e.g., two) containers (e.g., tube). If a tube is described herein as having a feature, then such feature may be a feature of a container; conversely, if a container is described herein as having a feature, then such feature may be a feature of a tube.

The container may be a tube. As used herein, the term "tube" refers to a container that (i) is elongated (e.g., a length:width ratio of at least 1.1:1, at least 1.5:1, or at least 2:1) or includes an elongated portion, (ii) defines an internal volume having, at any point, a cross-sectional shape that is non-polygonal (e.g., circular, elliptical, etc), or (iii) a combination thereof.

The internal reservoir of a container, such as a tube, may be in fluid connection with the inlet and the outlet, when an inlet and outlet are present. A container, such as a tube, may be (i) straight, curved (e.g., feature one or more coils), bent, or a combination thereof, (ii) have any outer or inner cross-sectional shape (e.g., polygonal, non-polygonal, etc.) or area, or (iii) have any outer or inner dimensions. The "inner cross-sectional shape" and the "inner dimensions" may refer to the cross-sectional shape, dimensions, and/or volume capacity of the internal reservoir. The "outer or inner dimensions" are outer or inner diameters, respectively, when the tube is substantially cylindrical or the internal reservoir has a substantially circular cross-sectional shape.

A container, such as a tube, may have any outer dimension(s) and any inner dimension(s). Since a difference between the outer dimension(s) and the inner dimension(s) determine the thickness of a container's wall, the outer dimension(s) and inner dimension(s) may be selected so that a container's wall can (i) withstand one or more parameters of the methods described herein, such as pressure, (ii) permit a susceptor material to be irradiated effectively or to a desired extent with microwaves (e.g., microwaves of a certain frequency and/or wavelength), (iii) retain at least a portion of a susceptor material at a desired location, or (iv) a combination thereof. A container, such as a tube, may have an outer dimension of about 5 mm to about 3 m, about 10 mm to about 3 m, about 20 mm to about 3 m, about 50 mm to about 3 m, about 100 mm to about 3 m, about 250 mm to about 3 m, about 500 mm to about 3 m, about 1 m to about 3 m, or about 2 m to about 3 m, and an inner dimension may be selected to provide a desired thickness of a container's (e.g., tube's) wall.

In some embodiments, the tube, or at least a portion thereof, is substantially cylindrical, and has an internal reservoir having a substantially circular cross-sectional shape. As used herein, the phrase "substantially cylindrical" refers to an object or portion thereof having a substantially circular outer cross-sectional shape, wherein the smallest outer diameter of the object at any point along its length is less than its largest outer diameter at any point along its length by no more than 20% (e.g., 100 and at least 80), 15% (e.g., 100 and at least 85), 10% (e.g., 100 and at least 90), 5% (e.g., 100 and at least 95), or 1% (e.g., 100 and at least 99). As used herein, the phrase "substantially circular" refers to a shape having a smallest diameter (e.g., outer diameter of tube, inner diameter of internal reservoir) that is less than its largest diameter (e.g., outer diameter of tube, inner diameter of internal reservoir) by no more than 20% (e.g., 10 and at least 8), 15% (e.g., 10 and at least 8.5), 10% (e.g., 10 and at least 9), 5% (e.g., 10 and at least 9.5), or 1% (e.g., 10 and at least 9.9).

In some embodiments, a portion of a container, such as a tube, formed of an electromagnetic wave-transparent material is substantially cylindrical, and has an outer diameter of about 3 mm to about 200 mm, and an inner diameter of about 2 mm to about 150 mm. In some embodiments, a portion of a container, such as a tube, formed of an electromagnetic wave-transparent material is substantially cylindrical, and has an outer diameter of about 3 mm to about 150 mm, and an inner diameter of about 2 mm to about 100 mm. In some embodiments, a portion of a container, such as a tube, formed of an electromagnetic wave-transparent material is substantially cylindrical, and has an outer diameter of about 3 mm to about 75 mm, and an inner diameter of about 2 mm to about 60 mm. In some embodiments, a portion of a container, such as a tube, formed of an electromagnetic wave-transparent material is substantially cylindrical, and has an outer diameter of about 15 mm to about 75 mm, and an inner diameter of about 10 mm to about 60 mm. In some embodiments, a portion of a container, such as a tube, formed of an electromagnetic wave-transparent material is substantially cylindrical, and has an outer diameter of about 45 mm to about 60 mm, and an inner diameter of about 30 mm to about 44 mm. In some embodiments, a portion of a container, such as a tube, formed of an electromagnetic wave-transparent material is substantially cylindrical, and has an outer diameter of about 50 mm to about 54 mm, and an inner diameter of about 40 mm to about 44 mm. Other dimensions are envisioned, however, as the apparatuses herein, including the containers (e.g., tubes), may be scaled to accommodate any fluid flow. For example, a portion of a container, such as a tube, formed of an electromagnetic wave-transparent material may be substantially cylindrical, and have an outer diameter of about 0.5 m to about 3 m, about 1 m to 3 m, or about 2 m to about 3 m, and an inner diameter of about 0.4 m to about 2.9 m, about 0.9 m to about 2.9 m, or about 1.9 m to about 2.9 m.

A container (e.g., tube) may be a pressure container. A "pressure container" refers to a container configured to withstand a pressure of at least 1 bar, at least 5 bar, at least 10 bar, at least 15 bar, at least 20 bar, or at least 25 bar.

The inlet and the outlet, when present, may include a shared opening or two openings of any size and at any location that permit a fluid to enter and exit a container (e.g., tube), respectively. When, for example, the container is a tube, the tube may have an inlet arranged at a first end or a second end of the tube, and a tube may have an outlet arranged at a second end or a first end, respectively, of the tube. Alternatively, a tube may have an inlet and an outlet arranged at the first end of a tube, or an inlet and an outlet arranged at a second end of a tube. As used herein, the phrases "first end", "at a first end", "second end", "at a second end", and the like refer to regions beginning at one of the terminal points of a container, such as a tube, and extending less than or equal to 50% of the length of the container (e.g., tube) towards the opposite end of the container (e.g., tube).

A container, such as a tube, may be arranged at any orientation when present in the apparatuses and systems described herein, or when used in the methods described herein. For example, a container, such as a tube, may be arranged so that a longitudinal axis of the container (e.g., tube) is parallel (0°) to a surface (e.g., ground, floor, ceiling, wall, etc.) that supports an apparatus. As a further example, a container (e.g., tube) may be arranged so that its longitudinal axis is perpendicular (90°) to a surface (e.g., ground, floor, ceiling, wall, etc.) that supports an apparatus. In some embodiments, a container (e.g., tube) is arranged at any angle from 0° to 90° relative to a surface (e.g., ground, floor, ceiling, wall, etc.) that supports an apparatus. For example, an angle between a longitudinal axis of the container (e.g., tube) and a surface (e.g., ground, floor, ceiling, wall, etc.) that supports the apparatus may be 0° to 90°, 10° to 90°, 20° to 90°, 30° to 90°, 40° to 90°, 50° to 90°, 60° to 90°, 70° to 90°, or 80° to 90°. Therefore, when a container (e.g., tube) includes an inlet and an outlet, the container's inlet and outlet may be arranged at the same or different heights relative to a surface (e.g., ground, floor, ceiling, etc.) that supports an apparatus. For example, an inlet of a tube may be arranged closer to a supporting surface than an outlet of the container, thereby allowing the container (e.g., tube) to operate in "upflow" mode. Alternatively, an outlet of a container (e.g., tube) may be arranged closer to a supporting surface than an inlet of the container (e.g., tube), thereby allowing the container (e.g., tube) to operate in "downflow" mode.

A container (e.g., tube) may be of any length, i.e., the distance of a straight line from a terminal point of the first end or, if present, first cap to the second end or, if present, second cap of the container (e.g., tube). A container (e.g., tube), for example, may have a length of about 0.1 m to about 5 m, about 0.1 m to about 4 m, about 0.1 m to about 3 m, about 0.5 m to about 3 m, about 0.5 m to about 2 m, about 0.5 m to about 1.5 m, or about 1 m to about 1.5 m. Other lengths are envisioned, however, as the apparatuses herein, including the containers, may be scaled to accommodate any fluid flow.

A container (e.g., tube) may include (e.g., be formed of) any material that permits a susceptor material in the container to be irradiated with electromagnetic waves, such as microwaves. In some embodiments, a container, at least in part, is formed of one or more materials that include an electromagnetic wave-transparent material. As used herein, the phrase "electromagnetic wave-transparent material" refers to materials that remain substantially unheated (i.e., a temperature increase of less than or equal to 5%) when irradiated with one or more types of electromagnetic waves, such as those described herein, for a time sufficient to increase the temperature of 1 L of water (originally at ambient temperature) by at least 5%. In other words, the electromagnetic wave-transparent material is transparent with regard to the one or more types of electromagnetic waves selected for use, and not necessarily all electromagnetic waves. In some embodiments, a container (e.g., tube), at least in part, is formed of one or more materials that include a microwave-transparent material. As used herein, the phrase "microwave-transparent material" refers to materials, typically low-loss dielectric materials, that remain substantially unheated (i.e., a temperature increase of less than or equal to 5%) when irradiated with microwaves for a time sufficient to increase the temperature of 1 L of water (originally at ambient temperature) by at least 5%. An electromagnetic wave-transparent material, such as a microwave-transparent material, may be selected from ceramic, polymer, glass, fiberglass, an inorganic compound (e.g., a mineral), or a combination thereof. In some embodiments, the inorganic compound includes fused silica, which may be commonly referred to as quartz. In some embodiments, the electromagnetic wave-transparent material, such as a microwave-transparent material, includes silicon nitride. In some embodiments, the electromagnetic wave-transparent material, such as a microwave-transparent material, includes a ceramic. In some embodiments, the ceramic includes silicon, aluminum, nitrogen, and oxygen, which may be referred to as a "SiAlON" ceramic. In some embodiments, the ceramic includes alumina. The alumina may be a commercially available alumina, which may include up to 10%, by weight, up to 5%, by weight, or up to 1%, by weight, of impurities, such as silica, calcia, magnesia, iron oxide, sodium oxide, titania, chromic oxide, potassium oxide, boron oxide, or a combination thereof. In some embodiments, the alumina is 99.8% alumina (McDaniel Advanced Ceramic Technologies, Pennsylvania, USA).

A container (e.g., tube) may be formed from one or more materials. For example, at least a portion of tube that is arranged in an applicator may be formed of one or more electromagnetic wave-transparent materials, while one or more other materials may be used to form the remainder of the container. For example, a container may be formed of a ceramic and a metal.

In some embodiments, the container (e.g., tube) is a monolithic structure formed of one or more electromagnetic wave-transparent materials. As used herein, the phrase "monolithic structure" refers to a structure formed of a single piece of a material (e.g., ceramic, metal, etc.). A container having a monolithic structure, for example, may be a tube that includes a single tube-shaped piece formed entirely of a ceramic. The ceramic monolithic structure may include an inlet and an outlet at a first end and second end, respectively. In some embodiments, a monolithic structure includes one or more structural features (e.g., a depression, groove, ridge, flange, etc.) to accommodate another part of the apparatuses provided herein, such as a clamp or other part of a head unit. A monolithic structure, however, may lack one or more structural features configured to accommodate another part of the apparatuses provided herein.

In some embodiments, the container (e.g., tube) includes a first cap arranged at the first end of the container (e.g., tube), a second cap arranged at the second end of the container (e.g., tube), or a first cap and a second cap arranged at the first end and the second end of the container (e.g., tube), respectively. In some embodiments, the inlet of the container (e.g., tube) is provided by the first cap. In some embodiments, the outlet of the container (e.g., tube) is provided by the second cap. For example, the first cap and/or the second cap may define an aperture that permits fluid to enter or exit an internal reservoir of a container (e.g., tube), respectively. The first cap and/or second cap may be formed of any material. In some embodiments, the first cap and/or second cap is formed of a material having a coefficient of thermal expansion that is identical or similar (e.g., within 10%) to the coefficient of thermal expansion of an electromagnetic wave-transparent material, such as a microwave-transparent material, of a container (e.g., tube). In some embodiments, the first cap and/or the second cap are formed of a metal. The metal may be an alloy, such as an alloy including iron, cobalt, and nickel (e.g., a KOVAR® alloy). In some embodiments, the first cap and/or the second cap includes a metal, a portion of the tube includes a ceramic, and the first cap, the second cap, or both the first cap and the second cap are adjoined in any manner, including a manner that forms a seal between the tube and the first cap, second cap, or both the first cap and the second cap. For example, a container (e.g., tube) may be adjoined to a first cap, a second cap, or a first cap and a second cap by (i) a ceramic-to-metal braze, (ii) an adhesive, (iii) securing a threaded end of a tube into a first cap and/or second cap, which may also be threaded, or (iv) a combination thereof. The braze may result in a seal, which may be sufficient to withstand one or more parameters of the methods described herein, such as pressure. In some embodiments, a portion of the container (e.g., tube) includes alumina, and the first cap, the second cap, or both the first cap and the second cap includes KOVAR® alloy. The KOVAR® alloy may be adjoined to a ceramic, such as alumina, by (i) a ceramic-to-metal braze, (ii) threading on one or both of the ceramic and KOVAR® alloy, or (iii) a combination thereof.

The adhesive may be a ceramic adhesive, such as those that are commercially available from Sauereisen, Inc. (PA, USA). The first cap and/or second cap generally may have any shape. For example, a first cap and/or a second cap may have a feature (e.g., a depression, groove, ridge, flange, etc.) that corresponds to another part of a container (e.g., tube), system, or apparatus herein. In some embodiments, a first cap and/or second cap includes one or more features (e.g., a depression, a groove, ridge, flange, etc. of any polygonal or non-polygonal shape), which may permit the first cap and/or the second cap to accommodate a clamp or other device, which may be used as, or as part of, a seal as described herein, such as a seal between the first cap and/or the second cap to another part (e.g., a head unit) of the apparatuses or systems herein.

Figure 1B:
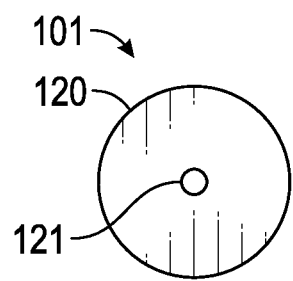
FIG. 1B depicts an end view of an embodiment of a tube.
Figure 1C:
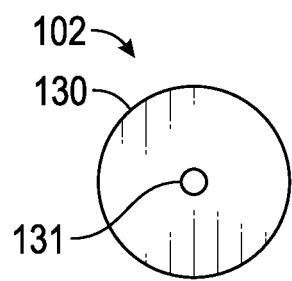
FIG. 1C depicts an end view of an embodiment of a tube.

An embodiment of a tube is depicted at FIG. 1A (side view), FIG. 1B (end view), and FIG. 1C (end view). The tube 100 of FIG. 1A is substantially cylindrical and has a first end 101 and a second end 102. The tube 100 includes a middle portion 110 formed of a microwave-transparent material, a first cap 120 at the first end 101, and a second cap 130 at the second end 102. As depicted at FIG. 1B, the first end 101 of the tube 100 has an inlet 121 provided by the first cap 120. As depicted at FIG. 1C, the second end 102 of the tube 100 has an outlet 131 provided the second cap 130. Although the inlet 121 of FIG. 1B and the outlet 131 of FIG. 1C are centered in the first cap 120 and second cap 130, respectively, other embodiments are envisioned, such as embodiments in which at least one of the inlet 121 and outlet 131 are not centered.

Figure 1D:
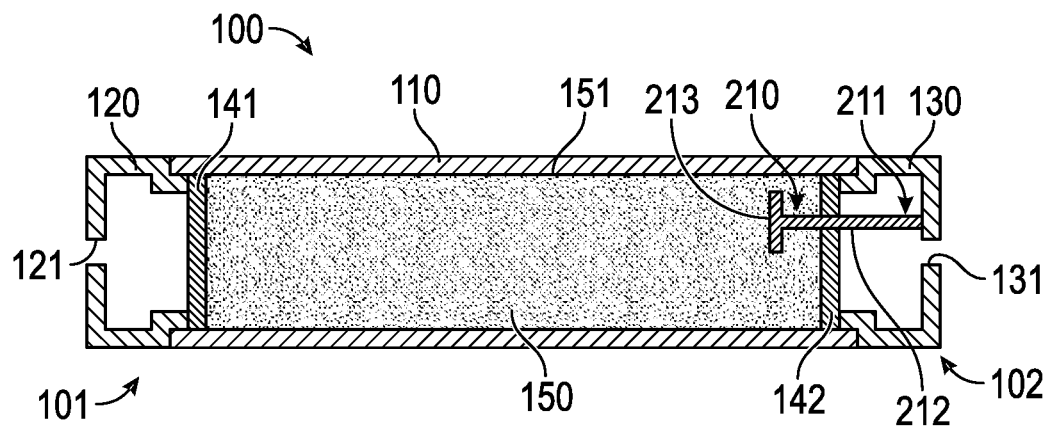
FIG. 1D depicts a cross-sectional view of the tube of FIG. 1A.
Figure 1E:
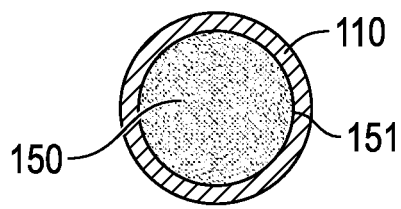
FIG. 1E depicts a cross-sectional view of the tube of FIG. 1A.
Figure 1F:
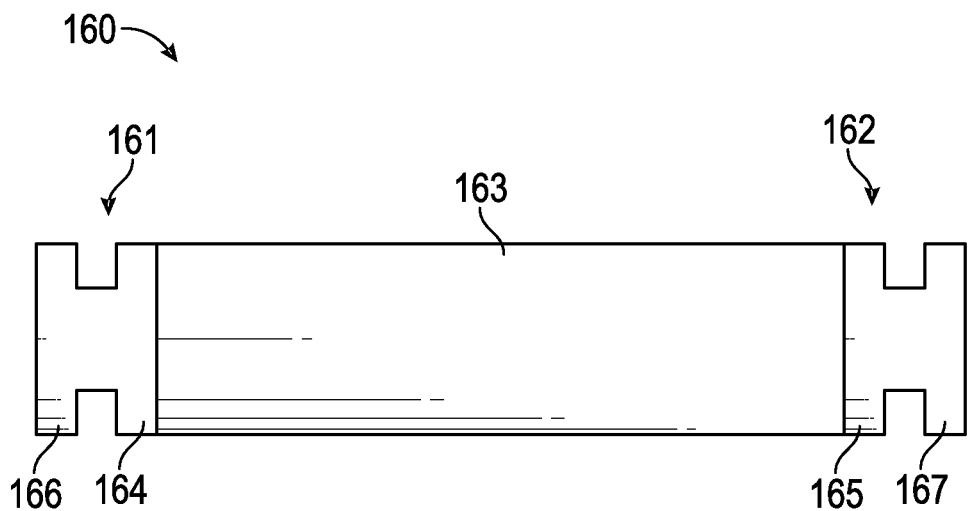
FIG. 1F depicts an embodiment of a tube.

Another embodiment of a tube is depicted at FIG. 1F (side view). The tube 160 of FIG. 1F is substantially cylindrical and has a first end 161 and a second end 162. The tube 160 includes a middle portion 163 formed of a microwave-transparent material, a first cap 164 at the first end 161, and a second cap 165 at the second end 162. The first cap 164 and the second cap 165 include a flange (166, 167). The flange (166, 167) may accommodate a clamp or other device. End views of the tube 160 of FIG. 1F are identical to those of FIG. 1B and FIG. 1C, because the first end 161 of the tube 160 has an inlet provided by the first cap 164, and the second end 162 of the tube 160 has an outlet provided the second cap 165. In some embodiments, one or both of the first cap 164 and second cap 165 can include a flange having a non-circular shape, such as a square or rectangular flange, and such embodiments would have end views that differ from those depicted at FIG. 1B and FIG. 1C.

Figure 1G:
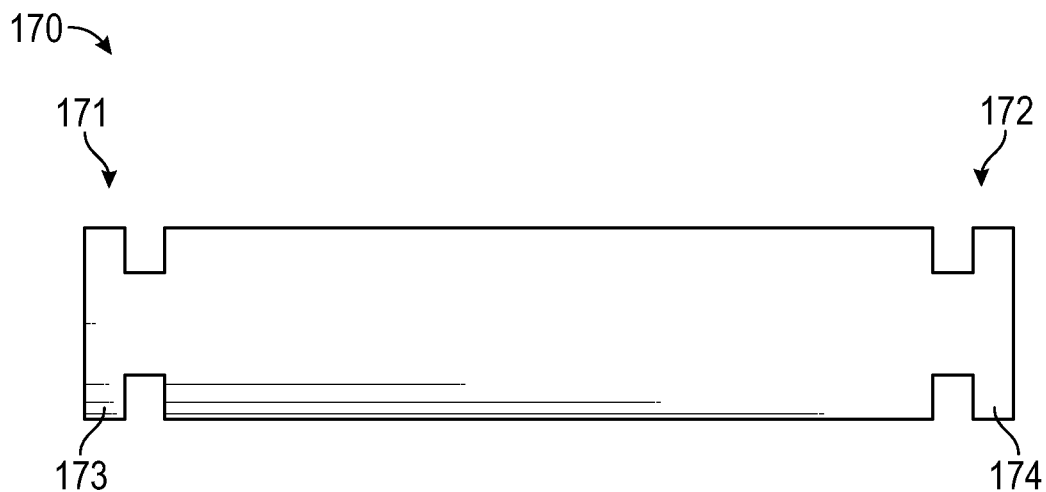
FIG. 1G depicts an embodiment of a tube having a monolithic structure.
Figure 1H:
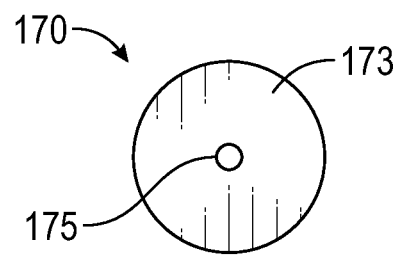
FIG. 1H depicts an end view of an embodiment of a tube.

Yet another embodiment of a tube is depicted at FIG. 1G (side view) and FIG. 1H (end view). The tube 170 of FIG. 1G is substantially cylindrical and has a first end 171 and a second end 172. The tube 170 has a monolithic structure formed of a microwave-transparent material, such as a ceramic. The monolithic structure includes a flange (173, 174) at the first end 171 and the second end 172. The flanges (173, 174) may accommodate a clamp or other device. An end view of the tube 170 of FIG. 1G is provided at FIG. 1H, which depicts the flange 173 and an inlet 175. In some embodiments (not shown), the inlet 175 is not present.

The outer dimensions of a container (e.g., tube) may be selected to conform with the dimensions of an applicator. An applicator, for example, may include a structure that defines one or more apertures in which a tube is arranged. The container (e.g., tube) may have an outer dimension that permits the container (e.g., tube) to contact at least a portion of one or more apertures of an applicator. The container (e.g., tube) may have an outer dimension that is about 0.1 mm to about 10 mm, about 0.1 mm to about 5 mm, about 2 mm to about 4 mm, or about 3 mm to about 3.5 mm less than a corresponding dimension of an aperture of an applicator. An applicator may include one or more chambers defined by walls, wherein each of the walls define an aperture in which a tube is arranged, and a relatively small difference between the outer dimension of the tube and the dimension of the aperture may reduce or eliminate microwave leakage.

A container (e.g., tube) also may include a microwave disruptor. As used herein, the phrase "microwave disruptor" refers to a device configured to reduce or eliminate the ability of microwaves to heat at least a part of one or more components of an apparatus. For example, a microwave disrupter may be configured to disrupt the resonance of microwaves. In some embodiments, a microwave disruptor is arranged inside a container (e.g., tube). A microwave disruptor may be mounted in any manner to any part of a container (e.g., tube). For example, a microwave disruptor may be fixably mounted to any part of a container (e.g., tube). In some embodiments, a microwave disruptor is arranged at a first end of a container (e.g., tube), an inlet of a container (e.g., tube), a second end of a container (e.g., tube), an outlet of a container (e.g., tube), or a combination thereof. Arranging a microwave disrupter at a first end of the container (e.g., tube) and/or an inlet of a container (e.g., tube) having a first cap at the first end may reduce or eliminate heating of the first cap by microwaves. Arranging a microwave disrupter at a second end of the container (e.g., tube) and/or an outlet of a container (e.g., tube) having a second cap at the second end may reduce or eliminate heating of the second cap by microwaves.

As used herein, the phrases "fixably mounted", "fixably adjoined", and the like describe an affixed or secured connection that is configured to be non-elastic, including a connection that (i) is configured to be permanent (e.g., two objects are welded together, or an object, upon formation, includes two features, such as a second cap that includes a microwave disruptor), and/or (ii) includes one or more fasteners or features that (a) are (1) not removable by hand (e.g., a threaded fastener tightened with a tool, some types of adhesive, a tightened collar, a material providing friction between two objects, etc.) or (2) removable by hand without the aid of a loosening tool (e.g., objects connected by corresponding male and female features, such as a tab and slot, a ridge and groove, some types of adhesives, a material providing friction between objects, etc.), and/or (b) can withstand without failing one or more parameters of the methods herein, such as pressure, heat, force(s) imparted by thermal expansion, etc.

A microwave disruptor generally may include (e.g., be formed of) any material, and have any shape that is capable of reducing or eliminating the heating ability of microwaves at or near the location of the microwave disruptor. In some embodiments, the microwave disruptor includes a metal, such as copper, stainless steel, etc. A microwave disruptor may include a wire (i.e., a flexible and elongated) or rod (i.e., rigid and elongated), which may be straight, curved, bent, or a combination thereof. When the microwave disruptor includes a wire or rod, a flange, one or more protruding structures, or a combination thereof may be arranged at any portion of the wire or rod.

Several embodiments of microwave disruptors are depicted at FIG. 2A-FIG. 2D. The microwave disruptor 200 of FIG. 2A includes a bent wire 202 having a first end 201 that may be mounted at any location in a container (e.g., tube). The microwave disruptor 210 of FIG. 2B includes a substantially cylindrical rod 212 having a first end 211 that may be mounted at any location in a container (e.g., tube). The microwave disruptor 210 also includes a substantially circular flange 213. The microwave disruptor 220 of FIG. 2C includes a rod 222 having a first end 221 that may be mounted at any location in a container (e.g., tube). The microwave disruptor 220 also includes three protruding structures 223. The microwave disruptor 230 of FIG. 2D includes a wire 232 having a plurality of curves and a first end 231 that may be mounted at any location in a container (e.g., tube).

An apparatus, system, or part thereof, such as a tube, may include one or more retention devices to (i) prevent a susceptor material from escaping an internal reservoir and/or cap of a container (e.g., tube), (ii) control a location of a susceptor material in an apparatus, system, or part thereof, such as an internal reservoir, cap, head unit, etc., (iii) prevent a susceptor material from contacting a fluid, or (iv) a combination thereof. The one or more retention devices may include a material that is permeable or impermeable to a fluid disposed in the inlet of a container (e.g., tube). The one or more retention devices may be located at any position in a system or apparatus. The one or more retention devices may be (i) disposed in or adjacent an internal volume defined by a container, such as a tube, and/or (ii) configured to retain the susceptor particles in the internal volume defined by a container while allowing a fluid to flow out of the internal volume. In some embodiments, the retention device includes a membrane. In some embodiments, the retention device includes a plurality of openings through which a fluid can pass, but a susceptor material, such as susceptor particles, cannot pass. In some embodiments, the one or more retention devices include a screen. The retention device (e.g., membrane, screen, etc.), which may include a frame, may be positioned (e.g., fixably mounted) (i) in or adjacent to a container (e.g., tube), for example, at one or both ends of an internal reservoir, in a cap, or adjacent to a cap, (ii) in or adjacent to a head unit (e.g., in a head unit, between a head unit and cap, and/or in a pipe or other device through which a fluid exits a head unit), or (iii) a combination thereof. Any sieve designation may be selected for the retention device; for example, the retention device may have any suitable mesh number. In some embodiments, the retention device is a screen having a mesh number from 4 to 400, 10 to 200, 20 to 100, or 20 to 50. In some embodiments, the retention devices includes a 30-mesh screen. In some embodiments, the average open area of the openings in the retention mechanism is less than 20 square mm, 15 square mm, 10 square mm, 5 square mm, or 2 square mm. In some embodiments, the retention device includes a screen coupled to the container, a perforated plate coupled to the container, or a perforated wall of the container. In some embodiments, the at least one retention device includes a first retention structure position proximate to a fluid inlet of a container (e.g., tube) and a second retention structure position proximate to the fluid outlet. In addition to being permeable to a fluid disposed in the inlet of a container (e.g., tube), the one or more retention devices also may accommodate, via an aperture or otherwise, one or more other components of a container (e.g., tube), such as a microwave disruptor. A microwave disruptor, for example, may include a portion that is arranged in an aperture defined by the one or more retention devices. In some embodiments, the one or more retention devices include one or more housings formed, at least in part, of an electromagnetic wave-transparent material, such as a microwave transparent material, which may be (i) impermeable to a fluid, and (ii) identical to or different than the electromagnetic wave-transparent material of a tube. A susceptor material may be disposed in the one or more housings. A housing generally may have any shape, and a container (e.g., tube) may include one or more housings in which a susceptor material is disposed. In some embodiments, a housing in which a susceptor material is disposed is an elongated housing having a length:width ratio of at least 3:1 (e.g., cylindrical in shape), thereby forming a "tube-within-a-tube" configuration in which a fluid traverses an area defined at least in part by an outer surface of the elongated housing and an inner surface of the tube. In some embodiments, two or more of the elongated housings are arranged, in any manner, in a container (e.g., tube). In some embodiments, the one or more housings include one or more capsules having a length:width ratio of less than 3:1 (e.g., spherical, elliptical, square, rectangular in shape) arranged, in any manner, in a container (e.g., tube). The susceptor material disposed in a housing may be in any form, including those described herein, such as a particulate form, monolithic form, or a combination thereof.

Figure 2A:
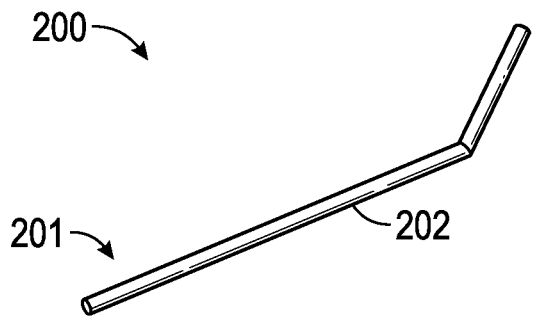
FIG. 2A depicts an embodiment of a microwave disruptor.
Figure 2B:
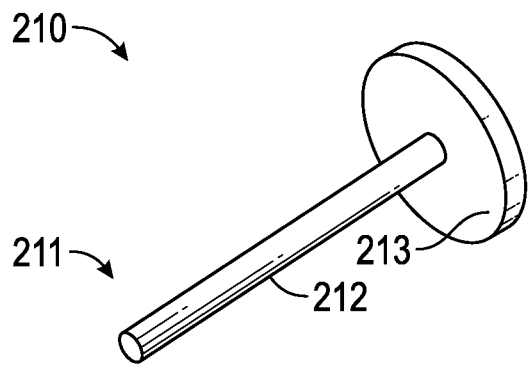
FIG. 2B depicts an embodiment of a microwave disruptor.
Figure 2C:
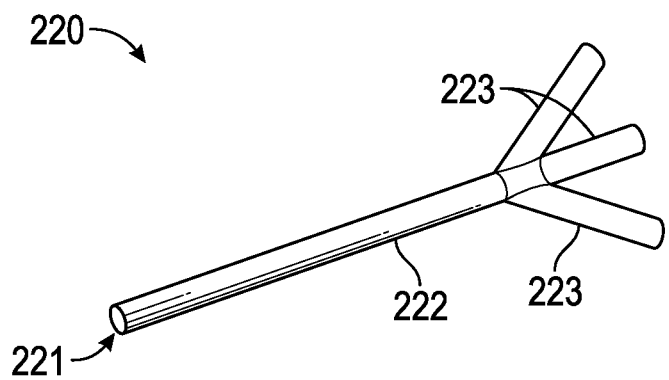
FIG. 2C depicts an embodiment of a microwave disruptor.
Figure 2D:
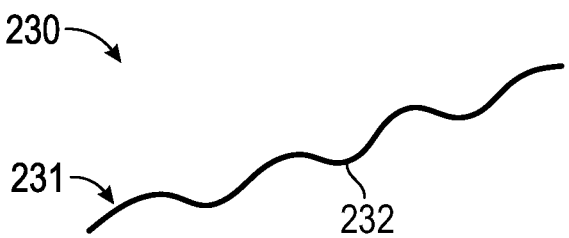
FIG. 2D depicts an embodiment of a microwave disruptor.

A cross-sectional view of the tube of FIG. 1A is depicted at FIG. 1D. The tube 100 includes an internal reservoir 151 and screens (141, 142) arranged at both ends of the internal reservoir 151, which retain a susceptor material 150 disposed in the internal reservoir 151. The screen 142 positioned nearest the second end 102 of the tube 100 defines an aperture that accommodates the microwave disruptor 210 of FIG. 2B. The first end 211 of the microwave disruptor 210 is fixably mounted to the second cap 130 of the tube 100, and, as depicted at FIG. 2B, the microwave disruptor 210 includes a rod 212 and a flange 213. The microwave disruptor 210 may reduce or eliminate the ability of microwaves to heat a portion of the tube, such as the second cap 130, which provides the outlet 131. In some embodiments, the screen 142 may be positioned at a location closer to the first end 101 of the tube 100 so that it is not necessary for the microwave disruptor 210 to penetrate the screen 142.

Another cross-sectional view of the tube of FIG. 1A is depicted at FIG. 1E, which includes a susceptor material 150 disposed in the internal reservoir 151.

Applicator

The apparatuses herein may include an applicator, such as a microwave applicator. The applicators may include any devices to which a container (e.g., tube) is mounted in any manner while a susceptor material is irradiated with a plurality of electromagnetic waves, such as a plurality of microwaves. The plurality of electromagnetic waves introduced into an applicator may include a plurality of radio waves, a plurality of microwaves, a plurality of infrared waves, a plurality of gamma rays, any other type of electromagnetic wave, or a combination thereof. A plurality of electromagnetic waves may be generated, at least in part, by a laser. Any of the applicators provided herein—including those referred to (i) as a "microwave applicator", (ii) as hosting microwaves, or (iii) used with one or more microwave generators—may be used with each of the foregoing types of electromagnetic waves.

One or more containers (e.g., tubes) may be arranged at least partially in an applicator. At least a portion of a container (e.g., tube) and/or at least a portion of a susceptor material is arranged "in" an applicator when located at a position that permits at least a portion of electromagnetic waves disposed in the applicator to contact, traverse, and/or irradiate the at least a portion of the container and/or the at least a portion of the susceptor material, respectively. In some embodiments, an applicator includes more than one component, and the one or more containers (and, if present, a susceptor material in the one or more containers) are arranged at least partially in the component of the applicator in which electromagnetic waves are disposed (e.g., a vessel, modular unit, etc.). For example, one container, two containers, three containers, four containers, or more, may be arranged at least partially in an applicator. Each container may be independently arranged entirely or partially in an applicator. For example, when a container is a tube, the tube may be arranged completely within the applicator (e.g., none of the tube protrudes from the applicator), or partially within the applicator (e.g., a first end or both the first and second ends of the tube protrude from the applicator).

An applicator may include a single piece to which a container (e.g., tube) is mounted and in which electromagnetic waves, such as microwaves, are introduced (e.g., a vessel, modular unit, etc.). Alternatively, an applicator may include two or more pieces, such as a vessel or modular unit in which microwaves are introduced and at least one separate piece, such as a mounting apparatus, as described herein (e.g., a separate bracket and/or other structure (e.g., a pedestal, elongated support (e.g., a hanger, a wire, rod, cable rope, chain, piping (such as piping placing components of a system in fluid communication, etc.), etc.) to which a container (e.g., tube) is mounted in any manner. An applicator may include a vessel and at least one separate piece, and the vessel and at least one separate piece may be arranged at the same or different locations. For example, a vessel may be positioned on a floor, pedestal, first support, etc., and the at least one separate piece (to which the tube may be mounted in any manner) may be positioned at, or extend from, the floor, pedestal, support, or another location, such as the ceiling, wall, a second pedestal, a second support, etc.

In addition to the examples depicted at FIGS. 3A, 3B, 4C, 4D, 6A, 6B, 6C, 7, 8, 9A, 9B, 10, and 11, further non-limiting examples of how a first end (or a first end and a second end) of a container (e.g., tube) may be fixably or spring mounted to an applicator are depicted at FIGS. 12A, 12B, 12C, 12D, and 12E. Other configurations are envisioned.

Figure 12A:
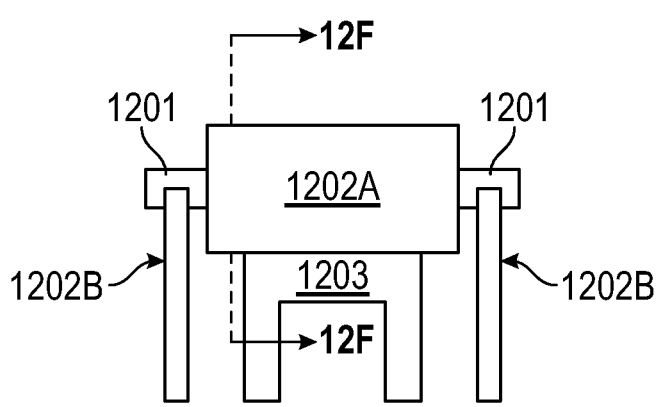
FIG. 12A depicts an embodiment of an applicator and an embodiment of a tube having a first end and a second end mounted to the applicator.

FIG. 12A depicts an embodiment of an applicator (1202A, 1202B) arranged on a supporting structure 1203. The applicator (1202A, 1202B) includes a vessel in which microwaves are introduced 1202A and two pedestals 1202B. The first end and the second end of the tube 1201 are mounted to the pedestals 1202B. The pedestals 1202B may be configured to permit one or both ends of the tube 1201 to be fixably or spring mounted to the applicator (1202A, 1202B). In alternative embodiments, the applicator of FIG. 12A features only one pedestal 1202B. One or both pedestals (1202B) may include wheels and/or another feature to facilitate or ease the removal of the tube 1201 from the vessel 1202A. Although both ends of the tube 1201 of FIG. 12A protrude from the vessel 1202A, it is not necessary for one or both ends to do so. A cross-sectional view of the vessel 1202A of FIG. 12A is depicted at FIG. 12F. FIG. 12F depicts an aperture 1210 defined by the vessel 1202A, and the tube 1201 that is mounted to the applicator (1202A, 1202B) is arranged in the aperture, but the tube 1201 does not contact the vessel 1202A, thereby permitting a "floating" tube configuration. Alternatively, the pedestal(s) 1202B of FIG. 12A may be configured to permit a portion of the tube 1201 to contact the vessel 1202A at one or more locations; an example of such a configuration is depicted at FIG. 12G. Additionally or alternatively, the applicator (1202A, 1202B), as depicted, for example, at FIG. 12H and FIG. 12I, may include a material 1220 that is disposed between and in contact with the vessel 1202A and the tube 1201 that is arranged in the aperture 1210. The material 1220 may completely or partially circumvent a tube. The material 1220, for example, may be configured in the manner depicted at FIG. 12H, or the material 1220 may include one or more discrete portions, as depicted, for example, at FIG. 12I. The material 1220 may have one or more characteristics (e.g., rigid, flexible, adhesive, etc.) that permits the tube 1201 to be fixably mounted or spring mounted to the applicator (1202A, 1202B), as described herein, with or without the pedestal(s) 1202B (see, e.g., FIG. 3A, FIG. 3B). The material 1220, for example, may be an elastic material that accommodates a possible expansion and contraction of the tube 1201. In some embodiments, the material 1220 is arranged in one or more apertures defined by the vessel 1202A of the applicator (1202A, 1202B).

Figure 12B:
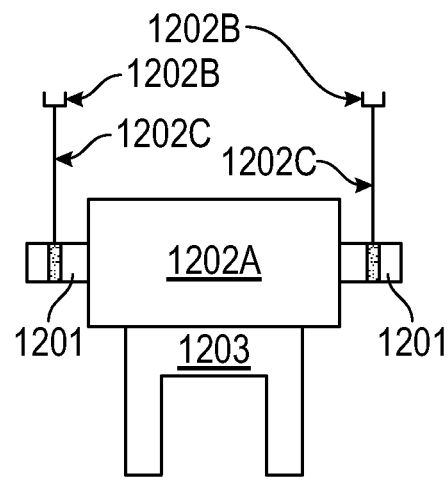
FIG. 12B depicts an embodiment of an applicator and an embodiment of a tube having a first end and a second end mounted to the applicator.

FIG. 12B depicts an embodiment of an applicator (1202A, 1202B, 1202C) arranged on a supporting structure 1203. The applicator (1202A, 1202B, 1202C) includes a vessel in which microwaves are introduced 1202A, two brackets 1202B, and two elongated supports 1202C. The two elongated supports 1202C are connected to the brackets 1202B, and extend from the brackets 1202B to the first end and second end of the tube 1201. The two elongated supports may include any material, and may be rigid or flexible, thereby permitting the tube to be spring mounted or fixably mounted to the applicator (1202A, 1202B, 1202C). The brackets 1202B may be affixed to any structure or surface, or, alternatively, the elongated supports 1202C may be affixed directly to any structure of surface without the brackets 1202B. The first end and the second end of the tube 1201 may be affixed to the elongated supports 1202C in any manner. The applicator (1202A, 1202B, 1202C), supporting structure 1203, and/or an optional additional material 1220 may be configured to position the tube 1201 in any manner depicted at FIG. 12F, FIG. 12G, FIG. 12H, and/or FIG. 12I.

Figure 12C:
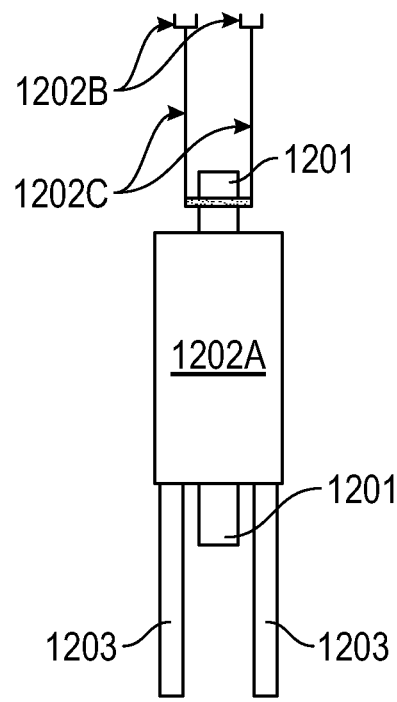
FIG. 12C depicts an embodiment of an applicator and an embodiment of a tube having a first end mounted to the applicator.

FIG. 12C depicts an embodiment of an applicator (1202A, 1202B, 1202C) arranged on a supporting structure 1203. The applicator (1202A, 1202B, 1202C) includes a vessel in which microwaves are introduced 1202A, two brackets 1202B, and two elongated supports 1202C. The two elongated supports 1202C are connected to the brackets 1202B, and extend from the brackets 1202B to the first of the tube 1201. The two elongated supports may include any material, and may be rigid or flexible, thereby permitting the tube to be spring mounted or fixably mounted to the applicator (1202A, 1202B, 1202C). The brackets 1202B may be affixed to any structure or surface, or, alternatively, the elongated supports 1202C may be affixed directly to any structure of surface without the brackets 1202B. The first end of the tube 1201 may be affixed to the elongated supports 1202C in any manner, such as with a collar or a feature of the tube 1201. In alternative embodiments, the (i) applicator of FIG. 12C features only one bracket 1202B and only one elongated support 1202C, (ii) the applicator is supported not by the supporting structure 1203, but in the manner depicted at FIG. 12D. The elongated supports 1202C may be used to lift the tube 1201 partially or completely out of the vessel 1202A, which may assist cleaning, maintenance, removing/refilling the contents of the tube 1201, etc. Although both ends of the tube 1201 of FIG. 12C protrude from the vessel 1202A, it is not necessary for one or both ends to do so. The applicator (1202A, 1202B, 1202C), supporting structure 1203, and/or an optional additional material 1220 may be configured to position the tube 1201 in any manner depicted at FIG. 12F, FIG. 12G, FIG. 12H, and/or FIG. 12I. Although the brackets 1202B and elongated supports 1202C are depicted in FIG. 12C on the "top" end of the vessel 1202A, the brackets 1202B and elongated supports 1202C could be arranged on the "bottom" end of the vessel 1202A, especially if the elongated supports 1202C were rigid.

Figure 11:
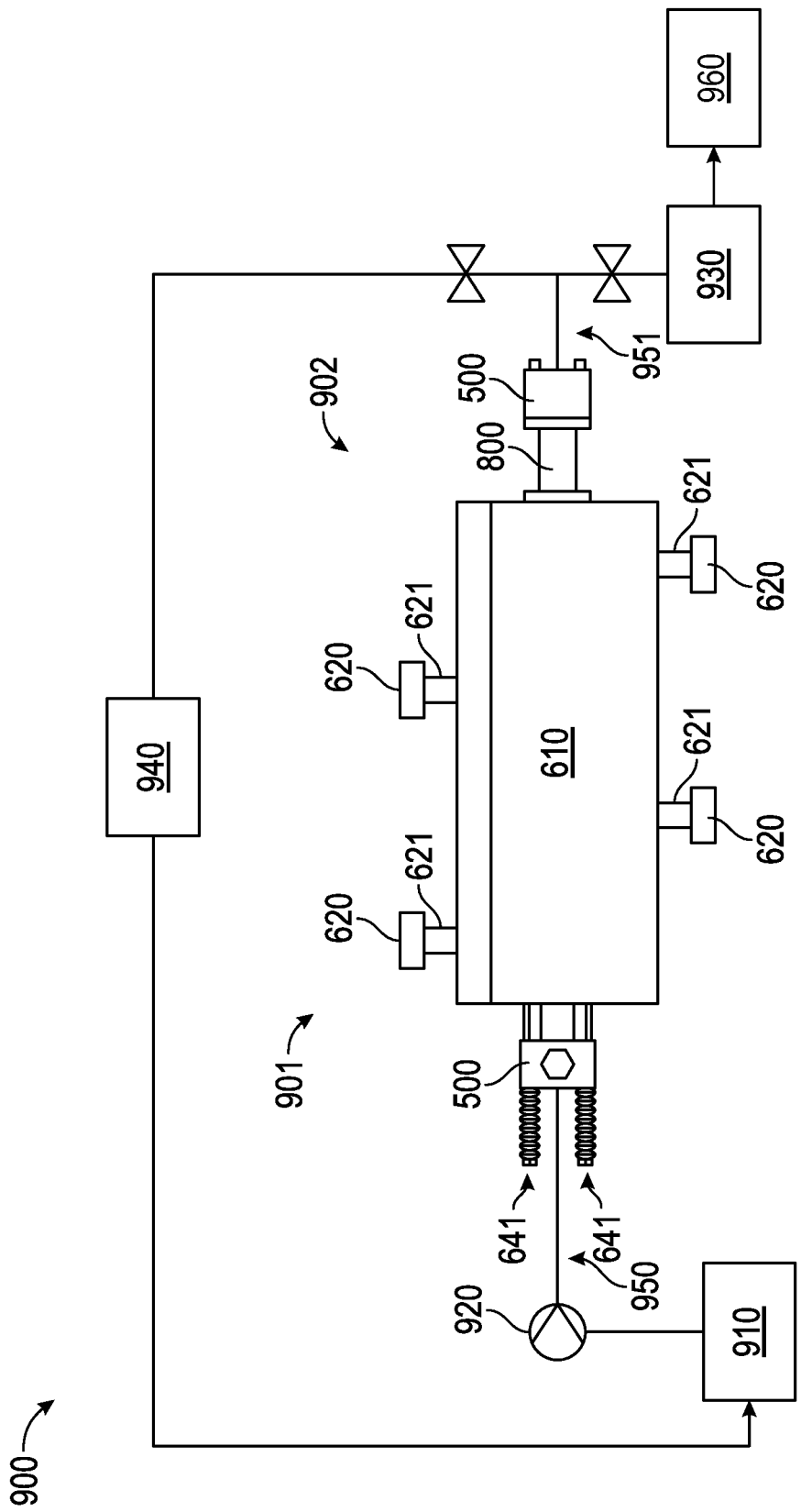
FIG. 11 depicts an embodiment of a system.
Figure 12D:
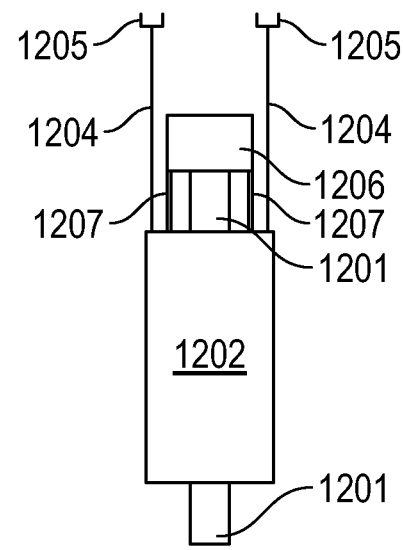
FIG. 12D depicts an embodiment of an applicator and an embodiment of a tube having a first end mounted to the applicator.

FIG. 12D depicts an embodiment of an applicator 1202 that is supported by brackets 1205 and elongated supports 1204 that extend from the brackets 1205 to the applicator 1202. A first end of the tube 1201 is fixably mounted to the applicator 1202 by a head unit 1206 and fasteners 1207 as described herein (see, e.g, FIGS. 7 and 8). In alternative embodiments, the first end of the tube 1201 is spring mounted to the applicator 1202, as depicted, for example, at FIGS. 6A, 6B, 6C, 9A, 9B, 10, and 11. Although both ends of the tube 1201 of FIG. 12D protrude from the vessel 1202, it is not necessary for one or both ends to do so. The applicator (1202), brackets 1205, elongated supports 1204, and/or an optional additional material 1220 may be configured to position the tube 1201 in any manner depicted at FIG. 12F, FIG. 12G, FIG. 12H, and/or FIG. 12I. Although the head unit 1206 is depicted on "top" of the applicator 1202, the head unit 1206 could be arranged on the bottom of the applicator 1202.

Figure 12E:
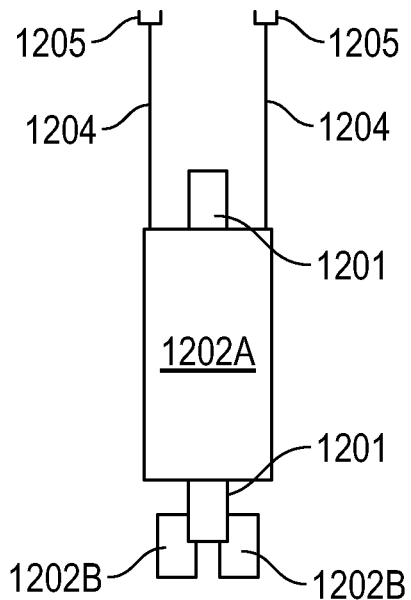
FIG. 12E depicts an embodiment of an applicator and an embodiment of a tube having a first end mounted to the applicator.
Figure 12F:
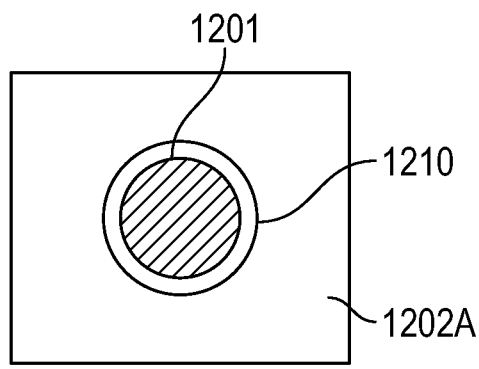
FIG. 12F depicts a cross-sectional view of the embodiment of the applicator depicted at FIG. 12A.
Figure 12G:
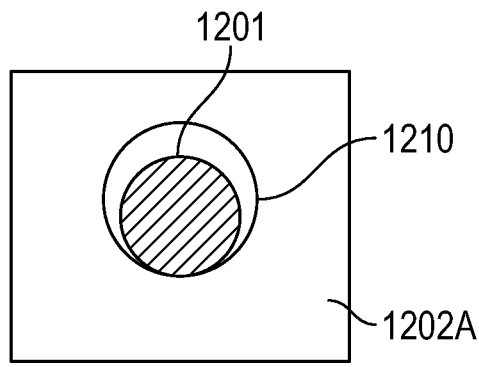
FIG. 12G depicts an embodiment of a tube arranged in an embodiment of an applicator-defined aperture.
Figure 12H:
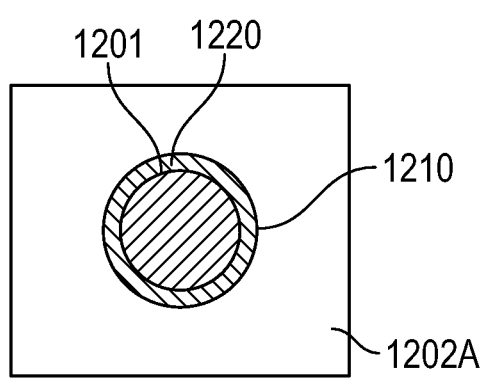
FIG. 12H depicts an embodiment of a tube arranged in an embodiment of an applicator-defined aperture.
Figure 12I:
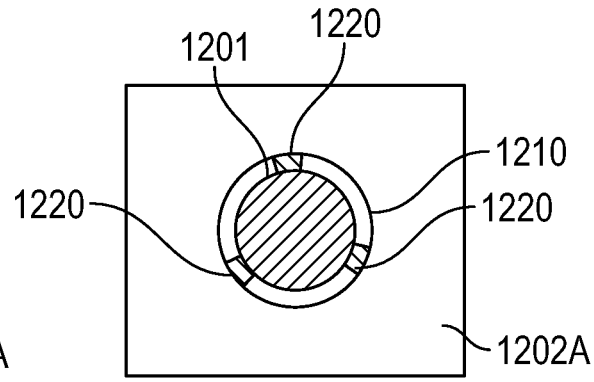
FIG. 12I depicts an embodiment of a tube arranged in an embodiment of an applicator-defined aperture.

FIG. 12E depicts an embodiment of an applicator (1202A, 1202B) that is supported by brackets 1205 and elongated supports 1204 that extend from the brackets 1205 to the applicator 1202. The applicator (1202A, 1202B) includes a vessel in which microwaves are introduced 1202A and two pedestals 1202B. The first end of the tube 1201 is mounted to the pedestals 1202B. In alternative embodiments, the applicator of FIG. 12E features only one pedestal (1202B). The pedestal(s) of FIG. 12E may include an aperture or other feature to permit access to an opening in the first end of the tube. The pedestal(s) 1202B of FIG. 12E may be configured to accommodate a container (e.g., tube) that includes or lacks a head unit, as described herein. The elongated supports 1204 may be used to lift the vessel 1202A, thereby separating the tube 1201 and the vessel 1202A. Although both ends of the tube 1201 of FIG. 12E protrude from the vessel 1202A, it is not necessary for one or both ends to do so. The applicator (1202A, 1202B), brackets 1205, elongated supports 1204, and/or an optional additional material 1220 may be configured to position the tube 1201 in any manner depicted at FIG. 12F, FIG. 12G, FIG. 12H, and/or FIG. 12I.

In some embodiments, the applicator includes a vessel having a first end and a second end, and including one or more chambers defined by one or more outer walls of the vessel, one or more walls inside the vessel, or a combination thereof. The first end and second end of the vessel may include, for example, any two opposite outer walls of the vessel. The first end of the vessel, the second end of the vessel, the one or more walls inside the vessel, or a combination thereof may define an aperture. The aperture(s) may accommodate a tube. For example, a tube may be arranged in the apertures defined by (a) the first end of the vessel, (b) the second end of the vessel, (c) the one or more walls inside the vessel, or (d) a combination thereof.

In some embodiments, the applicator includes one, one to thirty, one to twenty-five, one to fifteen, one to ten, two to ten, two to eight, four to eight, or four to six chamber(s). A microwave generator may be positioned to introduce a plurality of microwaves into a chamber. The number of chambers may be greater than, equal to, or less than the number of microwave generators. A plurality of electromagnetic waves, such as microwaves, may be introduced into a chamber (i) via an aperture defined by an outer wall of the vessel, (ii) by a component of a microwave generator disposed in a chamber, (iii) by a component of a microwave generator disposed in a waveguide, or (iv) a combination thereof. As used herein, the phrase "microwave generator" refers to devices that generate microwaves, including the components of the devices, such as an antenna, coaxial cable, transmission lines, etc. In some embodiments, an electromagnetic wave emission structure includes one or more components of a microwave generator, such as an antenna, coaxial cable, etc. When the methods described herein are performed with electromagnetic waves other than microwaves, the "microwave generators" may be replaced with generators of the other types of electromagnetic waves provided herein.

As used herein, the phrase "introduced into a chamber via an aperture defined by an outer wall of the vessel" refers to and includes introducing microwaves with a microwave generator positioned outside of a chamber, and introducing the microwaves into a chamber via an aperture defined by an outer wall of the vessel. Prior to traversing the aperture, the microwave may pass through a waveguide, coaxial cable, or other transmission line.

As used herein, the phrase "introduced into a chamber by a microwave generator disposed in a chamber" refers to introducing microwaves in a chamber with a microwave generator having at least one component, such as an antenna, that is arranged in a chamber. Other components of such a microwave generator may be arranged outside of the chamber, and may be connected, via a cable, to the one or more components, such as an antenna, that are arranged in the chamber. When microwaves are introduced inside a chamber with an antenna or otherwise, the microwaves may not pass through a waveguide arranged outside of chamber, and the chamber, therefore, may not include a waveguide.

As used herein, the phrase "introduced into a chamber by a microwave generator disposed in a waveguide" refers to generating microwaves with a microwave generator having at least one component, such as an antenna, that is arranged in a waveguide. Other components of such a microwave generator may be arranged outside of the waveguide, and may be connected, via a cable, to the one or more components, such as an antenna, that are arranged in the waveguide. When microwaves are generated inside a waveguide with an antenna or otherwise, the microwaves, before entering the chamber via an aperture defined by an outer wall of the vessel, may traverse at least a portion of the waveguide, including the portion of the waveguide that exists between (i) the component of the microwave generator in the waveguide and (ii) the chamber or aperture of the chamber.

In some embodiments, at least one of the one or more microwave generators is positioned to introduce a plurality of microwaves into at least one of the chambers. Each chamber may be associated with one or more microwave generators. In some embodiments, a first, second, third, etc. microwave generator is positioned to introduce a plurality of microwaves into a first, second, third, etc. chamber, respectively. In some embodiments, the number of chambers exceeds the number of microwave generators. Therefore, a microwave generator may not be positioned at every chamber. In some embodiments, the apparatus includes three to six microwave generators, and four to six chambers. In some embodiments, the number of chambers is less than the number of microwave generators. Therefore, two or more microwave generators may be positioned at one or more of the chambers. The chambers of an applicator may be single mode chambers or multimode chambers. In some embodiments, the chambers of an applicator including a vessel are multimode chambers.

In some embodiments, a susceptor material is irradiated with a plurality of electromagnetic waves that includes electromagnetic waves other than microwaves, and these non-microwave electromagnetic waves may be produced by one or more sources (e.g., a generator, an antenna, etc.) that may be located at any one or more of the locations that are described herein for a microwave generator.

The applicators also may include one or more waveguides. As used herein, the term "waveguide" refers to a device that is (i) arranged between a microwave generator and a chamber, and (ii) includes a passageway through which microwaves pass prior to entering a chamber, wherein the passageway is structured to reduce or eliminate energy loss of the microwaves as they traverse the passageway. A waveguide, therefore, may have any external shape, and the shape and dimensions of the passageway may be configured to reduce or eliminate energy loss of microwaves. When a waveguide is present, it may extend from and/or be attached at or near an aperture of a chamber. A microwave generator may be positioned and/or attached to the other end of the waveguide. The aperture of the chamber from which a waveguide extends and/or is attached may be at least partially covered with an electromagnetic-wave transparent material (e.g., a microwave-transparent material), such as a tile of alumina, TEFLON® polytetrafluoroethylene, fused silica, etc. In some embodiments, a waveguide is arranged between each chamber and microwave generator. One or more of the waveguides may include at least one tuning screw, which may be a feature that permits impedance matching.

Figure 3A:
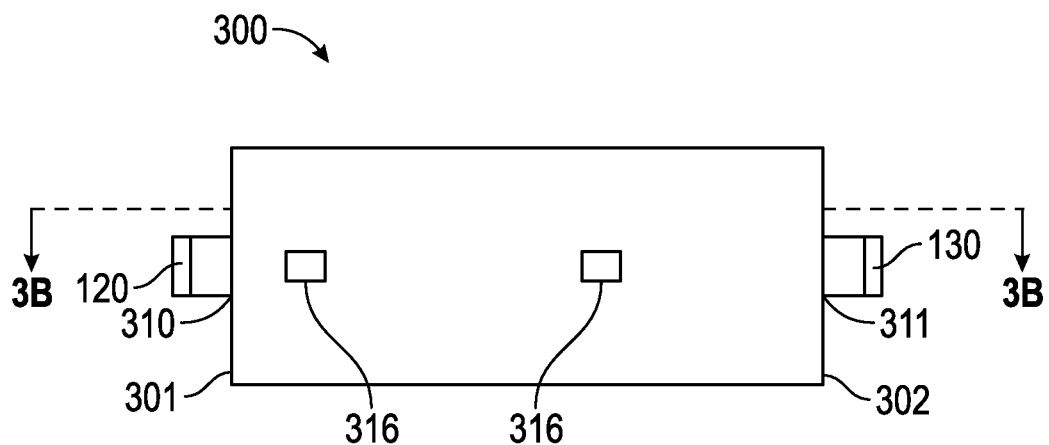
FIG. 3A depicts a side view of an embodiment of an applicator.
Figure 3B:
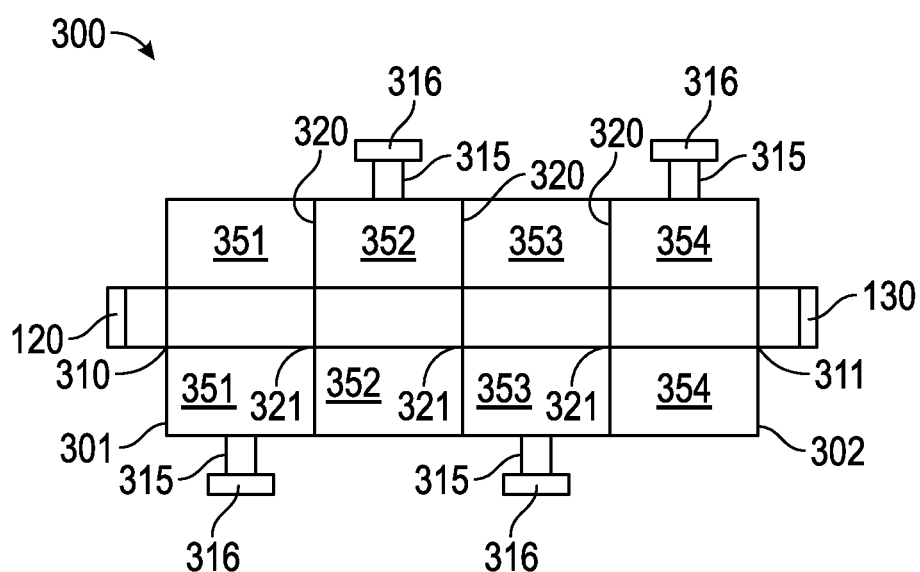
FIG. 3B depicts a cross-sectional view of an embodiment of an applicator.

An embodiment of an applicator and a tube mounted to the applicator is depicted at FIG. 3A and FIG. 3B. FIG. 3A is a side view and FIG. 3B is a cross-sectional of the applicator 300, which includes a first end 301 and a second end 302. The tube of FIG. 1A is arranged in an aperture 310 defined by the first end 301, an aperture 311 defined by the second end 302, and the apertures 321 defined by the three walls 320 that divide the applicator 300 into four chambers (351, 352, 353, 354). Although not depicted, the applicator 300 of FIGS. 3A and 3B could include one or more additional tubes arranged in the apertures (310, 311, 321). Alternatively or additionally, the applicator 300, although not depicted, could define a second set of apertures in which one or more additional tubes are arranged. Extending from each of the four chambers (351, 352, 353, 354) is a waveguide 315. The waveguides 315 of the depicted embodiment appear on alternate sides of the applicator 300, but other configurations are possible and envisioned. A microwave generator 316 is positioned at each of the waveguides 315. Although a microwave generator 316 is positioned at each waveguide of the depicted embodiments, other configurations are possible; for example, a microwave generator may be positioned to introduce microwaves into any combination of the four chambers, e.g., (i) 351-353, (ii) 352-354, (iii) 351, 353, (iv) 352, 354, etc. When a microwave generator is not positioned at a waveguide, the waveguide may be removed, and/or the chamber's corresponding aperture may be closed in any manner. In some embodiments (not shown), the tube 160 of FIG. 1F is arranged in an aperture 310 defined by the first end 301, an aperture 311 defined by the second end 302, and the apertures 321 defined by the three walls 320 that divide the applicator 300 into four chambers (351, 352, 353, 354). Although microwave generators 316 are provided at FIG. 3A and FIG. 3B, generators of other electromagnetic waves, such as those described herein, may be used in other embodiments of the apparatus depicted at FIG. 3A and FIG. 3B. The apparatus of FIG. 3A and FIG. 3B also may be arranged at any angle, as described herein, from 0° (as shown) to 90° during operation, thereby permitting the apparatus to operate in an upflow or downflow mode. Although both ends (120, 130) of the tube protrude from the applicator 300 in FIGS. 3A and 3B, it is not necessary for one or both ends to do so. The applicator 300 and tube of FIGS. 3A and 3B may be arranged according to any one or more of the configurations depicted at FIGS. 12F-12I. For example, the applicator and tube may be arranged in the manner depicted at FIG. 12G (e.g., the tube contacts the applicator at one or more apertures defined by the applicator), and this arrangement may result in a spring mounted tube, or, in other words, the tube can expand/contract relative to the applicator when subjected to the forces of the methods described herein. As a further example, the applicator and tube may be arranged in the manner depicted at FIG. 12H or 12I, and this arrangement may result in a fixably mounted or spring mounted tube, depending, for example, on the characteristics of the material and/or the relationship between the material, tube, and applicator. For example, the material may be or include an adhesive that results in a fixably mounted tube. As a further example, the material may be an elastic material that can accommodate movement (e.g., expansion/contraction) of the tube, thereby resulting in a spring mounted tube. The applicator of FIGS. 3A and 3B may include any one or more features, such as one or more of those depicted at FIGS. 12A-12E.

An applicator may include a solid state microwave applicator. A solid state microwave applicator may include at least one antenna, a power component, and a cable (e.g., a coaxial cable) connecting the power component and each of the least one antenna. One or more antenna may be arranged in a chamber of the applicators disclosed herein, and a wall at least partly defining each chamber may define an aperture that may accommodate a cable of a solid state microwave applicator. For example, an applicator may include six chambers, and any number of the six chambers may include at least one antenna, and the antenna may be connected to one or more power components. One or more antenna may be arranged in a waveguide of the applicators disclosed herein, and any wall defining each waveguide may define an aperture that may accommodate a cable of a solid state microwave applicator. For example, an applicator may include six waveguides, and any number of the six waveguides may include at least one antenna, and the antenna may be connected to one or more power components. As a further example, an applicator may include six chambers and one to six waveguides, and any number of the six chambers and one to six waveguides may include at least one antenna, and the antenna may be connected to one or more power components.

An applicator also may be formed of one modular applicator unit, or at least two modular applicator units. In some embodiments, the applicator includes one to thirty modular applicator units, one to twenty-five modular applicator units, one to twenty modular applicator units, one to fifteen modular applicator units, one to ten modular applicator units, two to ten modular applicator units. In some embodiments, the applicator includes four to six of the modular applicator units.

Each modular unit may include (i) a chamber having a first side and a second side, (ii) a first aperture defined by the first side, (iii) a second aperture defined by the second side, and (iv) a waveguide extending from a third aperture of the chamber. Each modular applicator unit of an applicator may be identical, or at least two of the modular applicator units may differ in any manner, such as the dimensions of a chamber, the dimensions of a waveguide, the orientation of a chamber, waveguide, and/or aperture, or a combination thereof. Whether identical or different, any two modular units of an applicator may be oriented in the same manner. The chamber of each modular unit may be a single mode chamber or a multimode chamber. In some embodiments, the chamber of each modular unit is a single mode chamber.

Figure 4A:
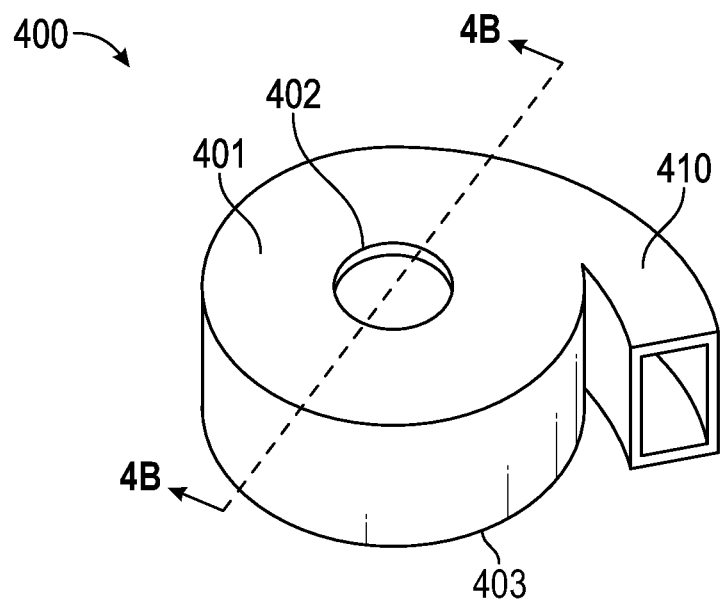
FIG. 4A depicts a perspective view of an embodiment of a modular applicator unit.
Figure 4B:
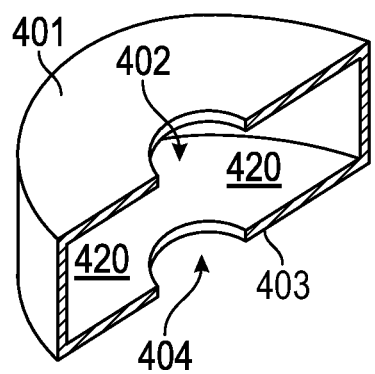
FIG. 4B depicts a cross-sectional view of the modular applicator unit of FIG. 4B.

An embodiment of a modular applicator unit is depicted at FIG. 4A (perspective view) and FIG. 4B (cross-sectional view). The modular applicator unit 400 includes a first side 401 and a second side 403, and a first aperture 402 and a second aperture 404 defined by the first side 401 and second side 403, respectively. The modular applicator unit 400 also includes a waveguide 410 and a chamber 420. The chamber 420 of FIG. 4A and FIG. 4B is an example of a non-polygonal chamber, but other chambers are envisioned.

Although not depicted, the modular applicator unit 400 could define a second set of apertures (e.g., a third aperture defined by the first side 401, and a fourth aperture defined by the second side 403), thereby permitting two tubes to traverse the modular applicator unit 400.

In some embodiments, at least two of the modular applicator units are arranged adjacent to each other, and a tube is arranged in the first and second apertures of the adjacent modular applicator units. In some embodiments, one to thirty modular applicator units, or two to ten modular applicator units are arranged adjacent to each other, and the tube is arranged in the first aperture and the second aperture of each modular applicator unit. When two modular applicator units are adjacent to each other, the two modular applicator units may or may not contact each other. When two modular applicator units contact each other, the two modular applicator units may be adjoined in any manner. For example, two modular applicator units may be fixably mounted to each other. In some embodiments, the modular applicator units include one or more structural features, such as corresponding male and female structural features, which may permit or ease the arrangement and/or adjoining of two modular applicator units.

In some embodiments, at least one of the one or more microwave generators is positioned to introduce a plurality of microwaves into at least one of the one to thirty modular applicator units. In some embodiments, the apparatus includes three to six microwave generators, and the applicator is an applicator that includes four to six of the modular applicator units.

Figure 4C:
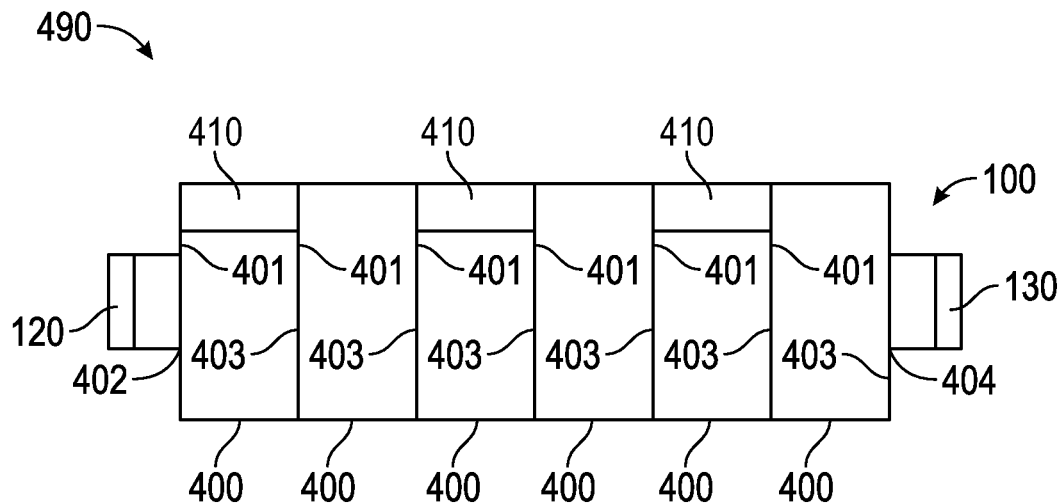
FIG. 4C and FIG. 4D depict side views of an embodiment of an applicator that includes embodiments of modular applicator units.
Figure 4D:
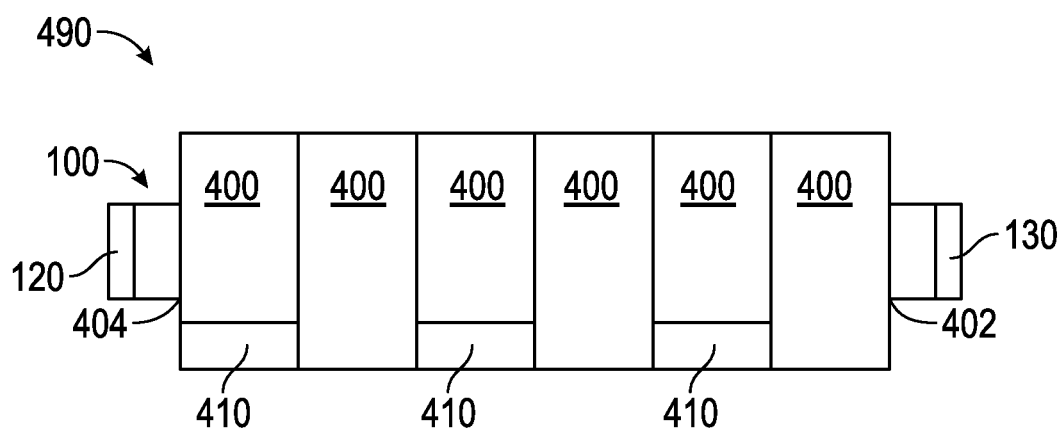

An embodiment of an applicator and a tube mounted to the applicator is depicted at FIG. 4C (side view) and FIG. 4D (side view). The applicator 490 includes 6 adjacent modular applicator units 400 depicted at FIG. 4A and FIG. 4B. The applicator units 400 are adjacent to each other and in contact with each other. The first side 401 of each modular applicator unit 401 contacts the second side 403 of each adjacent modular applicator unit 400. The tube 100 depicted at FIG. 1A is arranged in the first aperture 402 and second aperture 404 (see FIG. 4B) of each modular applicator unit 400. Although not depicted, the applicator 490 of FIGS. 4C and 4D could include one or more additional tubes arranged in the apertures (402, 404). Alternatively or additionally, the applicator 490, although not depicted, could define additional apertures (as explained above regarding FIG. 4A) in which one or more additional tubes are arranged. The modular applicator units 400 are oriented so that three waveguides 410 extend from the side of the device depicted at FIG. 4C, and three waveguides 410 extend from the other side of the device depicted at FIG. 4D. Other orientations, however, are possible and envisioned. As depicted, for example, at FIG. 3A and FIG. 3B, microwave generator may be positioned at one or more of the waveguides 410. In some embodiments (not shown), the tube 160 depicted at FIG. 1F is arranged in the first aperture 402 and second aperture 404 (see FIG. 4B) of each modular applicator unit 400. The apparatus of FIG. 4C and FIG. 4D also may be arranged at any angle, as described herein, from 0° (as shown) to 90° during operation, thereby permitting the apparatus to operate in an upflow or downflow mode. Although both ends (120, 130) of the tube protrude from the applicator 490 in FIGS. 4C and 4D, it is not necessary for one or both ends to do so. The applicator 490 and tube of FIGS. 4C and 4D may be arranged according to any one or more of the configurations depicted at FIGS. 12F-12I. For example, the applicator and tube may be arranged in the manner depicted at FIG. 12G (e.g., the tube contacts the applicator at one or more apertures defined by the applicator), and this arrangement results in a spring mounted tube because the tube is allowed to move relative to the applicator. As a further example, the applicator and tube may be arranged in the manner depicted at FIG. 12H or 12I, and this arrangement may result in a fixably mounted or spring mounted tube, depending, for example, on the characteristics of the material and/or the relationship between the material, tube, and applicator. The applicator of FIGS. 4C and 4D may include any one or more features, such as one or more of those depicted at FIGS. 12A-12E.

A tube may be mounted to an applicator in any manner. As described herein, a tube can be mounted to an applicator by mounting (i) a portion of the tube, such as a cap, to an applicator, and/or (ii) a separate device that contacts a tube, such as a head unit, to an applicator (see, e.g., FIGS. 12A-12E). In some embodiments, a tube is spring mounted to an applicator. In some embodiments, a tube is fixably mounted to an applicator. In some embodiments, one part of a tube, such as a first end, is fixably mounted or spring mounted to an applicator, and another part of the tube, such as a second end, is fixably mounted or spring mounted to an applicator.

When a tube is mounted, either fixably mounted or spring mounted, to an applicator, a part of the tube, such as a first cap or second cap, or another part of the apparatus, such as a first or second head unit in contact with a tube, may be mounted (i) directly to a vessel of an applicator or one of the modular applicator units of the applicator, or (ii) to another part of the applicator, such as a mounting apparatus. The mounting apparatus may be a separate part (i.e., not connected to a vessel or modular applicator unit) that permits a portion of a tube to be mounted to an applicator. Non-limiting examples of mounting apparatuses include the pedestals, brackets, and elongated supports (e.g., hangers, chains, cables, ropes, wires, piping, hoses, etc.) of FIGS. 12A-12E. Therefore, the mounting apparatuses may include piping, hoses, or any connecting lines used in the systems provided herein.

As used herein, the phrase "spring mounted" describes a connection between two objects that is configured to be elastic, and, therefore, allows a first of the two objects to (i) move relative to the second object upon the application of a force to the first object, and (ii) return to a position at or near its original position upon removal of the force. A force, for example, may be applied by the expansion of part of an apparatus, such as a tube, that may occur during heating. When an end of a tube is spring mounted to an applicator, the apparatuses herein may include one or more devices for detecting (i) a force imparted by the thermal expansion of a tube, (ii) a distance a spring mounted object moves, or (iii) a combination thereof. For example, a distance-detecting laser may be fixably mounted to a spring mounted object (e.g., a head unit as described herein), and a change in distance determined by the laser and a spring constant may be used to calculate force. As a further example, a load cell may be used to detect or determine one or more forces.

In some embodiments, (i) the first end of a tube is spring mounted to an applicator, (ii) the second end of a tube is fixably mounted to an applicator, (iii) the first end of a tube is spring mounted to an applicator and the second end of a tube is fixably mounted to an applicator, (iv) the first end of a tube is fixably mounted to an applicator, (v) the second end of a tube is spring mounted to an applicator, (vi) the first end of a tube is fixably mounted to an applicator and the second end of a tube is spring mounted to an applicator, or (vii) the first end of a tube is spring mounted to an applicator and the second end of a tube is spring mounted to an applicator.

The apparatuses herein may include at least one head unit that is configured to (i) contact a tube, such as an end of a tube, and (ii) be mounted in any manner to an applicator. A head unit, for example, may be mounted to a vessel, a modular applicator unit, or a mounting apparatus. A head unit may be mounted with one or more fasteners, such as a threaded fastener (e.g., a threaded or partially threaded bolt, screw, etc.). When a threaded or partially threaded fastener is used to secure a component to an applicator, the applicator may include a corresponding feature for receiving the threaded or partially threaded fastener, such as a threaded or partially threaded depression, a threaded or partially threaded socket protruding from the applicator, an aperture in which the fastener is arranged and secured with a nut, etc. In some embodiments, a head unit is mounted with one to thirty fasteners, one to twenty-five fasteners, one to twenty fasteners, one to fifteen fasteners, one to ten fasteners, one to eight fasteners, one to six fasteners, one to four fasteners, one to three fasteners, two fasteners, or one fastener. A head unit may be mounted by welding. A head unit may be an integral component of a vessel or modular applicator unit of an applicator. An apparatus may include one head unit, two head units, or more, and any feature described herein of "a first head unit" or "a second head unit" may be a feature of "a second head unit" or "a first head unit", respectively, or any other head unit.

In some embodiments, the apparatuses herein include (i) a first head unit that defines a first aperture, (ii) a first fastener having a first end and a second end, wherein the first fastener is slidably arranged in the first aperture, and the second end of the first fastener is fixably mounted to the applicator, and (iii) a first elastically compressible apparatus arranged between the first head unit and the first end and/or second end of the first fastener.

In some embodiments, the apparatuses herein include (i) a first head unit that defines a first aperture and a second aperture, (ii) a first fastener having a first end and a second end, wherein the first fastener is slidably arranged in the first aperture, and the second end of the first fastener is fixably mounted to the applicator, (iii) a second fastener having a first end and a second end, wherein the second fastener is slidably arranged in the second aperture, and the second end of the first fastener is fixably mounted to the applicator, (iv) a first elastically compressible apparatus arranged between the first head unit and the first end and/or the second of the first fastener; and (v) a second elastically compressible apparatus arranged between the first head unit and the first end and/or second end of the second fastener, wherein the first end of the tube and first head unit contact each other. In some embodiments, the apparatus also includes (i) a third aperture defined by the first head unit, (ii) a third fastener having a first end and a second end, wherein the third fastener is slidably arranged in the third aperture, and the second end of the third fastener is fixably mounted to the applicator, (iii) a third elastically compressible apparatus arranged between the first head unit and the first end and/or second end of the third fastener. In some embodiments, the apparatus also includes (i) a fourth aperture defined by the first head unit, (ii) a fourth fastener having a first end and a second end, wherein the fourth fastener is slidably arranged in the fourth aperture, and the second end of the fourth fastener is fixably mounted to the applicator, and (iii) a fourth elastically compressible apparatus arranged between the first head unit and the first end and/or second end of the fourth fastener. When more than four fasteners having a first end and a second end are used to mount a head unit, then an elastically compressible apparatus may be arranged between the first head unit and each of the first ends and/or second ends of the more than four fasteners.

As used herein, the phrases "slidably mounted", "slidably arranged", and the like describe a connection between two objects that facilitates movement of at least one of the objects relative to the other object, either freely or upon the application of a force.

As used herein, the phrase "elastically compressible apparatus" refers to an active or passive apparatus that is configured to deviate from an original shape and/or position and return to the original shape and/or position upon application or removal of one or more forces. Generally, the elastically compressible apparatuses may be arranged at any position in the apparatuses provided herein (e.g., between a head unit and a vessel, between a head unit and a spacer block, between a head unit and a first end of a faster, between a head unit and a second end of a fastener, etc.). The elastically compressible apparatuses may be located at positions to accommodate the expansion of any component of the apparatuses provided herein, including, but not limited to, a tube, a head unit, a spacer block, etc. The elastically compressible apparatuses (such as the first, second, third, and fourth elastically compressible apparatuses) may be the same or different. The elastically compressible apparatuses (such as the first, second, third, and fourth elastically compressible apparatuses) may include a spring, a pneumatic apparatus, such as a pneumatic piston, a hydraulic apparatus, such as a hydraulic cylinder, etc. The spring may include a coiled spring. The spring, in some embodiments, includes one or more disc springs slidably mounted on one or more fasteners, such as the first fastener, the second fastener, the third fastener, or the fourth fastener, respectively. The spring, in some embodiments, includes two or more disc springs slidably mounted on one or more fasteners, such as the first fastener, the second fastener, the third fastener, or the fourth fastener, respectively. In some embodiments, 1 to 1,000, 1 to 750, 1 to 500, 1 to 250, 1 to 100, 1 to 50, 1 to 25, or 2 to 24 disc springs are slidably mounted on the one or more fasteners, such as the first fastener, the second fastener, the third fastener, or the fourth fastener, respectively.

In some embodiments, the head unit includes at least one plate, and a portion configured to receive an end of a tube. In some embodiments, the apparatus includes a first head unit that includes (i) a portion configured to receive an end of a tube, and (ii) a plate that defines a first aperture, (iii) a first fastener having a first end and a second end, wherein the first fastener is slidably arranged in the first aperture, and the second end of the first fastener is fixably mounted to the applicator, and (iv) a first elastically compressible apparatus arranged between the plate and the first end and/or second end of the first fastener, wherein the portion configured to receive an end of a tube is (a) arranged between the applicator and the plate, and (b) in contact with the plate and the tube. The portion configured to receive an end of a tube may include a non-flat surface (e.g., rounded, curved, tapered, etc.) that contacts the plate. The plate may have a substantially flat surface that contacts a non-flat surface of the portion configured to receive an end of a tube. The non-flat surface may permit the portion configured to receive an end of a tube to move relative to the plate when a force is applied to the portion configured to receive an end of a tube, such as a force that may be applied during the methods described herein. The plate may include a non-flat surface (e.g., rounded, curved, tapered, etc.) that contacts the portion configured to receive an end of a tube. The portion configured to receive an end of a tube may have a substantially flat surface that contacts a non-flat surface of plate. The non-flat surface of the plate may permit the portion configured to receive an end of a tube to move relative to the plate when a force is applied to the portion configured to receive an end of a tube, such as a force that may be applied during the methods described herein. In some embodiments, the portion configured to receive an end of a tube includes a flat surface that contacts a corresponding flat surface of the plate.

In some embodiments, the apparatus includes a first head unit that includes (i) a portion configured to receive an end of a tube, and (ii) a plate that defines a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the plate and the first end and/or second end of the first fastener, and a second elastically compressible apparatus arranged between the plate and the first end and/or second end of the second fastener, wherein the portion configured to receive an end of a tube is (a) arranged between the applicator and the plate, and (b) in contact with the plate and the tube. In some embodiments, the apparatus includes a third aperture defined by the plate, a third fastener having a first end and a second end, wherein the third fastener is slidably arranged in the third aperture, and the second end of the third fastener is fixably mounted to the applicator, and a third elastically compressible apparatus arranged between the plate and the first end and/or second end of the third fastener. In some embodiments, the apparatus includes a fourth aperture defined by the plate, a fourth fastener having a first end and a second end, wherein the fourth fastener is slidably arranged in the fourth aperture, and the second end of the fourth fastener is fixably mounted to the applicator, and a fourth elastically compressible apparatus arranged between the plate and the first end and/or second end of the fourth fastener. The first, second, third, and fourth elastically compressible apparatus may be the same or different. In some embodiments, the first, second, third, or fourth elastically compressible apparatus includes one or more disc springs slidably mounted on the first fastener, the second fastener, the third fastener, or the fourth fastener, respectively, of the first head unit. In some embodiments, the apparatus includes 1 to 1,000, 1 to 750, 1 to 500, 1 to 250, 1 to 100, 1 to 50, 1 to 25, or 2 to 24 disc springs slidably mounted on the first fastener, the second fastener, the third fastener, or the fourth fastener, respectively, of the first head unit.

In some embodiments, the one or more disc springs of the apparatuses herein include KEY BELLEVILLES® disc springs (USA), which may be commonly referred to as "BELLEVILLE® Washers".

A first head unit may contact a portion of a tube, such as a first end of a tube. The first head unit may include a first seal, wherein a portion of a tube, such as a first end of a tube, contacts the first seal. The first seal may include any known seal, and may be selected to prevent or eliminate the likelihood of fluid leakage, and/or withstand one or more parameters of the methods herein, such as pressure. The first seal may be arranged at any position that allows it to contact a first end of a tube and a first head unit. For example, a first seal may (i) circumvent an outer surface of a tube (e.g., a circumference of a substantially cylindrical tube), (ii) contact a terminal portion of a tube (e.g., a surface defining an inlet), or (iii) a combination thereof.

In some embodiments, the first seal includes rubber. For example, the first seal may include a rubber ring, which may be substantially circular when the portion of the tube, such as a first end (e.g., first cap), that contacts the first head unit is substantially cylindrical. In some embodiments, the first seal includes metal, such as a metal ring. In some embodiments, a first head unit includes a depression configured to receive a portion of a tube, such as a first end of the tube (e.g., first cap). The first seal, when present, may be arranged in the depression. In some embodiments, the first head unit includes a depression configured to receive at least a portion of a seal, and a seal is arranged in the depression of the first head unit. In some embodiments, the tube (e.g., a cap) includes a depression configured to receive at least a portion of a seal, and a seal is arranged in the depression of the tube. The depression of the tube may be located in a cap or other portion of the tube, and may, in some embodiments, circumvent an outer surface of the tube (e.g., a circumference of a substantially cylindrical tube). In some embodiments, the first head unit includes a depression configured to receive a first portion of a seal, and a tube (e.g., a cap) includes a depression configured to receive a second portion of the seal, and the seal is arranged in the depressions of the first head unit and the tube. The first head unit generally may have any shape that is capable of accommodating the apertures and contacting a tube.

As used herein, the term "seal", the phrase "first seal", the phrase "second seal", and the like refer to a closure between two objects that eliminates or reduces the likelihood of fluid leakage between the two objects. A "seal" may include (i) contact between the two objects (e.g., two objects that are welded, brazed, fastened, clamped, adhered together with an adhesive, etc.), (ii) a device arranged between and in contact with both of the two objects, or (iii) a combination thereof. The device arranged between and in contact with both of the two objects may include, for example, a rubber seal (e.g., a VITON® rubber seal), a metal seal (e.g., a PARKER HANNIFIN® metal seal), a gasket, etc.

A head unit may define one or more apertures configured to provide fluid to an inlet of a tube, or permit a fluid exiting an outlet of a tube to exit the head unit. The one or more apertures may include one or more channels, such as those depicted at FIG. 5C. A head unit may define one or more apertures in which a fastener for securing a clamp or other device is slidably arranged.

Figure 5A:
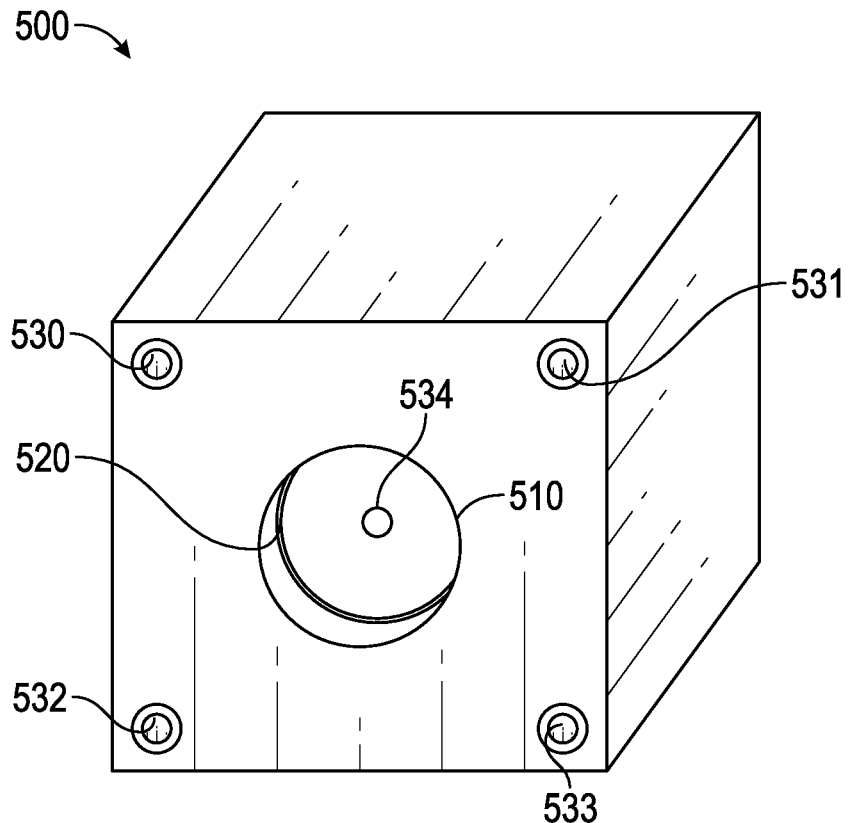
FIG. 5A depicts an embodiment of a head unit.

An embodiment of a head unit is depicted at FIG. 5A. The head unit 500 includes a depression 510 configured to receive a first end of a tube, and a ring-shaped seal 520, which may be a metal or rubber seal, arranged in the depression 510. The head unit 500 also defines four apertures (530, 531, 532, 533) in which a fastener may be slidably arranged. The head unit 500 also defines an aperture 534, which can permit a fluid to be provided to an inlet of a tube. A first head unit, a second head unit, or both a first head unit and a second head unit may have the structure depicted at FIG. 5A.

Figure 5B:
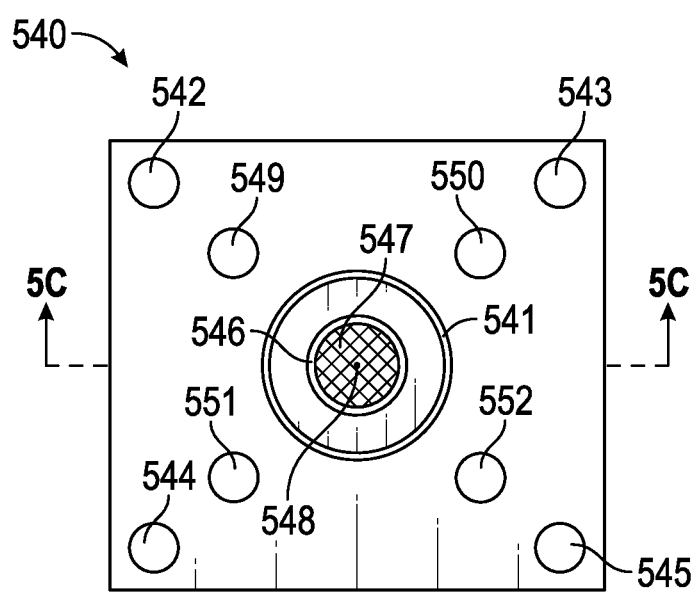
FIG. 5B depicts a front view of an embodiment of a head unit.
Figure 5C:
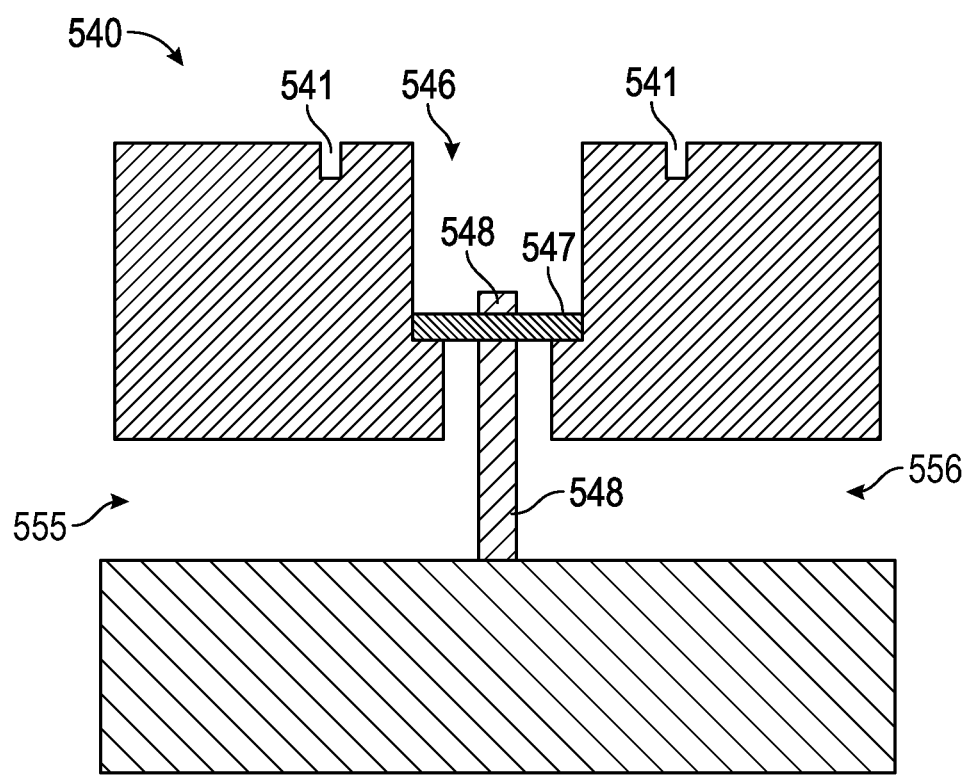
FIG. 5C depicts a cross-sectional view of the head unit of FIG. 5B.

Another embodiment of a head unit is depicted at FIG. 5B (front view) and FIG. 5C (cross-sectional view). The head unit 540 defines a first circular depression 541 configured to receive a ring-shaped seal, which may be a metal or rubber seal, arranged in the first circular depression 541. The head unit 540 also defines four apertures (542, 543, 544, 545) in which a fastener may be slidably arranged. The head unit 540 also defines a second circular depression 546, and includes a screen 547 that is fixably mounted in the second circular depression 546 with a screw 548. The head unit 540 also defines four apertures (549, 550, 551, 552) which may accommodate part of a clamp or other device. The head unit 540 includes two channels (555, 556), one or both of which may be used to direct fluid to the second circular depression 546, or remove fluid from the second circular depression 546.

Figure 5D:
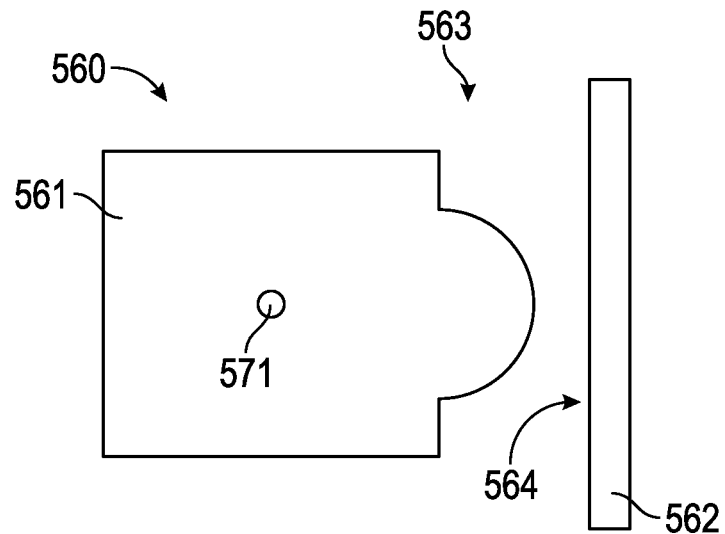
FIG. 5D depicts a side view of an embodiment of a head unit.
Figure 5E:
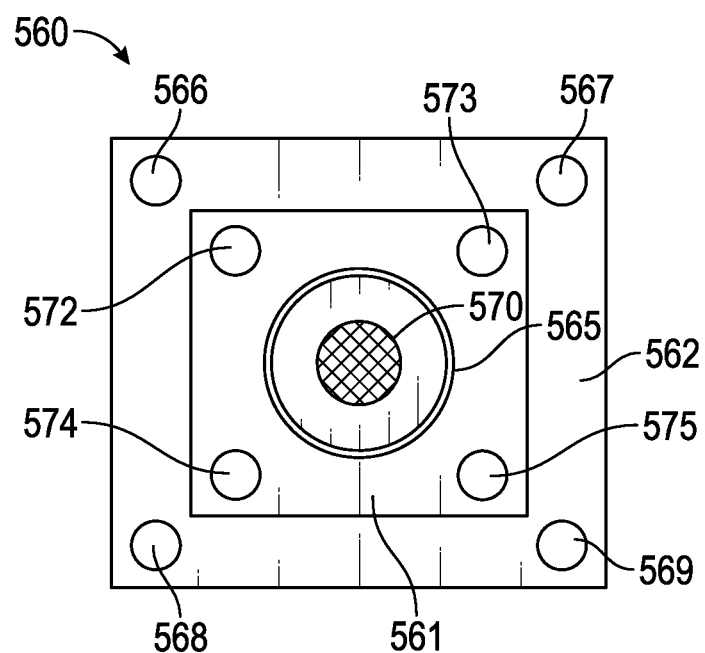
FIG. 5E depicts a side view of the head unit of FIG. 5D.
Figure 10:
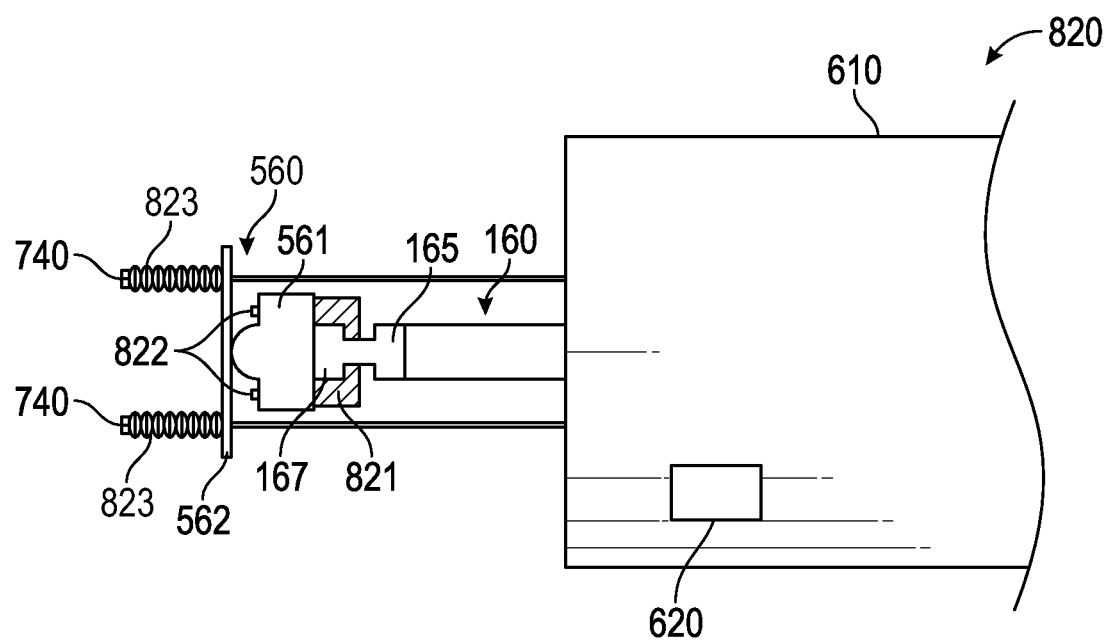
FIG. 10 depicts an embodiment of an apparatus that includes an embodiment of a spring mounted head unit.

Another embodiment of a head unit is depicted at FIG. 5D (side view) and FIG. 5E (side view). The head unit 560 includes two pieces: a portion 561 configured to receive an end of a tube, and a plate 562. The portion 561 configured to receive an end of a tube includes a rounded surface 563 that contacts a flat surface 564 of the plate 562 when the head unit 560 is deployed, for example, as depicted at FIG. 10. The head unit 560 defines a first circular depression 565 configured to receive a ring-shaped seal, which may be a metal or rubber seal, arranged in the first circular depression 565. The plate 562 of the head unit 560 also defines four apertures (566, 567, 568, 569) in which a fastener may be slidably arranged. The head unit 560 also defines a second circular depression 570, which may receive an end of a tube, and permit a fluid to be disposed in a tube or removed from the head unit 560 via the aperture 571 of FIG. 5D, which is in fluid communication with the second circular depression 570. The head unit 560 also defines four apertures (572, 573, 574, 575) which may accommodate part of a clamp or other device.

In some embodiments, a tube may include a cap, and the cap may be welded to, clamped to, or include a head unit (e.g., a cap and a head unit are integral parts of a single object). A seal, therefore, may not be included.

In some embodiments, the apparatus also includes a second head unit that defines a first aperture, a first fastener having a first end and a second end, wherein the first fastener is slidably arranged in the first aperture, and the second end of the first fastener is fixably mounted to the applicator, and a first elastically compressible apparatus arranged between the second head unit and the first end and/or second end of the first fastener.

In some embodiments, the apparatus also includes a second head unit that defines a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the second head unit and the first end and/or second end of the first fastener, and a second elastically compressible apparatus arranged between the second head unit and the first end and/or second end of the second fastener, wherein the second end of the tube and second head unit contact each other. In some embodiments, the apparatus includes a third aperture defined by the second head unit, a third fastener having a first end and a second end, wherein the third fastener is slidably arranged in the third aperture, and the second end of the third fastener is fixably mounted to the applicator, and a third elastically compressible apparatus arranged between the second head unit and the first end and/or second end of the third fastener. In some embodiments, the apparatus includes a fourth aperture defined by the second head unit, a fourth fastener having a first end and a second end, wherein the fourth fastener is slidably arranged in the fourth aperture, and the second end of the fourth fastener is fixably mounted to the applicator, and a fourth elastically compressible apparatus arranged between the second head unit and the first end and/or second end of the fourth fastener. The first, second, third, and fourth elastically compressible apparatus may be the same or different as those selected for a first head unit. In some embodiments, the first, second, third, or fourth elastically compressible apparatus includes one or more disc springs slidably mounted on the first fastener, the second fastener, the third fastener, or the fourth fastener, respectively, of the second head unit. In some embodiments, the apparatus includes 1 to 1,000, 1 to 750, 1 to 500, 1 to 250, 1 to 100, 1 to 50, 1 to 25, or 2 to 24 disc springs slidably mounted on the first fastener, the second fastener, the third fastener, or the fourth fastener, respectively, of the second head unit.

A second head unit may contact a portion of a tube, such as a second end of a tube. The second head unit may include a second seal, wherein a portion of a tube, such as a second end (e.g., second cap) of a tube, contacts the second seal. The second seal may include any known seal, and may be selected to prevent or eliminate the likelihood of fluid leakage, and/or withstand one or more parameters of the methods herein, such as pressure. In some embodiments, the second seal includes rubber. For example, the second seal may include a rubber ring, which may be substantially circular when the portion of the tube, such as a second end (e.g., second cap), that contacts the second head unit is substantially cylindrical. In some embodiments, the second seal includes metal, such as a metal ring. In some embodiments, a second head unit includes a depression configured to receive a portion of a tube, such as a second end of the tube (e.g., second cap). The second seal, when present, may be arranged in the depression. In some embodiments, the second head unit includes a depression configured to receive at least a portion of a seal, and a seal is arranged in the depression of the second head unit. In some embodiments, the tube (e.g., a cap) includes a depression configured to receive at least a portion of a seal, and the seal is arranged in the depression of the tube. In some embodiments, the second head unit includes a depression configured to receive a first portion of a seal, and a tube (e.g., a cap) includes a depression configured to receive a second portion of the seal, and the seal is arranged in the depressions of the second head unit and the tube. The second head unit generally may have any shape that is capable of accommodating the apertures and contacting a tube. The second head unit generally may have any shape that is capable of accommodating the apertures and contacting a tube.

Figure 6A:
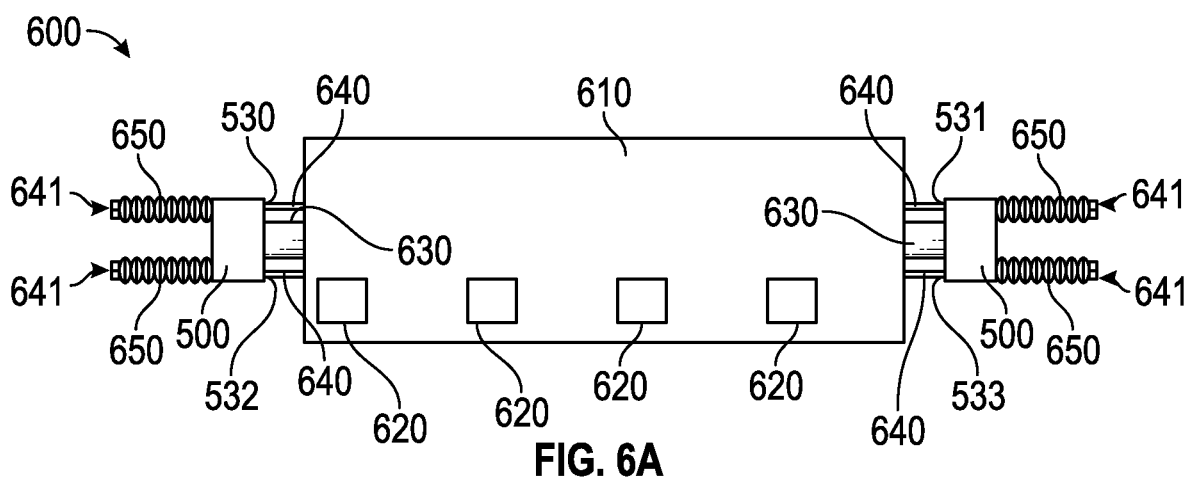
FIG. 6A depicts a side view of an embodiment of an apparatus.
Figure 6B:
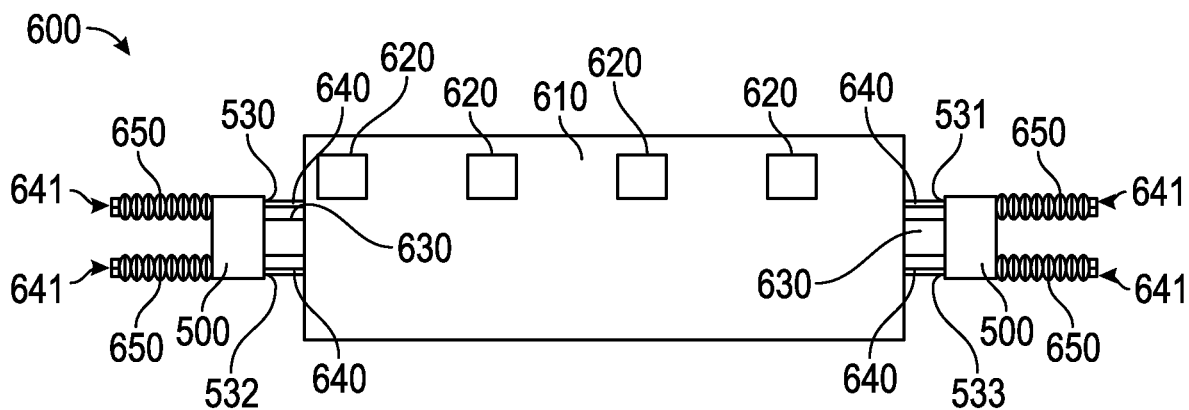
FIG. 6B depicts a side view of an embodiment of an apparatus.
Figure 6C:
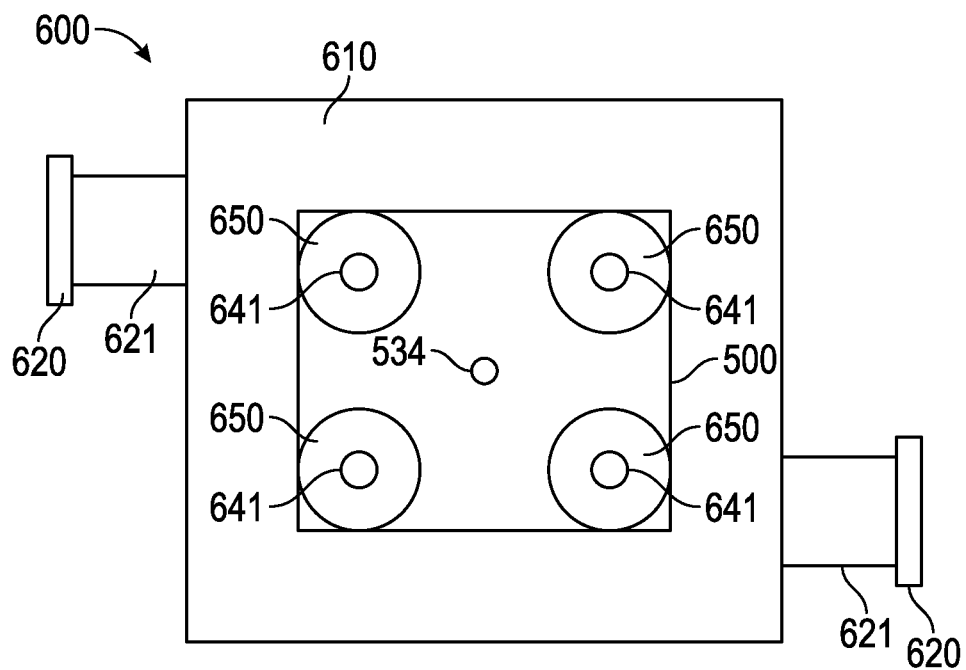
FIG. 6C depicts an end view of an embodiment of an apparatus.

Views of the opposite sides of an embodiment of an apparatus are depicted at FIG. 6A and FIG. 6B, and an end view of the apparatus is depicted at FIG. 6C. The apparatus 600 includes (i) a vessel 610 of an eight-chambered microwave applicator, and (ii) eight microwave generators 620 positioned to introduce microwaves through a waveguide 621 and into each chamber of the vessel 610. A tube 630 is arranged in the vessel 610. Although not depicted, the vessel 610 of FIGS. 6A and 6B could include one or more additional tubes arranged in the vessel 610. Alternatively or additionally, the vessel 610, although not depicted, could define a second set of apertures in which one or more additional tubes are arranged. The tube 630 is spring mounted to the vessel 610 by two of the head units 500 depicted at FIG. 5A. Eight fasteners 640 are used in this embodiment, and each of the eight fasteners 640 is slidably arranged in a separate aperture (530, 531, 532, 533) of the head units 500. The eight fasteners 640 of this embodiment are bolts having a threaded end that is mounted to the vessel, and a second end 641 having an enlargement configured to retain eight pairs of disc springs 650 that are slidably mounted on each of the fasteners 640 between the head units 500 and the second ends 641 of the fasteners 640. The apparatus of FIG. 6A and FIG. 6B also may be arranged, as described herein, at any angle from 0° (as shown) to 90° during operation, thereby permitting the apparatus to operate in an upflow or downflow mode.

In some embodiments, the apparatus includes a head unit that is fixably mounted to the applicator. In some embodiments, the apparatus includes a first head unit and a second head unit, and one or both of the first head unit and the second head unit is fixably mounted to the applicator.

Figure 7:
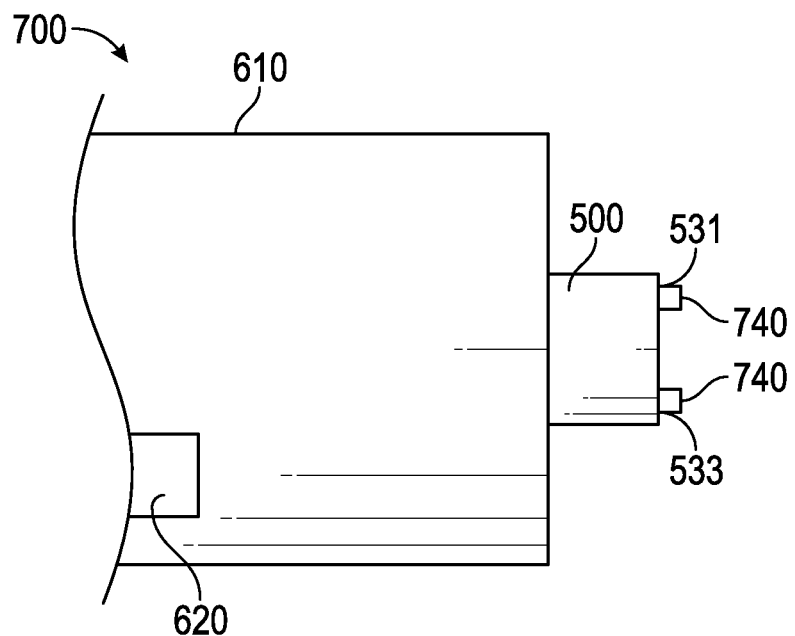
FIG. 7 depicts an embodiment of an apparatus that includes an embodiment of a fixably mounted head unit.

For example, the embodiment of a head unit depicted at FIG. 5A may be fixably mounted to an applicator, as depicted at FIG. 7. FIG. 7 depicts a side view of the right side of the vessel 610 of FIG. 6A, but with a fixably attached head unit 500 of FIG. 5A. The apparatus 700 of FIG. 7 includes the vessel 610 of FIG. 6A, and a second head unit 500 fixably mounted to the vessel by fasteners 740 slidably arranged in the apertures (531, 533 (shown), 530, 532 (not shown)) of the head unit 500. The fasteners have threaded ends (not shown) connected to the vessel 610 and an enlarged end that retains the head unit 500. The left side of the device of FIG. 7 is identical to the left side of FIG. 6A.

Figure 8:
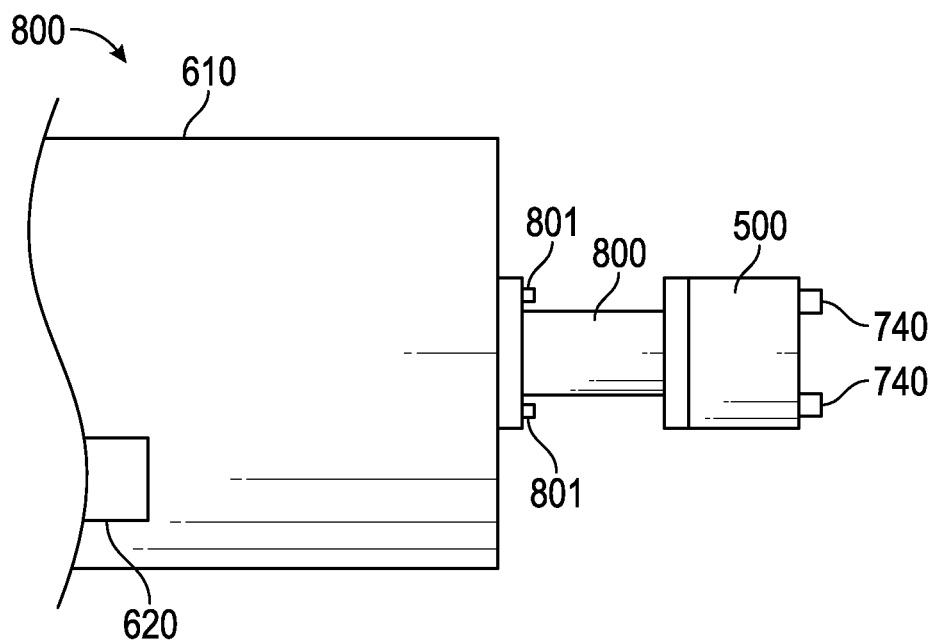
FIG. 8 depicts an embodiment of an apparatus that includes an embodiment of a fixably mounted head unit.

The embodiment of a head unit depicted at FIG. 5A may be fixably mounted to an applicator, as depicted at FIG. 8. FIG. 8 depicts a side view of the right side of the vessel 610 of FIG. 6A, but with a fixably attached head unit 500 of FIG. 5A. The apparatus 800 of FIG. 8 includes the vessel 610 of FIG. 6A, and a second head unit 500 fixably mounted to a spool 800 by fasteners 740 slidably arranged in the apertures (531, 533 (shown), 530, 532 (not shown)) of the head unit 500. The spool 800, in turn, is mounted to the applicator by fasteners 801. The fasteners 740 have threaded ends (not shown) connected to the spool 800 and an enlarged end that retains the head unit 500. The left side of the device of FIG. 7 is identical to the left side of FIG. 6A. In some embodiments (not shown), an elastically compressible apparatus (e.g., one or more disc springs) is mounted on each of the fasteners 740 at a position between the spool 800 and the second head unit 500.

Figure 9A:
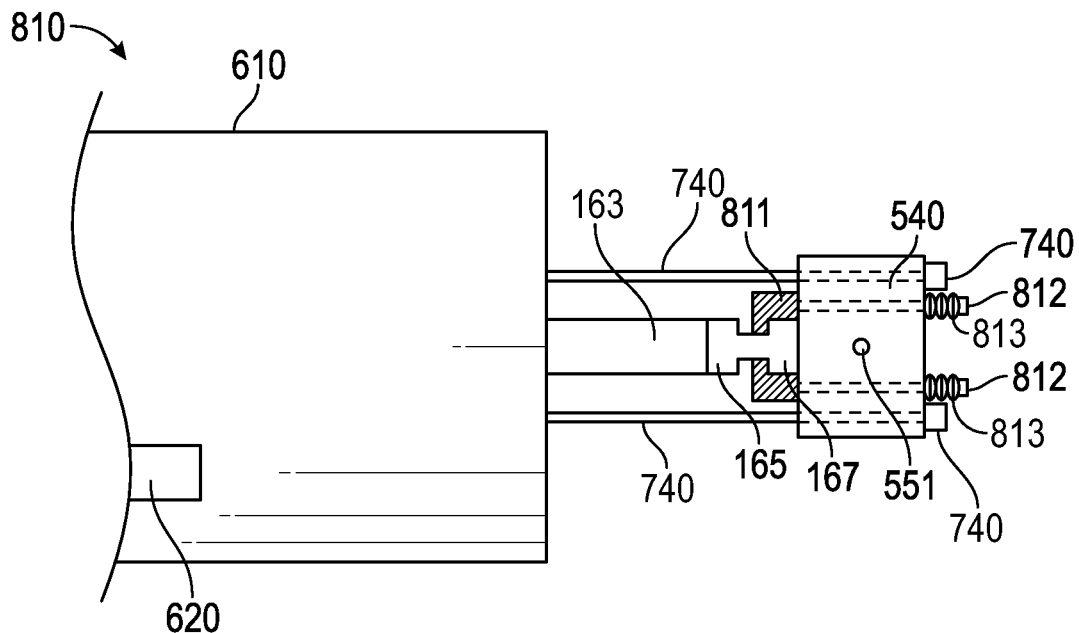
FIG. 9A depicts an embodiment of an apparatus that includes an embodiment of a fixably mounted head unit.

The embodiment of a head unit depicted at FIG. 5B and FIG. 5C may be fixably mounted to an applicator, as depicted at FIG. 9A. FIG. 9A depicts a side view of the right side of the vessel 610 of FIG. 6A, but with (i) the tube 160 of FIG. 1F arranged in the vessel 610, and (ii) the head unit 540 of FIG. 5B and FIG. 5C fixably mounted to the vessel 610. The apparatus 810 of FIG. 9A includes the vessel 610 of FIG. 6A, and a second head unit 540 fixably mounted to the vessel 610 by fasteners 740 slidably arranged in the apertures (543, 545 (shown), 542, 544 (not shown)) of the head unit 540. The flange 167 of the cap 165 of the tube 160 contacts the head unit 540 and a circular seal (e.g., a metal ring (not shown)) disposed in the first circular depression 541 (not shown). The seal of FIG. 9A also includes a clamp 811 that contacts the flange 167 of the cap 165. The clamp 811 is fixably mounted to the head unit 540 with fasteners 812 slidably arranged in the apertures (550, 552 (shown), 549, 551 (not shown)). A series of disc springs 813 are slidably arranged on the fasteners 812. The fasteners (740, 812) have threaded ends (not shown) connected to the vessel 610 and clamp 811, respectively, and an enlarged end having dimensions greater than the corresponding apertures of the head unit 540. The left side of the device of FIG. 9A is identical to the left side of FIG. 6A. In some embodiments, the apparatus depicted at FIG. 9A includes one or more elastically compressible apparatuses arranged between the head unit 540 and the enlarged ends of the fasteners 740. In some embodiments, the apparatus depicted at FIG. 9A includes a spool, such as the spool of FIG. 8, arranged between the head unit 540 and vessel 610. When a spool is included, one or more elastically compressible apparatuses may be slidably arranged on one or more fasteners 740 at a position between the spool and the head unit 540. In some embodiments, the apparatus depicted at FIG. 9A includes a shielding material, such as a microwave shielding material, arranged between the head unit 540 and the vessel 610 (see, for example, FIG. 9B). In some embodiments, one or more of the enlarged ends of the fasteners (740 is welded or brazed to the head unit 540. Although the clamp 811 depicted at FIG. 9A contacts only a portion of the flange 167, a clamp generally may contact any or all of a flange or other feature of a cap.

Figure 9B:
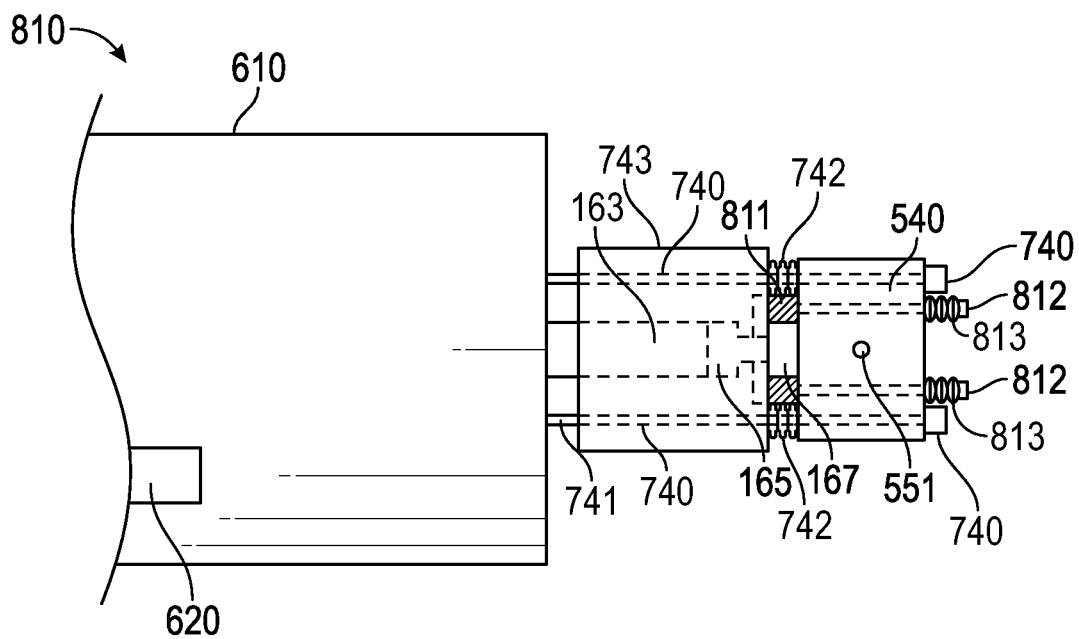
FIG. 9B depicts an embodiment of an apparatus that includes an embodiment of a fixably mounted head unit and an embodiment of a spacer block.

The embodiment of a head unit depicted at FIG. 5B and FIG. 5C may be fixably mounted to an applicator, as depicted at FIG. 9B. FIG. 9B includes the same components as FIG. 9A, as well as a spacer block 743, which may serve as a shielding material, such as a microwave shielding material. The spacer block 743 includes apertures configured to accommodate the tube 163, the cap 165, and the fasteners 740, and, in some embodiments, is a metal spacer block. The fasteners 740 include enlarged portions 741 that maintain a gap between the spacer block 743 and the vessel 610. In some embodiments, a spacer block or other shielding material may contact a vessel, such as the vessel 610 of FIG. 9B. The apparatus depicted at FIG. 9B also includes a series of disc springs 742 that are slidably mounted on the fasteners 740 between the spacer block 743 and the second head unit 540. The disc springs 742 may accommodate an expansion of the first head unit 540 and/or the spacer block 743, which may occur during the methods provided herein.

The embodiment of a head unit depicted at FIG. 5D and FIG. 5E may be fixably mounted to an applicator, as depicted at FIG. 10. FIG. 10 depicts a side view of the left side of the vessel 610 of FIG. 6A, but with (i) the tube 160 of FIG. 1F arranged in the vessel 610, and (ii) the head unit 560 of FIG. 5D and FIG. 5E spring mounted to the vessel 610. The apparatus 820 of FIG. 10 includes the vessel 610 of FIG. 6A, and a first head unit 560 spring mounted to the vessel 610 by fasteners 740 slidably arranged in the apertures (566, 568 (shown), 567, 569 (not shown)) of the plate 562 of the head unit 560. The flange 167 of the cap 165 of the tube 160 contacts (i) the portion 561 of the head unit configured to receive the tube 160 and (ii) a circular seal (e.g., a metal or rubber ring (not shown)) disposed in the first circular depression 565 (not shown). The seal of FIG. 10 also includes a clamp 821 that contacts the flange 167 of the cap 165. The clamp 821 is fixably mounted to the head unit 560 with fasteners 822 slidably arranged in the apertures (572, 574 (shown), 573, 575 (not shown)). The fasteners (740, 822) have threaded ends (not shown) connected to the vessel 610 and clamp 821, respectively, and an enlarged end having dimensions greater than the corresponding apertures of the plate 562 of the head unit 560. The apparatus 820 depicted at FIG. 10 includes eight pairs of disc springs 823 slidably arranged on the fasteners 740 between the plate 562 of the head unit 560 and the enlarged ends of the fasteners 740. The right side of the device of FIG. 10 may be identical to FIG. 9A or FIG. 9B. In some embodiments, the apparatus depicted at FIG. 10 includes a spool, such as the spool of FIG. 8, arranged between the head unit 560 and vessel 610. When a spool is included, one or more elastically compressible apparatuses may be slidably arranged on one or more fasteners 740 at a position between the spool and the head unit 560. In some embodiments, the apparatus depicted at FIG. 10 includes a shielding material, such as a microwave shielding material, arranged between the head unit 560 and the vessel 610. Although the clamp 821 depicted at FIG. 10 contacts only a portion of the flange 167, a clamp generally may contact any or all of a flange or other feature of a cap.

In some embodiments, a head unit is fixably mounted to a tube. For example, (i) a first head unit may be fixably mounted to a first end of the tube, (ii) a second head unit may be fixably mounted to a second end of the tube, or (iii) the first head unit may be fixably mounted to first end of the tube and the second head unit may be fixably mounted to the second end of the tube. A head unit may be fixably mounted to a tube by welding at least a portion of a head unit to at least a portion of a tube. When a tube, for example, includes a metal cap (e.g., a KOVAR® alloy metal cap), the metal cap may be welded to a head unit. In some embodiments, (i) a first head unit is welded to a first end of the tube, (ii) a second head unit is welded to a second end of the tube, or (iii) the first head unit is welded to the first end of the tube and the second head unit is welded to the second end of the tube.

An applicator generally may be made of any material, including a material that is capable of retaining microwaves. In some embodiments, the applicator is formed of a metal, such as stainless steel.

An applicator may have outer walls and/or internal walls (e.g., those dividing chambers of a vessel) of any thickness. In some embodiments, the outer walls and/or internal walls have a thickness of about 0.0002 m to about 0.05 m, about 0.0005 m to about 0.05 m, about 0.001 m to about 0.04 m, about 0.002 m to about 0.03 m, about 0.002 m to about 0.02 m, about 0.002 m to about 0.01 m, about 0.002 m to about 0.05 m, about 0.002 m to about 0.005 m, about 0.003 m to about 0.004 m, or about 0.003 m to about 0.0032 m. A vessel and the chamber(s) of a vessel generally may have any dimensions. If a vessel includes two or more chambers, then each of the chambers may have the same dimensions or different dimensions. A chamber of a vessel or modular unit may be a polygonal chamber (e.g., a cross-sectional shape that is square, rectangular, triangular, etc.) or a non-polygonal chamber (e.g., a cross-sectional shape that is circular, elliptical, etc.). A vessel and/or chamber in a vessel or modular unit may be configured (e.g., dimensioned) as a multimode chamber or a single mode chamber. A vessel and/or chamber in a vessel or modular unit may be configured (e.g., dimensioned) so that at least a portion of the electromagnetic waves, such as a plurality of microwaves, is directed to a tube or a susceptor material in a tube, which may improve heating efficiency.

In some embodiments, the applicators may include one or more sensors. The one or more sensors may include a temperature sensor, such as an infrared temperature sensor. A temperature sensor may be used to monitor or determine a temperature of a tube, such as the external temperature of a tube. One or more chambers of an applicator may include a temperature sensor, which may permit a temperature gradient along a tube to be determined and/or monitored. As a fluid passing through a tube is heated, the temperature of the tube may increase from its first end to its second end. By monitoring or determining this gradient, adjustments may be made to control the temperature gradient in any desirable manner. The one or more sensors may include a distance-detecting sensor. The one or more sensors may be in communication with a controller that adjusts one or more parameters of a component, such as a microwave generator, of an apparatus or system in response to data collected by the one or more sensors. For example, a controller may adjust one or more parameters (e.g., power, frequency, etc.) of a microwave generator in response to data collected from one or more sensors, such as a temperature sensor.

Electronic Wave Emission Structure

In some embodiments, the apparatuses provided herein include an electromagnetic wave emission structure. The electromagnetic wave emission structure may be configured to introduce electromagnetic waves into the internal volume of a container (e.g, tube) for irradiation of the susceptor particles contained in the internal volume.

In some embodiments, the electromagnetic wave emission structure includes an electromagnetic wave-transparent section of the container (e.g., tube) through which electromagnetic waves can pass from outside the container into the internal volume of the container (e.g., tube).

In some embodiments, the container, as described herein, includes a tubular section formed of an electromagnetic wave-transparent material that makes up the electromagnetic wave-transparent section of the container.

In some embodiments, electromagnetic wave emission structure includes, or also includes, an applicator for directing electromagnetic waves through the electromagnetic wave-transparent section and into the internal volume.

The container (e.g., tube), as described herein, may include two metallic end caps, one coupled to each end of the tubular section. The tubular section may be a monolithic tubular section, such as those described herein.

In some embodiments, the electromagnetic wave emission structure is at least partially disposed in the container (e.g., tube).

Susceptor Material

As used herein, the phrase "susceptor material" refers to a material that converts electromagnetic energy, such as microwaves, to heat. A susceptor material may include a metal, a half metal, a dielectric, or a combination thereof. A susceptor material may include a metal oxide, such as an iron oxide. In some embodiments, the susceptor material includes silicon carbide. In some embodiments, the susceptor material includes silicon carbide, magnetite, zeolite, quartz, ferrite, carbon black, graphite, granite, or a combination thereof. In some embodiments, the susceptor material includes magnetite. In some embodiments, the susceptor material includes magnetite at an amount of at least 25%, at least 50%, at least 75%, or 100%, by weight, based on the weight of the susceptor material. For example, the susceptor material may include (i) magnetite at an amount of at least 25%, at least 50%, at least 75%, by weight, based on the weight of the susceptor material, and (ii) a filler and/or second susceptor material, such as an iron oxide other than magnetite. In some embodiments, the susceptor material includes a metal, a half metal, a dielectric, or a combination thereof at an amount of at least 5%, at least 10%, at least 15%, at least 20%, at least 25%, at least 50%, at least 75%, or 100%, by weight, based on the weight of the susceptor material.

A susceptor material may be in any form. For example, a susceptor material may be in a particulate form, a monolithic form, or a combination thereof. When the susceptor particles are in a particulate form, the particles may or may not be physically bound to one another. A susceptor material may include a sintered material, such as a plurality of sintered particles of a susceptor material. A susceptor material may include a porous material, such as porous particles of a susceptor material and/or a porous monolith of a susceptor material. In some embodiments, a susceptor material is in a form that permits a fluid to be disposed in and/or traverse a tube. In some embodiments, a susceptor material is in a form that permits a fluid or other material outside of the tube to be heated. For example, a fluid or material, such as a textile, may contact an outer surface of a tube, thereby heating the fluid or material.

When a susceptor material is in a particulate form, the particles may have a substantially uniform size, or a non-uniform size; and the particles may be of any regular or irregular shape (e.g., spheres, plugs, shavings, needles, etc.). When in a particulate form, the susceptor material may have an average largest dimension of about 1 nm to about 10 mm, about 5 nm to about 10 mm, about 10 nm to about 10 mm, about 50 nm to about 10 mm, about 100 nm to about 10 mm, about 500 nm to about 10 mm about 1 µm to about 10 mm, about 25 µm to about 10 mm, about 75 µm to about 10 mm, about 0.1 mm to about 10 mm, about 0.5 mm to about 10 mm, about 0.5 mm to about 8 mm, about 0.5 mm to about 7 mm, about 0.1 mm to about 5 mm, about 0.5 mm to about 5 mm, about 0.5 mm to about 4 mm, about 0.5 mm to about 3 mm, or about 0.5 mm to about 2 mm. In some embodiments, the susceptor material is in a particulate form, and the susceptor material has an average largest dimension of about 1 nm to about 50 nm, about 3 nm to about 40 nm, or about 3 nm to about 35 nm. For example, the susceptor material may include $Fe_3O_4$ nanoparticles having an average diameter of about 3 nm to about 32 nm. The susceptor material may include nanoparticles synthesized by any known technique, such as a seed-less thermolysis technique (see, e.g., Mohapatra, J. et al. *Phys. Chem. Chem. Phys.*, 2018, 20, 12879-12887). When the particles of a susceptor material are substantially spherical or spherical, the average largest dimension is the average largest diameter. Not wishing to be bound by any particular theory, it is believed that the selection of a size of the particles of a susceptor material may alter one or more characteristics of the methods herein, such as heating efficiency, pressure drop, etc., and, therefore, the particle size may be selected accordingly.

An internal reservoir of a tube may contain any amount of a susceptor material. In some embodiments, a susceptor material is present in an internal reservoir of a tube (or an available portion of the internal reservoir tube when one or more retention devices are present and, therefore, define the available portion) at an amount of about 30% to about 100% by volume of the internal reservoir or available portion thereof, about 50% to about 100% by volume of the internal reservoir or available portion thereof, about 70% to about 100% by volume of the internal reservoir or available portion thereof, about 90% to about 100% by volume of the internal reservoir or available portion thereof, or about 100% by volume of the internal reservoir or available portion thereof.

In some embodiments, an internal reservoir of a tube contains an amount of a susceptor material that permits a fluid to be disposed in the tube. In some embodiments, a susceptor material is present in an internal reservoir of a tube (or an available portion of the internal reservoir tube when one or more retention devices are present and, therefore, define the available portion) at an amount of about 30% to about 90% by volume of the internal reservoir or available portion thereof, about 30% to about 80% by volume of the internal reservoir or available portion thereof, about 30% to about 70% by volume of the internal reservoir or available portion thereof, about 40% to about 60% by volume of the internal reservoir or available portion thereof, or about 50% by volume of the internal reservoir or available portion thereof.

When a susceptor material is in a monolithic form, the monolith of susceptor material generally may have any size or shape that permits (i) its disposal in a tube or housing within a tube, (ii) a fluid to traverse the tube, or (iii) a combination thereof. In some embodiments, a monolith of a susceptor material includes one or more elongated monoliths having a length:width ratio of at least 3:1 (e.g., cylindrical in shape), thereby forming a "tube-within-a-tube" configuration in which a fluid may traverse an area defined at least in part by an outer surface of the elongated monolith and an inner surface of the tube. In some embodiments, two or more of the elongated monoliths are arranged, in any manner, in a tube. In some embodiments, the monolith of susceptor material has a size or shape that corresponds to the dimensions of an internal reservoir of a tube or available portion thereof, which may be desirable when a tube is configured to heat a fluid or material outside of a tube (e.g., a fluid or material contacting an outer surface of a tube). In some embodiments, the one or more monoliths include one or more capsule-shaped monoliths having a length:width ratio of less than 3:1 (e.g., spherical, rectangular, square, or elliptical in shape) arranged, in any manner, in a tube. When two or more monoliths are present in a tube, the two or more monoliths may be arranged in a tube in any regular or irregular pattern.

Figure 1I:
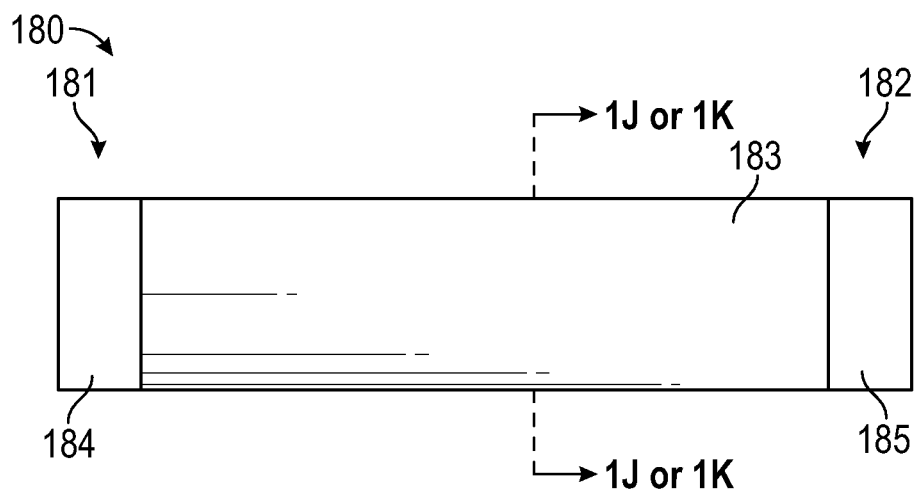
FIG. 1I depicts an embodiment of a tube.
Figure 1J:
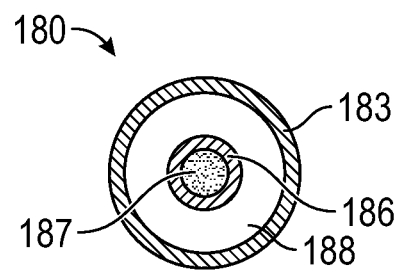
FIG. 1J depicts a possible cross-sectional view of the tube of FIG. 1I.
Figure 1K:
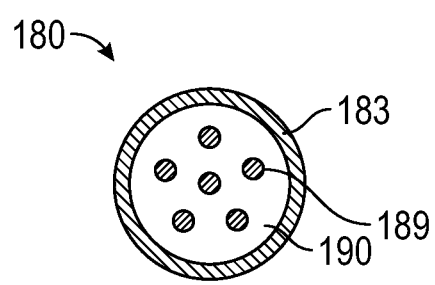
FIG. 1K depicts a possible cross-sectional view of the tube of FIG. 1I.

An embodiment of a tube is depicted at FIG. 1I (side view). The tube 180 of FIG. 1I is substantially cylindrical and has a first end 181 and a second end 182. The tube 180 includes a middle portion 183 formed of a microwave-transparent material, a first cap 184 at the first end 181, and a second cap 185 at the second end 182. The first cap 184 and the second cap 185 may optionally include an inlet and an outlet, as depicted, for example, at FIG. 1B and FIG. 1C. Alternative cross-sectional views of the tube 180 of FIG. 1I are depicted at FIG. 1J and FIG. 1K. In some embodiments, the tube 180 has the cross-sectional view depicted at FIG. 1J. FIG. 1J depicts a housing 186 in which particles of a susceptor material 187 are disposed, and a channel 188 between the housing 186 and inner surface of the tube 180 through which a fluid may flow when the tube 180 includes an inlet and an outlet. In some embodiments, the tube 180 has the cross-sectional view depicted at FIG. 1K. FIG. 1K depicts an array of cylindrical monoliths of susceptor material 189 arranged in the tube 180. When the tube 180 includes an inlet and an outlet, a fluid may flow in the channel 190 that includes the spaces between and among the cylindrical monoliths of susceptor material 189 and the inner surface of the tube 180. In some embodiments (not shown), one or more monoliths of susceptor material 189 are disposed in the housing 186 of FIG. 1J.

A susceptor material may include one or more additives. The one or more additives may include any material, such as a filler, that is (i) disposed in a tube with the susceptor material (e.g., dispersed evenly or unevenly in the susceptor material), and (ii) incapable of converting a plurality of microwaves to heat. A filler may be included for any reason, such as to ease the handling of a susceptor material, reduce resistance to fluid flow in a tube, achieve a different dispersion of a susceptor material in a tube, etc. A filler may be used to achieve a concentration gradient of a susceptor material within a tube. For example, a filler may permit a fluid disposed in a tube to encounter a concentration or amount of a susceptor material that increases (or decreases) continually or intermittently as the fluid traverses the tube. The one or more additives may be present in a susceptor material at a total amount that does not exceed 50%, by weight, based on the weight of the susceptor material. In other words, if a susceptor material including two additives has a mass of 100 g, then the sum of the masses of the two additives would not exceed 50 g. In some embodiments, one or more additives are present in a susceptor material at an amount of about 0.001% to 10%, by weight, based on the weight of the susceptor material.

Microwave Generators

Any known microwave generators may be included the apparatuses or used in the methods described herein. When an apparatus includes two or more microwave generators, the two or more microwave generators may be the same or different. When an apparatus includes two or more microwave generators, the two or more microwave generators may be operated at the same or different parameters (e.g., power, frequency, wavelength, etc.) during the methods described herein.

The one or more microwave generators may include magnetron continuous wave (CW) or pulse microwave generators, solid state fixed frequency or variable frequency microwave generators, or a combination thereof. The one or more microwave generators generally may be of any power (e.g., 200 W to 100 kW) and/or operate at any frequency (e.g., 915 MHz to 28 GHz) and/or wavelength (1 mm to 1 m). The one or more microwave generators may include commercially available microwave generators, such as SAIREM® microwave generators (Décines-Charpiue, France). The one or more microwave generators may include one or more microwave generators selected from the following table:

| Embodiment No. | Type | Frequency | Power |
|---|---|---|---|
| 1 | Magnetron CW or Pulse | 2.45 GHz | 2 kW |
| 2 | Magnetron CW or Pulse | 2.45 GHz | 3 kW |
| 3 | Magnetron CW or Pulse | 2.45 GHz | 6 kW |
| 4 | Solid State Fixed or Variable Freq. | 2.45 GHz | 200 W |
| 5 | Solid State Fixed or Variable Freq. | 2.45 GHz | 450 W |
| 6 | Magnetron CW or Pulse | 915 MHz | 18 kW |
| 7 | Magnetron CW or Pulse | 915 MHz | 36 kW |
| 8 | Magnetron CW or Pulse | 915 MHz | 54 kW |
| 9 | Magnetron CW or Pulse | 915 MHz | 72 kW |
| 10 | Magnetron CW or Pulse | 915 MHz | 75 kW |
| 11 | Magnetron CW or Pulse | 915 MHz | 100 kW |
| 12 | Solid State Fixed or Variable Freq. | 915 MHz | 600 W |

In some embodiments, the one or more microwave generators include one to ten microwave generators independently selected from Embodiments 1 to 12 of the foregoing table.

Methods

The apparatuses herein may be used to perform a method for heating a material, such as a fluid, a solid, or a combination thereof. The methods may include passing a fluid through a tube containing a susceptor material irradiated with electromagnetic waves. The methods may include arranging a material, such as a solid or fluid, adjacent a tube containing a susceptor material irradiated with electromagnetic waves.

A fluid, or a portion thereof, may be passed through a tube one or more times until a desired temperature is reached. A fluid heated by the apparatuses and methods herein may be collected and used in any manner, such as providing heat for a further process.

In some embodiments, the methods include contacting a fluid with a heated susceptor material, such as susceptor particles, to thereby heat the fluid at a rate of at least 100° C./min, at least 200° C./min, at least 300° C./min, at least 400° C./min, or at least 500° C./min. The methods may include a batch process or a continuous process. In some embodiments, step (b) includes flowing the fluid through a volume of the heated susceptor particles. In some embodiments, steps (a) and (b) are carried out in a common container (e.g., tube) that receives the susceptor particles and the fluid.

In some embodiments, the methods include providing an apparatus as described herein; disposing a fluid in the inlet of the container (e.g., tube) at a flow rate; introducing a plurality of electromagnetic waves into the applicator to irradiate at least a portion of the susceptor material with the plurality of electromagnetic waves to generate heat while the fluid is in the tube to produce a heated fluid; and collecting the heated fluid at the outlet of the tube. In some embodiments, the methods also include (i) disposing at least a portion of the heated fluid in the inlet of the tube; (ii) introducing the plurality of electromagnetic waves into the applicator to irradiate at least a portion of the susceptor material with the plurality of electromagnetic waves to generate heat while the heated fluid is in the tube to produce a further heated fluid; and (iii) collecting the further heated fluid at the outlet of the tube. Steps (i) to (iii) may be repeated one or more times to produce a further heated fluid having an increased temperature. In some embodiments, the method also includes reducing a temperature of the heated fluid at least 5% prior to disposing the heated fluid in the inlet.

The steps of the methods described herein may be performed simultaneously, in a substantially continuous manner, or a combination thereof.

A fluid may have any desired residence time in a container (e.g., tube). A fluid may have a residence time of not more than 10 minutes, 8 minutes, 5 minutes, 3 minutes, or 1 minute. In some embodiments, the fluid has a residence time of 0.1 to 5 minutes. As used herein, the phrase "residence time" refers to (i) the time a fluid spends in a container (e.g., tube) during one pass of a fluid through the container when the method is continuous, or (ii) the time a fluid maintains contact with heated susceptor particles.

A fluid may be disposed in a tube or pass through a volume of susceptor material at any flow rate. A flow rate may be selected based on a number parameters, such as the size of a tube, etc. In some embodiments, the flow rate is about 0.1 liters/minute to about 1,000 liters/minute. In some embodiments, the flow rate is about 0.1 liters/minute to about 750 liters/minute. In some embodiments, the flow rate is about 0.1 liters/minute to about 500 liters/minute. In some embodiments, the flow rate is about 0.1 liters/minute to about 250 liters/minute. In some embodiments, the flow rate is about 0.1 liters/minute to about 100 liters/minute. In some embodiments, the flow rate is about 0.1 liters/minute to about 50 liters/minute. In some embodiments, the flow rate is about 0.1 liters/minute to about 25 liters/minute. In some embodiments, the flow rate is about 0.1 liters/minute to about 10 liters/minute. In some embodiments, the flow rate is about 0.1 liters/minute to about 5 liters/minute. In some embodiments, the flow rate is about 0.2 liters/minute to about 3 liters/minute. In some embodiments, the flow rate is about 0.2 liters/minute to about 1.2 liters/minute. In some embodiments, the flow rate is about 900 liters/minute to about 1,000 liters/minute. In some embodiments, the flow rate is about 800 liters/minute to about 1,000 liters/minute. In some embodiments, the flow rate is about 700 liters/minute to about 1,000 liters/minute. In some embodiments, the flow rate is about 600 liters/minute to about 1,000 liters/minute. In some embodiments, the flow rate is about 500 liters/minute to about 1,000 liters/minute. In some embodiments, the flow rate is about 400 liters/minute to about 1,000 liters/minute. In some embodiments, the flow rate is about 300 liters/minute to about 1,000 liters/minute. In some embodiments, the flow rate is about 250 liters/minute to about 1,000 liters/minute. In some embodiments, the flow rate is about 200 liters/minute to about 1,000 liters/minute. In some embodiments, the flow rate is about 100 liters/minute to about 1,000 liters/minute. In some embodiments, the flow rate is about 75 liters/minute to about 1,000 liters/minute. In some embodiments, the flow rate is about 50 liters/minute to about 1,000 liters/minute. In some embodiments, the flow rate is about 10 liters/minute to about 1,000 liters/minute. In some embodiments, the flow rate is at least 5 liters/minute, at least 10 liters/minute, at least 15 liters/minute, or at least 20 liters/minute. As used herein, the term "flow rate" refers to the rate at which a fluid is disposed in the inlet of a tube. As the temperature of a fluid increases, the viscosity of the fluid may decrease, thereby increasing the likelihood that the flow rate may increase. An apparatus or method may include one or more features that accommodates this phenomenon and/or counters the tendency of the flow rate to increase. Not wishing to be bound by any particular theory, a mass flow rate of a fluid may remain constant, even if a volume flow rate changes due to a change in viscosity and/or other reason.

A fluid may be provided to a container (e.g., tube) by any known equipment. For example, a pump, such as a diaphragm pump or a centrifugal pump, may be used to dispose a fluid in a tube. In some embodiments, a pump, such as a positive displacement pump, is used to dispose a fluid in a tube at a flow rate. In some embodiments, a valve is used to impart a desired flow rate to a fluid disposed in a tube.

Any pressure may be present inside a container (e.g., tube) during all or a portion of the methods provided herein. In some embodiments, the pressure inside the container (e.g., tube) is less than or equal to the critical pressure of the fluid. In some embodiments, the pressure inside the tube is greater than the critical pressure of the fluid. In some embodiments, the pressure inside the tube exceeds the critical pressure of the fluid by at least 1%, at least 5%, at least 10%, at least 25%, or at least 50%. In some embodiments, the pressure inside the container (e.g., tube) exceeds the critical pressure of the fluid by about 1% to about 50%, about 5% to about 50%, about 10% to about 50%, or about 25% to about 50%. This parameter may eliminate or reduce the likelihood that a liquid fluid converts to the gas phase. A fluid may be kept at a pressure above its critical pressure before, during, and after being disposed in a container (e.g., tube). In some embodiments, a fluid is pressurized (i) prior to being disposed in a container (e.g., tube), (ii) during and/or after its collection at the second end of the container (e.g., tube), or (iii) a combination thereof. Therefore, a heated fluid or further heated fluid may be kept at a pressure that exceeds the fluid's critical pressure after its collection for further use. For example, when a method includes flowing a fluid through a volume the heated susceptor particles, the flowing of the fluid through the volume of the heated susceptor particles can be carried out at an elevated pressure to prevent vaporization of the liquid. In some embodiments, a pressure inside a container (e.g., tube) during all or a portion of the methods provided herein is about 1 bar to about 250 bar, about 1.1 bar to about 250 bar, about 5 bar to about 250 bar, about 5 bar to about 225 bar, about 5 bar to about 200 bar, about 5 bar to about 150 bar, about 5 bar to about 100 bar, or about 10 bar to about 100 bar. In some embodiments, a pressure inside a container (e.g., tube) during all or a portion of the methods provided herein is at least 2 bar, at least 5 bar, at least 10 bar, at least 25 bar, at least 50 bar, at least 100 bar, at least 150 bar, or at least 200 bar.

When disposed in a tube, a fluid may be at an ambient temperature that is greater than the freezing point of the fluid. In some embodiments, a fluid has a temperature of about 15° C. to about 35° C. when it is disposed for the first time in a tube. In some embodiments, a fluid has a temperature of about 20° C. to about 30° C. when it is disposed for the first time in a tube. In some embodiments, the heated fluid or the further heated fluid has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., or about 400° C. to about 500° C. In some embodiments, the heated fluid or the further heated fluid has a temperature of about 100° C. to about 600° C., about 200° C. to about 600° C., about 300° C. to about 600° C., about 400° C. to about 600° C., or about 500° C. to about 600° C. In some embodiments, the heated fluid or the further heated fluid has a temperature of about 100° C. to about 700° C., about 200° C. to about 700° C., about 300° C. to about 700° C., about 400° C. to about 700° C., about 500° C. to about 700° C., about 600° C. to about 700° C.

In some embodiments, the methods provided herein heat a fluid by at least 200° C., at least 250° C., at least 300° C., at least 400° C., or at least 500° C.

In some embodiments, a susceptor material irradiated with electromagnetic radiation, as described herein, has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., about 400° C. to about 500° C. about 250° C. to about 1,500° C., about 350° C. to about 1,500° C., about 450° C. to about 1,500° C., about 300° C. to about 1,000° C., about 300° C. to about 800° C., or about 300° C. to about 700° C.

In some embodiments, the methods provided herein heat a fluid predominantly by direct heat exchange with a heated susceptor material. In other words, a majority (>50%) of the heat or temperature increase imparted to a fluid results from the direct heat exchange with a heat susceptor material. In some embodiments, less than 25 percent, less than 20 percent, less than 15 percent, less than 10 percent, or less than 5 percent of the heating of the fluid is caused by direct absorption of the electromagnetic energy. The ability of a fluid to absorb electromagnetic energy directly may decrease as its temperature increases. A temperature increase, for example, may cause a fluid's dielectric constant to decrease, thereby increasing the percentage of heating achieved by an irradiated susceptor material.

In some embodiments, the methods include providing an apparatus or system as described herein; arranging a material adjacent the tube; introducing a plurality of electromagnetic waves into the applicator to irradiate at least a portion of the susceptor material with the plurality of electromagnetic waves to generate heat while the material is adjacent the tube to produce a heated material. The material may include a fluid, a solid, or a combination thereof.

The apparatuses and systems provided herein may be configured to accommodate the arranging of a material adjacent a tube. A tube, for example, may extend from an applicator a distance suitable to accommodate arranging a material adjacent a tube. An applicator may include a gap (e.g., a gap between chambers or modular units, a gap between a tube and an aperture, etc.) that permits a material to be arranged adjacent a tube. An applicator may include a chamber having one or more apertures that permits a material to be arranged adjacent a tube, and such a chamber may or may not be associated with a generator of electromagnetic waves.

In some embodiments, the arranging of the material adjacent the tube includes contacting the tube with the material. For example, a liquid or a solid, such as a textile or other flexible material, may contact an outer surface of a tube. In some embodiments, all or a portion of a ribbon or strip of a solid, such as a textile or other flexible material, may be placed into contact with a tube. For example, a solid, such as a textile or other flexible material, may be brought into contact with a tube as the textile or other flexible material is pulled by one or more rollers or otherwise. As a further example, a liquid may be configured to pass a location that is adjacent a tube. A flowing liquid, in some embodiments, may contact an outer surface of a tube.

Systems

Also provided herein are systems that include the apparatuses described herein, including systems that may be used to perform the methods described herein. In some embodiments, the systems include a fluid source, a pump or compressor, a heat exchanger, or a combination thereof.

An embodiment of a system is depicted at FIG. 11. The system 900 includes an apparatus (901, 902) having a first end 901 as shown at FIG. 6A, FIG. 6B, and FIG. 6C, and a second end 902 as depicted at FIG. 8. The system 900 also includes a fluid source 910 that is in fluid communication with a pump 920. The pump 920 provides a fluid 950 from the fluid source 910 to the apparatus (901, 902), which is heated to produce a heated fluid 951. The heated fluid 951 may be collected in a reservoir 930. In some embodiments, the heated fluid 951 is forwarded to another process or system 960 to provide heat to the process or system. At least a portion of the heated fluid 951 may be forwarded to a heat exchanger 940 to reduce its temperature before it is provided to the apparatus (901, 902) for further heating. The pump 920 may be configured to pressurize at least a portion of the system. For example, the pressure inside the tube may or may not exceed the critical pressure of the fluid. The system 900 may be configured so that the apparatus 901 is arranged at any angle from 0° (as shown) to 90° during operation, thereby permitting the apparatus to operate in an upflow or downflow mode. In other embodiments, the system of FIG. 11 includes any one or combination of the apparatuses, features, and/or configurations of FIGS. 1A-K, 2A-D, 3A-B, 4A-D, 5A-E, 7, 8, 9A-B, 10, and/or 12A-I.

The systems provided herein may also include one or more meters, such as a pressure meter, a flow meter, or a combination thereof. A pressure may be used, for example, to ensure that a pressure in at least part of a system exceeds a critical pressure of a fluid. A flow meter may be used, for example, to ensure a desired flow of a fluid, or monitor changes to a flow rate, which may occur when the heating of a fluid results in a corresponding decrease in viscosity.

Fluid

Any fluid may be heated by the methods described herein. In some embodiments, the fluid includes an organic fluid. In some embodiments, the fluid includes an inorganic fluid. In some embodiments, the fluid includes an aqueous fluid. As used herein, the phrase "aqueous fluid" refers to a fluid that includes water at an amount of greater than 50%, by weight.

In some embodiments, the fluid includes an ionic liquid. In some embodiments, the fluid includes water and at least one organic fluid. In some embodiments, the fluid includes water, at least one organic fluid, at least one inorganic fluid, at least one ionic liquid, or a combination thereof. The fluid may be a polar fluid, a non-polar fluid, or a combination thereof. A fluid may include one or more solids, which may be dispersed and/or dissolved in the fluid. The fluid may be of any phase, such as a liquid phase, a gas phase, or a combination thereof. The fluid, for example, may be in the liquid phase when disposed in a tube, and the resulting heated fluid may be in the liquid phase, gas phase, or a combination thereof. In some embodiments, the fluid includes carbon dioxide. The organic fluid may be a hydrocarbon.

As used herein, the term "hydrocarbon" refers to compounds having structures formed of carbon and hydrogen, and, optionally, one or more substituents if the hydrocarbon is substituted. In some embodiments, the hydrocarbon is a $C_1$-$C_{40}$ hydrocarbon. In some embodiments, the hydrocarbon is a $C_1$-$C_{30}$ hydrocarbon. In some embodiments, the hydrocarbon is a $C_1$-$C_{20}$ hydrocarbon. As used herein, the phrases "$C_1$-$C_{40}$ hydrocarbon", "$C_1$-$C_{30}$ hydrocarbon", "$C_1$-$C_{ao}$ hydrocarbon", and the like, generally refer to aliphatic hydrocarbons and/or aromatic hydrocarbons containing 1 to 40 carbon atoms, 1 to 30 carbon atoms, or 1 to 20 carbon atoms, respectively. Examples of $C_1$-$C_{40}$ hydrocarbons include, but are not limited to, an alkane, a cycloalkane, an alkene, a cycloalkene, an alkyne, a cycloalkyne, and the like, and includes all substituted, unsubstituted, branched, and linear analogs or derivatives thereof, in each instance having 1 to 40 carbon atoms. Examples of cyclic aliphatic or aromatic hydrocarbons include, but are not limited to, anthracene, azulene, biphenyl, fluorene, indan, indene, phenanthrene, benzene, naphthalene, toluene, xylene, mesitylene, and the like, including all substituted, unsubstituted, hydrogenated, and/or heteroatom-substituted derivatives thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl, cycloalkyl, alkenyl, cycloalkenyl, alkynyl, cycloalkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, arylalkyl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$, $SO_2NR'R''$), sulfone, sulfonyl (including alkylsulfonyl, arylsulfonyl and arylalkylsulfonyl), sulfoxide, thiol (e.g., sulfhydryl, thioether) or urea.

When a hydrocarbon is halo-substituted, the hydrocarbon may be substituted partially or completely with a halogen selected from fluorine, chlorine, bromine, iodine, or a combination thereof. When completely substituted with one or more types of halogen atoms, the compound may be referred to as a "perhalocarbon". For example, a fluoro-substituted hydrocarbon may be partially substituted with fluorine atoms, or completely substituted with fluorine atoms; and when completely substituted with fluorine atoms, the compound may be referred to as a perfluorocarbon.

Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

A fluid may include one or more additives. In some embodiments, the one or more additives includes a tracer, such as a dye. The one or more additives may be present in a fluid at a total amount that does not exceed 10%, by weight, based on the weight of the fluid. In other words, if a fluid including two additives has a mass of 100 g, then the sum of the masses of the two additives would not exceed 10 g. In some embodiments, one or more additives are present in a fluid at an amount of about 0.001% to 5%, by weight, based on the weight of the fluid.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When methods or apparatuses are claimed or described in terms of "comprising" various steps or components, the methods or apparatuses can also "consist essentially of" or "consist of" the various steps or components, unless stated otherwise.

The terms "a," "an," and "the" are intended to include plural alternatives, e.g., at least one. For instance, the disclosure of "a fluid," "a susceptor material," "a tube", and the like, is meant to encompass one, or mixtures or combinations of more than one fluid, susceptor material, tube, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that a tube has an inner diameter of about 30 mm to about 44 mm. This range should be interpreted as encompassing about 30 mm and about 44 mm, and further encompasses "about" each of 31 mm, 32 mm, 33 mm, 34 mm, 35 mm, 36 mm, 37 mm, 38 mm, 39 mm, 40 mm, 41 mm, 42 mm, and 43 mm, including any ranges and sub-ranges between any of these values.

As used herein, the term "about" means plus or minus 10% of the numerical value of the number with which it is being used.

EXAMPLE EMBODIMENTS

The following embodiments are non-limiting examples of the apparatuses, systems, and methods described herein. Other embodiments are envisioned.

Embodiment 1. An apparatus—

(A) comprising a tube formed at least in part of an electromagnetic wave-transparent material; and an applicator; wherein (i) a first end of the tube is fixably mounted or spring mounted to the applicator, (ii) at least a portion of the tube is arranged in the applicator, or (iii) a combination thereof; or (B) comprising a tube formed at least in part of an electromagnetic wave-transparent material; a susceptor material disposed in the tube; and an applicator, wherein (i) a first end of the tube is fixably mounted or spring mounted to the applicator, and (ii) at least a portion of the tube and at least a portion the susceptor material in the tube is arranged in the applicator; or (C) comprising a tube formed at least in part of an electromagnetic wave-transparent material; a susceptor material disposed in the tube; and an applicator, wherein (i) a first end of the tube is fixably mounted or spring mounted to the applicator, (ii) a second end of the tube is fixably mounted or spring mounted to the applicator, and (iii) at least a portion of the tube and at least a portion the susceptor material in the tube is arranged in the applicator; or (D) for heating fluids with a plurality of susceptor particles irradiated by electromagnetic energy, the apparatus comprising: a container defining an internal volume configured to receive the susceptor particles; at least one retention device disposed in or adjacent to the internal volume and configured to retain the susceptor particles in the internal volume while allowing a fluid to flow out of the internal volume; and an electromagnetic wave emission structure configured to introduce electromagnetic waves into the internal volume for irradiation of the susceptor particles contained in the internal volume; or (E) comprising a tube formed at least in part of an electromagnetic wave-transparent material; and an applicator; wherein (i) at least a first portion of the tube protrudes from the applicator, and (ii) at least a second portion of the tube is arranged in the applicator.

Embodiment 2. The apparatus of Embodiment 1, wherein the tube comprises an inlet and an outlet.

Embodiment 3. The apparatus of Embodiment 1 or 2, further comprising one or more microwave generators, wherein the one or more microwave generators are positioned to introduce a plurality of microwaves into the applicator to irradiate the at least a portion of the susceptor material with the plurality of microwaves.

Embodiment 4. The apparatus of any one of Embodiments 1 to 3, wherein the electromagnetic wave-transparent material comprises a microwave-transparent material.

Embodiment 5. The apparatus of Embodiment 4, wherein the microwave-transparent material comprises a ceramic, a polymer, a glass, or a combination thereof.

Embodiment 6. The apparatus of Embodiment 4, wherein the microwave-transparent material comprises (i) alumina, (ii) fused silica, (iii) silicon nitride, (iv) a ceramic including silicon, aluminum, nitrogen, oxygen, or a combination thereof, or (v) a combination thereof.

Embodiment 7. The apparatus of any one of Embodiments 1 to 6, wherein the tube has a monolithic structure.

Embodiment 8. The apparatus of any one of Embodiments 1 to 6, wherein the tube comprises a first cap arranged at the first end of the tube, a second cap arranged at the second end of the tube, or a first cap and a second cap arranged at the first end and the second end of the tube, respectively.

Embodiment 9. The apparatus of Embodiment 8, wherein the first cap, the second cap, or both the first cap and the second cap comprises a metal.

Embodiment 10. The apparatus of Embodiment 9, wherein the metal comprises an alloy comprising iron, cobalt, and nickel (for example, a KOVAR® alloy).

Embodiment 11. The apparatus of Embodiment 9 or 10, wherein a portion of the tube comprises a ceramic, and the first cap, the second cap, or both the first cap and the second cap are adjoined to the ceramic by a ceramic-to-metal braze, an adhesive, or a combination thereof.

Embodiment 12. The apparatus of any one of Embodiments 1 to 11, wherein (A) the susceptor material includes a metal, a half metal, a dielectric, or a combination thereof, or (B) the susceptor material includes a metal, a half metal, a dielectric, or a combination thereof at an amount of at least 5%, at least 10%, at least 15%, at least 20%, at least 25%, at least 50%, at least 75%, or 100%, by weight, based on the weight of the susceptor material.

Embodiment 13. The apparatus of any one of Embodiments 1 to 12, wherein the susceptor material includes a metal oxide, such as an iron oxide.

Embodiment 14. The apparatus of any one of Embodiments 1 to 13, wherein the susceptor material includes silicon carbide, magnetite, zeolite, quartz, ferrite, carbon black, graphite, granite, or a combination thereof.

Embodiment 15. The apparatus of any one of Embodiments 1 to 14, wherein (i) the first end of the tube is spring mounted to the applicator, (ii) the second end of the tube is fixably mounted to the applicator, (iii) the first end of the tube is spring mounted to the applicator and the second end of the tube is fixably mounted to the applicator, (iv) the first end of the tube is fixably mounted to the applicator, (v) the second end of the tube is spring mounted to the applicator, or (vi) the first end of the tube is spring mounted to the applicator and the second end of the tube is spring mounted to the applicator.

Embodiment 16. The apparatus of Embodiment 15, wherein the first end of the tube is spring mounted to the applicator, and the apparatus further comprises (i) a first head unit defining a first aperture, a first fastener having a first end and a second end, wherein the first fastener is slidably arranged in the first aperture, and the second end of the first fastener is fixably mounted to the applicator, and a first elastically compressible apparatus arranged between the first head unit and the first end and/or the second end of the first fastener, wherein the first end of the tube and first head unit contact each other; or (ii) a first head unit defining a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the first head unit and the first end and/or the second end of the first fastener, and a second elastically compressible apparatus arranged between the first head unit and the first end and/or the second end of the second fastener; wherein the first end of the tube and first head unit contact each other.

Embodiment 17. The apparatus of Embodiment 16, further comprising: a third aperture defined by the first head unit; a third fastener having a first end and a second end, wherein the third fastener is slidably arranged in the third aperture, and the second end of the third fastener is fixably mounted to the applicator; and a third elastically compressible apparatus arranged between the first head unit and the first end and/or the second end of the third fastener.

Embodiment 18. The apparatus of Embodiment 17, further comprising: a fourth aperture defined by the first head unit; a fourth fastener having a first end and a second end, wherein the fourth fastener is slidably arranged in the fourth aperture, and the second end of the fourth fastener is fixably mounted to the applicator; and a fourth elastically compressible apparatus arranged between the first head unit and the first end and/or the second end of the fourth fastener.

Embodiment 19. The apparatus of any one of Embodiments 16 to 18, wherein the first elastically compressible apparatus, the second elastically compressible apparatus, the third elastically compressive apparatus, the fourth elastically compressible apparatus, or a combination thereof comprises one or more disc springs slidably mounted on the first fastener, the second fastener, the third fastener, or the fourth fastener, respectively.

Embodiment 20. The apparatus of any one of Embodiments 16 to 18, wherein the first elastically compressible apparatus, the second elastically compressible apparatus, the third elastically compressive apparatus, the fourth elastically compressible apparatus, or a combination thereof comprises 1 to 24 disc springs slidably mounted on the first fastener, the second fastener, the third fastener, or the fourth fastener, respectively.

Embodiment 21. The apparatus of any one of Embodiments 16 to 20, further comprising a first seal that provides closure between the first head unit and the first end of the tube.

Embodiment 22. The apparatus of Embodiment 21, wherein the first seal comprises (i) rubber arranged between and in contact with the first head unit and the first end of the tube, (ii) a clamp and/or fastener that maintains contact between the first head unit and the first end of the tube, or (iii) a combination thereof.

Embodiment 23. The apparatus of any one of Embodiments 16 to 22, wherein the first head unit comprises a depression configured to receive the first end of the tube.

Embodiment 24. The apparatus of any one of Embodiments 16 to 23, wherein the apparatus further comprises a second head unit fixably mounted to the applicator; wherein the second end of the tube and second head unit contact each other.

Embodiment 25. The apparatus of Embodiment 24, further comprising a second seal between the second head unit and the second end of the tube.

Embodiment 26. The apparatus of Embodiment 25, wherein the second seal comprises (i) metal arranged between and in contact with the second head unit and the second end of the tube, (ii) a clamp and/or fastener that maintains contact between the second head unit and the second end of the tube, or (iii) a combination thereof.

Embodiment 27. The apparatus of any one of Embodiments 24 to 26, wherein the second head unit comprises a depression configured to receive the second end of the tube.

Embodiment 28. The apparatus of any one of Embodiments 15 to 23, wherein the second end of the tube is spring mounted to the applicator, and the apparatus further comprises (i) a second head unit defining a first aperture, a first fastener having a first end and a second end, wherein the first fastener is slidably arranged in the first aperture, and the second end of the first fastener is fixably mounted to the applicator, and a first elastically compressible apparatus arranged between the second head unit and the first end and/or the second end of the first fastener, wherein the second end of the tube and second head unit contact each other; or (ii) a second head unit defining a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the second head unit and the first end and/or the second end of the first fastener, and a second elastically compressible apparatus arranged between the second head unit and the first end and/or the second end of the second fastener, wherein the second end of the tube and second head unit contact each other.

Embodiment 29. The apparatus of Embodiment 28, further comprising a third aperture defined by the second head unit; a third fastener having a first end and a second end, wherein the third fastener is slidably arranged in the third aperture, and the second end of the third fastener is fixably mounted to the applicator; and a third elastically compressible apparatus arranged between the second head unit and the first end and/or the second end of the third fastener.

Embodiment 30. The apparatus of Embodiment 29, further comprising a fourth aperture defined by the second head unit; a fourth fastener having a first end and a second end, wherein the fourth fastener is slidably arranged in the fourth aperture, and the second end of the fourth fastener is fixably mounted to the applicator; and a fourth elastically compressible apparatus arranged between the second head unit and the first end and/or the second end of the fourth fastener.

Embodiment 31. The apparatus of any one of Embodiments 28 to 30, wherein the first elastically compressible apparatus, the second elastically compressible apparatus, the third elastically compressive apparatus, the fourth elastically compressible apparatus, or a combination thereof comprises one or more disc springs slidably mounted on the first fastener, the second fastener, the third fastener, or the fourth fastener, respectively.

Embodiment 32. The apparatus of any one of Embodiments 28 to 30, wherein the first elastically compressible apparatus, the second elastically compressible apparatus, the third elastically compressive apparatus, the fourth elastically compressible apparatus, or a combination thereof comprises 1 to 24 disc springs slidably mounted on the first fastener, the second fastener, the third fastener, or the fourth fastener, respectively.

Embodiment 33. The apparatus of any one of Embodiments 28 to 32, further comprising a second seal between the second head unit and the second end of the tube.

Embodiment 34. The apparatus of Embodiment 33, wherein the second seal comprises (i) metal arranged between and in contact with the second head unit and the second end of the tube, (ii) a clamp and/or fastener that maintains contact between the second head unit and the second end of the tube, or (iii) a combination thereof.

Embodiment 35. The apparatus of any one of Embodiments 15 to 34, wherein (i) the first head unit is fixably mounted to the first end of the tube, (ii) the second head unit is fixably mounted to the second end of the tube, or (iii) the first head unit is fixably mounted to first end of the tube and the second head unit is fixably mounted to the second end of the tube.

Embodiment 36. The apparatus of Embodiment 35, wherein (i) the first head unit is welded or brazed to the first end of the tube, (ii) the second head unit is welded or brazed to the second end of the tube, or (iii) the first head unit is welded or brazed to the first end of the tube and the second head unit is welded to the second end of the tube.

Embodiment 37. The apparatus of any of the preceding Embodiments, wherein the applicator comprises a vessel (i) having a first end and a second end, and (ii) comprising one to thirty chambers defined by (a) one or more outer walls of the vessel, (b) one or more walls inside the vessel, or (c) a combination thereof, wherein the first end of the vessel, the second end of the vessel, the one or more walls inside the vessel, or a combination thereof define an aperture, and the tube is arranged in the apertures defined by (a) the first end of the vessel, (b) the second end of the vessel, (c) the one or more walls inside the vessel, or (d) a combination thereof.

Embodiment 38. The apparatus of Embodiment 37, wherein the vessel further comprises at least one waveguide comprising a passageway through which the plurality of microwaves pass prior to entering one of the one to thirty chambers.

Embodiment 39. The apparatus of Embodiment 37 or 38, wherein the vessel comprises four to six chambers.

Embodiment 40. The apparatus of Embodiment 37 or 38, wherein the apparatus comprises three to six microwave generators, and the applicator comprises four to six chambers.

Embodiment 41. The apparatus of any one of Embodiments 37 to 40, wherein at least one of the one or more microwave generators (i) is positioned to introduce the plurality of microwaves into at least one of the one to thirty chambers via an aperture defined by the one or more outer walls of the vessel, (ii) is positioned in at least one of the one to thirty chambers, or (iii) a combination thereof.

Embodiment 42. The apparatus of Embodiment 41, wherein the one or more microwave generators are positioned to introduce the plurality of microwaves into at least one of the one to thirty chambers via the aperture defined by the one or more outer walls, and the one or more microwave generators is positioned in the at least one waveguide.

Embodiment 43. The apparatus of any one of Embodiments 1 to 36, wherein the applicator comprises one to thirty modular applicator units, wherein each modular applicator unit comprises (i) a chamber having a first side and a second side, (ii) a first aperture defined by the first side, (iii) a second aperture defined by the second side, and (iv) a waveguide extending from a third aperture of the chamber; wherein the one to thirty modular applicator units are arranged adjacent to each other, and the tube is arranged in the first aperture and the second aperture of each modular applicator unit.

Embodiment 44. The apparatus of Embodiment 43, wherein the applicator comprises four to six of the modular applicator units.

Embodiment 45. The apparatus of Embodiment 43 or 44, wherein at least one of the one or more microwave generators is positioned to introduce a plurality of microwaves into at least one of the one to thirty modular applicator units.

Embodiment 46. The apparatus of any one of Embodiments 43 to 45, wherein the apparatus comprises three to six microwave generators, and the applicator comprises four to six of the modular applicator units.

Embodiment 47. The apparatus according to any one of Embodiments 1 to 46, wherein a portion of the tube formed of the electromagnetic wave-transparent material is substantially cylindrical.

Embodiment 48. The apparatus of Embodiment 47, wherein the tube has an outer diameter of about 45 mm to about 60 mm, and an inner diameter of about 30 mm to about 44 mm.

Embodiment 49. The apparatus of Embodiment 47, wherein the tube has an outer diameter of about 50 mm to about 54 mm, and an inner diameter of about 40 mm to about 44 mm.

Embodiment 50. The apparatus of any one of Embodiments 1 to 49, wherein the tube has a length of about 0.1 m to about 5 m, about 0.1 m to about 4 m, about 0.1 m to about 3 m, about 0.5 m to about 3 m, about 0.5 m to about 2 m, about 0.5 m to about 1.5 m, or about 1 m to about 1.5 m.

Embodiment 51. The apparatus of any one of Embodiments 1 to 50, wherein the tube further comprises a microwave disruptor.

Embodiment 52. The apparatus of Embodiment 51, wherein the microwave disruptor is fixably mounted at the second end of the tube.

Embodiment 53. The apparatus of Embodiment 51 or 52, wherein the microwave disruptor comprises a wire or a rod, and, optionally, (i) one or more protruding structures and/or (ii) a flange arranged on the wire or the rod.

Embodiment 54. The apparatus of any one of Embodiments 1 to 53, wherein the susceptor material is disposed in an internal reservoir of the tube, and the apparatus further comprises one or more retention devices arranged at a position to (i) prevent the susceptor material from escaping the internal reservoir of the tube, (ii) control a location of the susceptor material in the internal reservoir of the tube, (iii) prevent a susceptor material from contacting a fluid, or (iv) a combination thereof.

Embodiment 55. The apparatus of Embodiment 54, whether the one or more retention devices comprise a screen, a housing, or a combination thereof.

Embodiment 56. The apparatus of any one of Embodiments 1 to 55, wherein the susceptor material is in a monolithic form, a particulate form, or a combination thereof.

Embodiment 57. The apparatus of any one of Embodiments 1 to 56, wherein a longitudinal axis of the tube is parallel (0°) or perpendicular (90°) to a surface (e.g., ground, floor, ceiling, wall etc.) that supports the apparatus.

Embodiment 58. The apparatus of any one of Embodiments 1 to 56, wherein an angle between a longitudinal axis of the tube and a surface (e.g., ground, floor, ceiling, wall etc.) that supports the apparatus is 0° to 90°, 10° to 90°, 20° to 90°, 30° to 90°, 40° to 90°, 50° to 90°, 60° to 90°, 70° to 90°, or 80° to 90°.

Embodiment 59. The apparatus of any one of Embodiments 1 to 58, wherein the electromagnetic wave emission structure comprises an electromagnetic wave-transparent section of the container through which electromagnetic waves can pass from outside the container into the internal volume.

Embodiment 60. The apparatus of any one of Embodiments 1 to 59, wherein the container comprises a tubular section formed of an electromagnetic wave-transparent material that makes up the electromagnetic wave-transparent section of the container.

Embodiment 61. The apparatus of any one of Embodiments 1 to 60, further comprising an applicator for directing electromagnetic waves through the electromagnetic wave-transparent section and into the internal volume.

Embodiment 62. The apparatus of Embodiment 60 or 61, wherein (A) the container further comprises two metallic end caps, one coupled to each end of the tubular section, or (B) the tubular section is monolithic.

Embodiment 63. The apparatus of any one of Embodiments 1 to 62, wherein the electromagnetic wave emission structure is at least partially disposed in the container.

Embodiment 64. The apparatus of any one of Embodiments 1 to 63, wherein the retention device has a plurality of openings through which the fluid can pass but the susceptor particles cannot pass.

Embodiment 65. The apparatus of Embodiment 64, wherein the average open area of the openings in the retention mechanism is less than 20 square mm, 15 square mm, 10 square mm, 5 square mm, or 2 square mm.

Embodiment 66. The apparatus of any one of Embodiments 1 to 65, wherein the retention device comprises a screen coupled to the container, a perforated plate coupled to the container, or a perforated wall of the container.

Embodiment 67. The apparatus of any one of Embodiments 1 to 66, wherein the container further comprises a fluid inlet for receiving the fluid in the internal volume and a fluid outlet for discharging the fluid from the internal volume.

Embodiment 68. The apparatus of Embodiment 67, wherein the at least one retention device comprises a first retention structure position proximate to the fluid inlet and a second retention structure position proximate to the fluid outlet.

Embodiment 69. The apparatus of any one of Embodiments 1 to 68, wherein the container is a pressure container.

Embodiment 70. The apparatus of Embodiment 69, wherein the pressure container is configured to withstand a pressure of at least 1 bar, at least 5 bar, at least 10 bar, at least 15 bar, at least 20 bar, or at least 25 bar.

Embodiment 71. The apparatus of any one of Embodiments 1 to 70, further comprising a fluid source for providing the fluid to the internal volume and an electromagnetic wave generator for providing the electromagnetic waves to the internal volume.

Embodiment 72. The apparatus of Embodiment 71, wherein the electromagnetic wave generator is a microwave generator.

Embodiment 73. The apparatus of any one of Embodiments 1 to 72, wherein the applicator comprises (i) a vessel or a modular unit, and (ii) a separate mounting apparatus, wherein the separate mounting apparatus permits the first end of the tube to be fixably or spring mounted to the applicator.

Embodiment 74. A system comprising the apparatus of any one of Embodiments 1 to 73; a fluid source in which the fluid is disposed, wherein the fluid source is in fluid communication with the tube; and a pump configured to provide (i) the fluid from the fluid source to the tube, (ii) a pressure in the tube, wherein the pump is in fluid communication with the apparatus and the fluid source, or (iii) a combination thereof.

Embodiment 75. The system of Embodiment 74, further comprising a heat exchanger in fluid communication with the second end of the tube and the pump.

Embodiment 76. A method—

(A) for heating a material, the method comprising providing (i) the apparatus of any one of Embodiments 1 to 73, or (ii) the system of Embodiment 74 or 75; disposing a fluid in an inlet of the tube at a flow rate; introducing a plurality of electromagnetic waves into the applicator to irradiate at least a portion of the susceptor material with the plurality of electromagnetic waves to generate heat while the fluid is in the tube to produce a heated fluid; and collecting the heated fluid at the outlet of the tube; or (B) providing an apparatus comprising a container having an inlet and an outlet, a susceptor material disposed in the container, and an applicator in which at least portion of the container and at least a portion of the applicator are arranged; disposing a fluid in an inlet of the tube at a flow rate; introducing a plurality of electromagnetic waves into the applicator to irradiate at least a portion of the susceptor material with the plurality of electromagnetic waves to generate heat while the fluid is in the tube to produce a heated fluid; and collecting the heated fluid at the outlet of the tube; or (C) for heating fluids using electromagnetic energy, the process comprising (a) irradiating a plurality of susceptor particles with electromagnetic energy to thereby provide heated susceptor particles; and (b) contacting a fluid with the heated susceptor particles to thereby heat the fluid at a rate of at least 100° C./min, at least 200° C./min, at least 300° C./min, at least 400° C./min, or at least 500° C./min.

Embodiment 77. The method of Embodiment 76, wherein step (b) comprises flowing the fluid through a volume the heated susceptor particles.

Embodiment 78. The method of Embodiment 76 or 77, wherein the flow rate of the fluid through the volume of heated susceptor particles is at least 5 liters/minute, at least 10 liters/minute, at least 15 liters/minute, or at least 20 liters/minute.

Embodiment 79. The method of any one of Embodiments 76 to 78, wherein the fluid maintains contact with the heated susceptor particles for not more than 10 minutes, 8 minutes, 5 minutes, 3 minutes, or 1 minute.

Embodiment 80. The method of any one of Embodiments 76 to 79, wherein step (b) heats the fluid by at least 200° C., at least 250° C., at least 300° C., at least 400° C., or at least 500° C.

Embodiment 81. The method of any one of Embodiments 76 to 80, wherein the fluid is a liquid and step (b) is carried out at an elevated pressure to prevent vaporization of the liquid.

Embodiment 82. The method of any one of Embodiments 76 to 81, wherein the susceptor particles are not physically bound to one another.

Embodiment 83. The method of any one of Embodiments 76 to 82, wherein the average particle size of the susceptor particles is in the range of 0.1 to 5 millimeters.

Embodiment 84. The method of any one of Embodiments 76 to 83, wherein steps (a) and (b) are carried out in a common container (e.g., tube) that receives the susceptor particles and the fluid.

Embodiment 85. The method of any one of Embodiments 76 to 84, wherein the container comprises an electromagnetic wave-transparent section through which the electromagnetic energy passes to heat the susceptor particles.

Embodiment 86. The method of any one of Embodiments 76 to 85, wherein the electromagnetic wave-transparent section is a tubular member made of an electromagnetic wave-transparent material.

Embodiment 87. The method of any one of Embodiments 76 to 86, wherein during steps (a) and (b), the susceptor particles are retained in the container while the fluid flows through the container.

Embodiment 88. The method of any one of Embodiments 76 to 87, wherein the flow rate of the fluid through the container is at least 10 liters/minute, wherein the residence time of the fluid in the container is in the range of 0.1 to 5 minutes, and wherein the temperature of the fluid is increased by at least 250° C. in the container.

Embodiment 89. The method of any one of Embodiments 76 to 88, wherein steps (a) and (b) are carried out simultaneously.

Embodiment 90. The method of any one of Embodiments 76 to 89, wherein steps (a) and (b) are carried out in a substantially continuous fashion.

Embodiment 91. The method of any one of Embodiments 76 to 90, wherein the fluid is heated predominately by direct heat exchange with the heated susceptor particles.

Embodiment 92. The method of any one of Embodiments 76 to 91, wherein less than 25 percent, less than 20 percent, less than 15 percent, less than 10 percent, or less than 5 percent of the heating of the fluid is caused by direct absorption of the electromagnetic energy.

Embodiment 93. The method of any one of Embodiments 76 to 92, wherein the electromagnetic energy comprises microwave energy.

Embodiment 94. The method of any one of Embodiments 76 to 93, further comprising (i) disposing at least a portion of the heated fluid in the inlet of the tube; (ii) introducing the plurality of electromagnetic waves into the applicator to irradiate at least a portion of the susceptor material with the plurality of electromagnetic waves to generate heat while the heated fluid is in the tube to produce a further heated fluid; and (iii) collecting the further heated fluid at the outlet of the tube.

Embodiment 95. The method of Embodiment 94, further comprising repeating steps (i) to (iii) one or more times to produce a further heated fluid having an increased temperature.

Embodiment 96. A method for processing a fluid, the method comprising providing (i) the apparatus of any one of Embodiments 1 to 73, (ii) the system of Embodiment 74 or 75, or (iii) an apparatus comprising a container having an inlet and an outlet, a susceptor material disposed in the container, and an applicator, wherein at least a portion of the susceptor material and at least a portion of the container are arranged in the applicator; wherein the susceptor material comprises magnetite and an iron oxide other than magnetite; disposing a fluid in the inlet of the tube at a flow rate; wherein the fluid is water or an aqueous fluid, and the fluid contacts the susceptor material; and introducing a plurality of electromagnetic waves into the applicator to irradiate at least a portion of the susceptor material with the plurality of electromagnetic waves to generate heat while the fluid is in the tube.

Embodiment 98. The method of Embodiment 96, further comprising collecting a heated fluid at the outlet of the tube, wherein the heated fluid is a gas.

Embodiment 99. The method of any one of Embodiments 75 to 98, wherein the fluid has a temperature of about 15° C. to about 35° C., or about 20° C. to about 30°.

Embodiment 100. The method of any one of Embodiments 75 to 99, wherein the heated fluid or the further heated fluid has a temperature of about 400° C. to about 600° C.

Embodiment 101. The method of any one of Embodiments 75 to 100, wherein the heated fluid or the further heated fluid has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., or about 400° C. to about 500° C.

Embodiment 102. The method of any one of Embodiments 75 to 101, wherein a heated susceptor material, or a susceptor material irradiated with electromagnetic radiation has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., about 400° C. to about 500° C. to about 250° C. to about 1,500° C., about 350° C. to about 1,500° C., about 450° C. to about 1,500° C., about 300° C. to about 1,000° C., about 300° C. to about 800° C., or about 300° C. to about 700° C.

Embodiment 103. The method of any one of Embodiments 75 to 102, wherein (A) the fluid has a critical pressure, and a pressure inside the tube is greater than the critical pressure of the fluid, (B) a pressure inside a container (e.g., tube) during all or a portion of the methods provided herein is about 1 bar to about 250 bar, about 1.1 bar to about 250 bar, about 5 bar to about 250 bar, about 5 bar to about 225 bar, about 5 bar to about 200 bar, about 5 bar to about 150 bar, about 5 bar to about 100 bar, or about 10 bar to about 100 bar, or (C) a pressure inside a container (e.g., tube) during all or a portion of the methods provided herein is at least 2 bar, at least 5 bar, at least 10 bar, at least 25 bar, at least 50 bar, at least 100 bar, at least 150 bar, or at least 200 bar.

Embodiment 104. The method of any one of Embodiments 75 to 103, wherein the flow rate is about 0.1 liters/minute to about 1,000 liters/minute, about 0.1 liters/minute to about 750 liters/minute, about 0.1 liters/minute to about 500 liters/minute, about 0.1 liters/minute to about 250 liters/minute, about 0.1 liters/minute to about 100 liters/minute, about 0.1 liters/minute to about 50 liters/minute, about 0.1 liters/minute to about 25 liters/minute, about 0.1 liters/minute to about 10 liters/minute, about 0.1 liters/minute to about 5 liters/minute, about 0.2 liters/minute to about 3 liters/minute, about 0.2 liters/minute to about 1.2 liters/minute, about 900 liters/minute to about 1,000 liters/minute, about 800 liters/minute to about 1,000 liters/minute, about 700 liters/minute to about 1,000 liters/minute, about 600 liters/minute to about 1,000 liters/minute, about 500 liters/minute to about 1,000 liters/minute, about 400 liters/minute to about 1,000 liters/minute, about 300 liters/minute to about 1,000 liters/minute, about 250 liters/minute to about 1,000 liters/minute, about 200 liters/minute to about 1,000 liters/minute, about 100 liters/minute to about 1,000 liters/minute, about 75 liters/minute to about 1,000 liters/minute, about 50 liters/minute to about 1,000 liters/minute, about 10 liters/minute to about 1,000 liters/minute, at least 5 liters/minute, at least 10 liters/minute, at least 15 liters/minute, or at least 20 liters/minute.

Embodiment 105. The method of any one of Embodiments 75 to 103, wherein the flow rate is about 0.2 liters/minute to about 3 liters/minute.

Embodiment 106. The method of any one of Embodiments 75 to 103, wherein the flow rate is about 0.2 liters/minute to about 1.2 liters/minute.

Embodiment 107. The method of any one of Embodiments 75 to 106, wherein the fluid comprises an organic fluid, aqueous fluid, ionic liquid, or a combination thereof.

Embodiment 108. The method of Embodiment 107, wherein the organic fluid is a $C_1$-$C_{40}$ hydrocarbon, a $C_1$-$C_{30}$ hydrocarbon, or a $C_1$-$C_{20}$ hydrocarbon.

Embodiment 109. The method of Embodiment 107 or 108, wherein the organic fluid is a halo-substituted organic fluid.

Embodiment 110. The method of Embodiment 109, wherein the halo-substituted organic fluid is a perhalocarbon, such as a perfluorocarbon.

Embodiment 111. A method for heating a material, the method comprising providing (i) the apparatus of any one of Embodiments 1 to 73, (ii) the system of Embodiment 74 or 75, or (iii) an apparatus comprising a container, a susceptor material disposed in the container, and an applicator, wherein at least a portion of the susceptor material and at least a portion of the container are arranged in the applicator; arranging the material adjacent the tube; introducing a plurality of electromagnetic waves into the applicator to irradiate at least a portion of the susceptor material with the plurality of electromagnetic waves to generate heat while the material is adjacent the tube to produce a heated material.

Embodiment 112. The method of Embodiment 111, wherein the material comprises a solid.

Embodiment 113. The method of Embodiment 111 or 112, wherein the arranging of the material adjacent the tube comprises contacting the tube with the material.

Embodiment 114. The method of any one of Embodiments 76 to 113, wherein the susceptor material comprises magnetite and an iron oxide other than magnetite; the fluid is water or an aqueous fluid, the fluid contacts the susceptor material, and the heated fluid is a gas.

Embodiment 115. The method of any one of Embodiments 76 to 114, wherein the plurality of electromagnetic waves comprises a plurality of microwaves.

Embodiment 116. The method of Embodiment 115, wherein the one or more microwave generators comprise a magnetron generator, a solid state generator, or a combination thereof.

Embodiment 117. The method of Embodiment 115 or 116, wherein the one or more microwave generators has a power of about 200 W to about 100 kW, or about 200 W to about 54 kW.

Embodiment 118. The method of an one of Embodiments 115 to 117, wherein one or more microwaves of the plurality of microwaves has a frequency of 915 MHz, 2.45 GHz, 14 GHz, 18 GHz, or 28 GHz.

Embodiment 119. The method of any one of Embodiments 76 to 118, wherein the plurality of electromagnetic waves comprises a plurality of radio waves, a plurality of infrared waves, a plurality of gamma rays, or a combination thereof.

We claim:

1. An apparatus comprising:
a tube formed at least in part of an electromagnetic wave-transparent material;
a susceptor material disposed in the tube; and
an applicator, wherein (i) a first end of the tube is fixably mounted or spring mounted to the applicator, and (ii) at least a portion of the tube and at least a portion the susceptor material in the tube is arranged in the applicator;
wherein the susceptor material is disposed in an internal reservoir of the tube, and the apparatus further comprises one or more retention devices arranged at a position to (a) prevent the susceptor material from escaping the internal reservoir of the tube, (b) control a location of the susceptor material in the internal reservoir of the tube, (c) prevent the susceptor material from contacting fluid in the internal reservoir, or (d) a combination thereof.

2. The apparatus of claim 1, wherein the susceptor material is in a particulate form.

3. The apparatus of claim 1, wherein a second end of the tube is fixably mounted or spring mounted to the applicator.

4. The apparatus of claim 3, wherein the first end of the tube is spring mounted to the applicator, the second end of the tube is spring mounted to the applicator, or both the first end of the tube and the second end of the tube are spring mounted to the applicator.

5. The apparatus of claim 1, wherein the applicator comprises (i) a vessel or one or more modular units, and (ii) a separate mounting apparatus, wherein the separate mounting apparatus permits the first end of the tube to be fixably or spring mounted to the applicator.

6. The apparatus of claim 1, further comprising one or more microwave generators, wherein the one or more microwave generators are positioned to introduce a plurality of microwaves into the applicator to irradiate the at least a portion of the susceptor material with the plurality of microwaves.

7. The apparatus of claim 1, wherein the electromagnetic wave-transparent material comprises a microwave-transparent material.

8. The apparatus of claim 7, wherein the microwave-transparent material comprises a ceramic, a polymer, a glass, or a combination thereof.

9. The apparatus of claim 7, wherein the microwave-transparent material comprises (i) alumina, (ii) fused silica, (iii) silicon nitride, (iv) a ceramic including silicon, aluminum, nitrogen, oxygen, or a combination thereof, or (v) a combination thereof.

10. The apparatus of claim 1, wherein the tube has a monolithic structure.

11. The apparatus of claim 1, wherein the tube comprises a first cap arranged at the first end of the tube, a second cap arranged at the second end of the tube, or a first cap and a second cap arranged at the first end and the second end of the tube, respectively.

12. The apparatus of claim 11, wherein the first cap, the second cap, or both the first cap and the second cap comprises a metal.

13. The apparatus of claim 12, wherein the metal comprises (i) KOVAR® alloy, or (ii) an alloy comprising iron, cobalt, and nickel.

14. The apparatus of claim 12, wherein a portion of the tube comprises a ceramic, and the first cap, the second cap, or both the first cap and the second cap are adjoined to the ceramic by a ceramic-to-metal braze, an adhesive, or a combination thereof.

15. The apparatus of claim 1, wherein (i) the first end of the tube is spring mounted to the applicator, (ii) the second end of the tube is fixably mounted to the applicator, (iii) the first end of the tube is spring mounted to the applicator and the second end of the tube is fixably mounted to the applicator, (iv) the first end of the tube is fixably mounted to the applicator, (v) the second end of the tube is spring mounted to the applicator, or (vi) the first end of the tube is spring mounted to the applicator and the second end of the tube is spring mounted to the applicator.

16. The apparatus of claim 15, wherein the first end of the tube is spring mounted to the applicator, and the apparatus further comprises:
(i) a first head unit defining a first aperture,
a first fastener having a first end and a second end, wherein the first fastener is slidably arranged in the first aperture, and the second end of the first fastener is fixably mounted to the applicator, and
a first elastically compressible apparatus arranged between the first head unit and the first end and/or the second end of the first fastener,
wherein the first end of the tube and first head unit contact each other; or
(ii) a first head unit defining a first aperture and a second aperture,
a first fastener having a first end and a second end, wherein the first fastener is slidably arranged in the first aperture, and the second end of the first fastener is fixably mounted to the applicator,
a second fastener having a first end and a second end, wherein the second fastener is slidably arranged in the second aperture, and the second end of the first fastener is fixably mounted to the applicator,
a first elastically compressible apparatus arranged between the first head unit and the first end and/or the second end of the first fastener, and
a second elastically compressible apparatus arranged between the first head unit and the first end and/or the second end of the second fastener;
wherein the first end of the tube and first head unit contact each other.

17. The apparatus of claim 16, wherein the first elastically compressible apparatus, the second elastically compressible apparatus, or a combination thereof comprises one or more disc springs slidably mounted on the first fastener or the second fastener, respectively.

18. The apparatus of claim 16, further comprising a first seal that provides closure between the first head unit and the first end of the tube.

19. The apparatus of claim 1, wherein the applicator comprises:
a vessel (i) having a first end and a second end, and (ii) comprising one to thirty chambers defined by (a) one or more outer walls of the vessel, (b) one or more walls inside the vessel, or (c) a combination thereof, wherein the first end of the vessel, the second end of the vessel, the one or more walls inside the vessel, or a combination thereof define an aperture, and the tube is arranged in the apertures defined by (a) the first end of the vessel, (b) the second end of the vessel, (c) the one or more walls inside the vessel, or (d) a combination thereof.

20. The apparatus of claim 19, wherein the vessel further comprises at least one waveguide comprising a passageway through which the plurality of microwaves pass prior to entering one of the one to thirty chambers.

21. The apparatus of claim 19, further comprising one or more microwave generators, wherein at least one of the one or more microwave generators (i) is positioned to introduce the plurality of microwaves into at least one of the one to thirty chambers via an aperture defined by the one or more outer walls of the vessel, (ii) is positioned in at least one of the one to thirty chambers, or (iii) a combination thereof.

22. The apparatus of claim 1, wherein the applicator comprises:
one to thirty modular applicator units, wherein each modular applicator unit comprises (i) a chamber having a first side and a second side, (ii) a first aperture defined by the first side, (iii) a second aperture defined by the second side, and (iv) a waveguide extending from a third aperture of the chamber;
wherein the one to thirty modular applicator units are arranged adjacent to each other, and the tube is arranged in the first aperture and the second aperture of each modular applicator unit.

23. The apparatus of claim 22, further comprising one or more microwave generators, wherein at least one of the one or more microwave generators is positioned to introduce a plurality of microwaves into at least one of the one to thirty modular applicator units.

24. The apparatus of claim 1, wherein the tube further comprises a microwave disruptor.

25. The apparatus of claim 1, whether the one or more retention devices comprise a membrane, a screen, a housing, or a combination thereof.

26. The apparatus of claim 1, wherein the susceptor material is in a monolithic form.

27. The apparatus of claim 1, wherein the susceptor material comprises silicon carbide, magnetite, zeolite, quartz, ferrite, carbon black, graphite, granite, or a combination thereof.

28. The apparatus of claim 1, wherein the tube comprises an inlet and an outlet.

29. A method for heating a material, the method comprising:
providing the apparatus of claim 28;
disposing a fluid in the inlet of the tube at a flow rate;
introducing a plurality of electromagnetic waves into the applicator to irradiate at least a portion of the susceptor material with the plurality of electromagnetic waves to generate heat while the fluid is in the tube to produce a heated fluid; and
collecting the heated fluid at the outlet of the tube.

30. A method for heating a material, the method comprising:
providing the apparatus of claim 28, wherein the susceptor material comprises magnetite and an iron oxide other than magnetite;
disposing a fluid in the inlet of the tube at a flow rate, wherein the fluid is water or an aqueous fluid, and the fluid contacts the susceptor material;
introducing a plurality of electromagnetic waves into the applicator to irradiate at least a portion of the susceptor material with the plurality of electromagnetic waves to generate heat while the fluid is in the tube to produce a heated fluid; and
collecting the heated fluid at the outlet of the tube, wherein the heated fluid is a gas.

31. A method for heating a material, the method comprising:
providing the apparatus of claim 28;
arranging the material adjacent the tube;
introducing a plurality of electromagnetic waves into the applicator to irradiate at least a portion of the susceptor material with the plurality of electromagnetic waves to generate heat while the material is adjacent the tube to produce a heated material.

32. A system comprising:
the apparatus of claim 1;
a fluid source in which a fluid is disposed, wherein the fluid source is in fluid communication with the tube; and
a pump configured to provide (i) the fluid from the fluid source to the tube, and (ii) a pressure in the tube, wherein the pump is in fluid communication with the apparatus and the fluid source.

33. An apparatus for heating fluids with a plurality of susceptor particles irradiated by electromagnetic energy, the apparatus comprising:
a container defining an internal volume configured to receive the susceptor particles;
at least one retention device disposed in or adjacent to the internal volume and configured to retain the susceptor particles in the internal volume while allowing a fluid to flow out of the internal volume; and
an electromagnetic wave emission structure configured to introduce electromagnetic waves into the internal volume for irradiation of the susceptor particles contained in the internal volume, wherein the electromagnetic wave emission structure comprises an electromagnetic wave-transparent section of the container through which electromagnetic waves can pass from outside the container into the internal volume;
wherein the container comprises a tubular section formed of an electromagnetic wave-transparent material that makes up the electromagnetic wave-transparent section of the container; and
wherein the container further comprises two metallic end caps, one coupled to each end of the tubular section.

34. The apparatus of claim 33, further comprising an applicator for directing electromagnetic waves through the electromagnetic wave-transparent section and into the internal volume.

35. The apparatus of claim 33, wherein the electromagnetic wave emission structure is at least partially disposed in the container.

36. The apparatus of claim 33, wherein the retention device has a plurality of openings through which the fluid can pass but the susceptor particles cannot pass.

37. The apparatus of claim 33, wherein the retention device comprises a screen coupled to the container, a perforated plate coupled to the container, or a perforated wall of the container.

38. The apparatus of claim 33, wherein the container further comprises a fluid inlet for receiving the fluid in the internal volume and a fluid outlet for discharging the fluid from the internal volume.

39. The apparatus of claim 33, wherein the at least one retention device comprises a first retention structure position proximate to the fluid inlet and a second retention structure position proximate to the fluid outlet.

40. The apparatus of claim 33, wherein the container is a pressure container.

41. The apparatus of claim 33, further comprising a fluid source for providing the fluid to the internal volume and an electromagnetic wave generator for providing the electromagnetic waves to the internal volume.

* * * * *